(12) United States Patent
Popovich

(10) Patent No.: US 6,421,109 B1
(45) Date of Patent: Jul. 16, 2002

(54) METHOD AND SYSTEM FOR DISPLAY RESOLUTION MULTIPLICATION

(75) Inventor: Milan M. Popovich, Leicester (GB)

(73) Assignee: DigiLens, Inc., Sunnyvale, CA (US)

(*) Notice: Subject to any disclaimer, the term of this patent is extended or adjusted under 35 U.S.C. 154(b) by 0 days.

(21) Appl. No.: 09/419,016

(22) Filed: Oct. 15, 1999

Related U.S. Application Data

(60) Provisional application No. 60/104,582, filed on Oct. 16, 1998.

(51) Int. Cl.$^7$ ................................................ G02F 1/13
(52) U.S. Cl. ...................... 349/202; 359/15; 359/316; 348/756
(58) Field of Search .................... 349/15, 201, 202; 359/15, 17, 315–316, 462, 298; 345/6; 348/54, 56, 756

(56) References Cited

U.S. PATENT DOCUMENTS

| | | |
|---|---|---|
| 3,807,829 A | 4/1974 | Close |
| 4,028,725 A | 6/1977 | Lewis .......................... 358/103 |
| 4,458,981 A | 7/1984 | Huignard |
| 4,500,163 A | 2/1985 | Burns et al. |
| 4,566,031 A | 1/1986 | Kirk |
| 4,669,812 A | 6/1987 | Hoebing |
| 4,759,596 A | 7/1988 | Po et al. |
| 4,790,613 A | 12/1988 | Moss |
| 4,799,739 A | 1/1989 | Newswanger |
| 4,807,951 A | 2/1989 | Moss |
| 4,830,441 A | 5/1989 | Chang |
| 4,834,473 A | 5/1989 | Keyes, IV et al. |
| 4,834,476 A | 5/1989 | Benton |
| H738 H | 2/1990 | McManus et al. |
| 4,932,731 A | 6/1990 | Suzuki et al. |
| 4,938,568 A | 7/1990 | Margerum et al. .......... 350/334 |
| 4,981,332 A | 1/1991 | Smith et al. |
| 4,993,790 A | 2/1991 | Vick |

(List continued on next page.)

FOREIGN PATENT DOCUMENTS

| | | | |
|---|---|---|---|
| DE | 34 19 098 A1 | 11/1985 | ............ G02B/27/22 |
| EP | 0 389 123 A3 | 9/1990 | ............ G03B/21/56 |
| EP | 0 389 123 A2 | 9/1990 | ............ G03B/21/56 |
| EP | 0 559 435 A1 | 9/1993 | ............ G11B/7/135 |
| EP | 0 602 813 A1 | 6/1994 | ............ D02B/5/32 |
| EP | 0 664 495 A1 | 7/1995 | ............ G03H/1/02 |
| EP | 0 720 040 A2 | 7/1996 | ......... G02F/1/1335 |
| EP | 0 720 040 A3 | 4/1997 | ......... G02F/1/1335 |
| EP | 0 777 136 A1 | 6/1997 | ............ G02B/5/20 |
| EP | 0 785 457 A2 | 7/1997 | ......... G02F/1/1333 |
| EP | 0 821 293 A2 | 1/1998 | ............ G03H/1/04 |

(List continued on next page.)

OTHER PUBLICATIONS

Bunning, T.J. et al., "The Morphology and Performance of Holographic Transmission Gratings Recorded in Polymer Dispersed Liquid Crystals," Polymer vol. 36, No. 14, received Dec. 27, 1994; revised Feb. 10, 1995, pp. 2699–2708.

Domash, Lawrence H. et al., "Applications of Switchable Polaroid Holograms," SPIE vol. 2152, Jun. 1, 1994, pp. 127–138.

Iwamoto, Kazuyo et al., "An Eye Movement Tracking Type Head Mounted Display for Virtual Reality System: Evaluation Experiments of a Proto-type System," IEEE, Feb. 10, 1994, pp. 13–18.

(List continued on next page.)

*Primary Examiner*—Kenneth Parker
(74) *Attorney, Agent, or Firm*—Skjerven Morrill LLP

(57) ABSTRACT

Disclosed is an optical display system and a method for increasing the resolution of an display device. The optical display system includes a display device which includes a pixel and a holographic optical element positioned in front of the pixel. The holographic optical element is configured to diffract a portion of the incident light from the pixel toward a user of the display system such that two or more pixels may be perceived by the user.

64 Claims, 34 Drawing Sheets

U.S. PATENT DOCUMENTS

| | | |
|---|---|---|
| 5,011,244 A | 4/1991 | Smith et al. |
| 5,013,141 A | 5/1991 | Sakata ........................ 350/348 |
| 5,014,709 A | 5/1991 | Bjelkhagen et al. |
| 5,024,494 A | 6/1991 | Williams et al. |
| 5,035,474 A | 7/1991 | Moss |
| 5,036,385 A | 7/1991 | Eichenlaub et al. |
| 5,044,709 A | 9/1991 | Smith et al. |
| 5,071,209 A | 12/1991 | Chang |
| 5,093,563 A | 3/1992 | Small et al. |
| 5,093,567 A | 3/1992 | Staveley ..................... 250/221 |
| 5,096,282 A | 3/1992 | Margerum et al. ............. 359/3 |
| 5,103,323 A | 4/1992 | Magarinos |
| 5,111,313 A | 5/1992 | Shires |
| 5,132,839 A * | 7/1992 | Travis ........................ 359/462 |
| 5,151,724 A | 9/1992 | Kikinis |
| 5,153,670 A | 10/1992 | Jannson et al. |
| 5,175,637 A | 12/1992 | Jones et al. .................... 359/48 |
| 5,221,957 A | 6/1993 | Jannson et al. |
| 5,227,898 A | 7/1993 | Iavecchia et al. |
| 5,234,449 A | 8/1993 | Bruker ....................... 606/158 |
| 5,278,532 A | 1/1994 | Hegg et al. |
| 5,291,314 A | 3/1994 | Agranat et al. |
| 5,299,035 A | 3/1994 | Leith et al. |
| 5,305,124 A | 4/1994 | Chern et al. |
| 5,319,492 A | 6/1994 | Dorn et al. |
| 5,331,149 A | 7/1994 | Spitzer et al. ............... 250/221 |
| 5,341,229 A | 8/1994 | Rowan |
| 5,365,354 A | 11/1994 | Jannson et al. |
| 5,379,133 A | 1/1995 | Kirk |
| 5,381,253 A | 1/1995 | Sharp et al. |
| 5,414,544 A | 5/1995 | Aoyagi et al. ................ 359/53 |
| 5,418,631 A | 5/1995 | Tedesco et al. |
| 5,424,866 A | 6/1995 | Kikinis |
| 5,440,428 A | 8/1995 | Hegg et al. |
| 5,455,693 A | 10/1995 | Wreede et al. ................ 359/15 |
| 5,471,327 A | 11/1995 | Tedesco et al. |
| 5,497,254 A | 3/1996 | Amako et al. |
| 5,506,701 A | 4/1996 | Ichikawa |
| 5,521,724 A | 5/1996 | Shires |
| 5,530,565 A | 6/1996 | Owen |
| 5,535,024 A | 7/1996 | Khoury et al. |
| 5,537,232 A | 7/1996 | Biles |
| 5,539,542 A | 7/1996 | Picoli et al. |
| 5,539,544 A | 7/1996 | Le Paih et al. |
| 5,544,143 A | 8/1996 | Kay et al. |
| 5,548,772 A * | 8/1996 | Lin et al. ..................... 395/800 |
| 5,552,912 A | 9/1996 | Sharp et al. |
| 5,552,916 A | 9/1996 | O'Callaghan et al. |
| 5,557,283 A | 9/1996 | Sheen et al. |
| 5,561,537 A | 10/1996 | Aritake et al. |
| 5,568,313 A | 10/1996 | Steenblick |
| 5,570,139 A | 10/1996 | Wang |
| 5,570,208 A | 10/1996 | Kato et al. |
| 5,579,026 A | 11/1996 | Tabata ........................... 345/8 |
| 5,581,378 A | 12/1996 | Kulick |
| 5,589,956 A | 12/1996 | Morishima et al. ........... 359/15 |
| 5,589,957 A | 12/1996 | Aritake et al. |
| 5,594,560 A | 1/1997 | Jelley et al. |
| 5,606,455 A | 2/1997 | Eichenlaub |
| 5,608,552 A | 3/1997 | Smith |
| 5,615,023 A | 3/1997 | Yang |
| 5,615,186 A | 3/1997 | Rosen et al. |
| 5,617,225 A | 4/1997 | Aritake et al. |
| 5,621,547 A | 4/1997 | Loiseaux et al. |
| 5,629,784 A | 5/1997 | Abileah et al. |
| 5,635,947 A | 6/1997 | Iwamoto ........................ 345/7 |
| 5,640,256 A | 6/1997 | De Vré et al. .................. 359/3 |
| 5,644,369 A | 7/1997 | Jachimowicz et al. ........ 349/10 |
| 5,644,414 A | 7/1997 | Kato et al. |
| 5,650,865 A | 7/1997 | Smith |
| 5,668,648 A | 9/1997 | Saito et al. |
| 5,680,231 A | 10/1997 | Grinberg et al. |
| 5,682,214 A | 10/1997 | Amako et al. ................ 349/74 |
| 5,684,498 A | 11/1997 | Welch et al. ................... 345/8 |
| 5,692,077 A | 11/1997 | Stone et al. |
| 5,696,552 A | 12/1997 | Aritake et al. |
| 5,696,749 A | 12/1997 | Brazas et al. |
| 5,698,343 A | 12/1997 | Sutherland et al. |
| 5,703,702 A | 12/1997 | Crane et al. |
| 5,706,067 A | 1/1998 | Colgan et al. |
| 5,708,488 A | 1/1998 | Fukui et al. |
| 5,709,463 A | 1/1998 | Igram |
| 5,717,509 A | 2/1998 | Kato et al. |
| 5,719,690 A | 2/1998 | Burland et al. |
| 5,721,598 A | 2/1998 | Smith |
| 5,721,630 A | 2/1998 | Horner et al. |
| 5,729,366 A | 3/1998 | Yang et al. |
| 5,736,958 A | 4/1998 | Turpin |
| 5,739,930 A | 4/1998 | Sato et al. |
| 5,744,267 A | 4/1998 | Meerholz et al. |
| 5,745,203 A | 4/1998 | Valliath et al. |
| 5,748,272 A | 5/1998 | Tanaka et al. ................ 349/86 |
| 5,748,828 A | 5/1998 | Steiner et al. |
| 5,751,243 A | 5/1998 | Turpin |
| 5,751,452 A | 5/1998 | Tanaka et al. ................ 359/52 |
| 5,757,522 A | 5/1998 | Kulick et al. |
| 5,760,933 A | 6/1998 | Aritake et al. |
| 5,764,317 A | 6/1998 | Sadovnik et al. ............... 349/5 |
| 5,768,242 A | 6/1998 | Juday ........................ 369/103 |
| 5,771,320 A | 6/1998 | Stone |
| 5,774,175 A | 6/1998 | Hattori |
| 5,777,742 A | 7/1998 | Marron |
| 5,777,760 A | 7/1998 | Hays et al. |
| 5,784,181 A | 7/1998 | Louiseaux et al. |
| 5,790,284 A | 8/1998 | Taniguchi et al. |
| 5,793,503 A | 8/1998 | Haines et al. |
| 5,793,504 A | 8/1998 | Stoll |
| 5,796,498 A | 8/1998 | French |
| 5,796,499 A | 8/1998 | Wenyon |
| 5,801,793 A | 9/1998 | Faris et al. |
| 5,801,798 A * | 9/1998 | Chen et al. .................... 349/74 |
| 5,801,799 A | 9/1998 | Chen et al. |
| 5,801,800 A * | 9/1998 | Wright ........................ 349/77 |
| 5,808,589 A | 9/1998 | Fergason ....................... 345/8 |
| 5,808,759 A | 9/1998 | Okamori et al. |
| 5,808,800 A | 9/1998 | Handschy et al. ........... 359/630 |
| 5,812,229 A * | 9/1998 | Popovich .................... 349/117 |
| 5,815,222 A * | 9/1998 | Matsuda et al. ............... 349/1 |
| 5,822,029 A | 10/1998 | Davis et al. |
| 5,825,340 A | 10/1998 | Torizuka et al. ................ 345/8 |
| 5,825,448 A | 10/1998 | Bos et al. |
| 5,825,540 A | 10/1998 | Gold et al. |
| 5,828,471 A | 10/1998 | Davis et al. |
| 5,831,698 A * | 11/1998 | Depp et al. ................... 349/64 |
| 5,831,699 A * | 11/1998 | Wright ........................ 349/73 |
| 5,838,403 A | 11/1998 | Jannson et al. |
| 5,838,416 A * | 11/1998 | Chen et al. .................. 349/202 |
| 5,844,709 A | 12/1998 | Rabinovich et al. |
| 5,844,711 A | 12/1998 | Harrison |
| 5,852,504 A | 12/1998 | Kato et al. |
| 5,867,134 A | 2/1999 | Alvelda et al. ................. 345/8 |
| 5,875,012 A | 2/1999 | Crawford et al. ............. 349/74 |
| 5,880,883 A | 3/1999 | Sudo ........................... 359/462 |
| 5,886,675 A | 3/1999 | Aye et al. ....................... 345/7 |
| 5,942,157 A | 8/1999 | Sutherland et al. |
| 5,959,704 A | 9/1999 | Suzuki et al. .................. 349/9 |
| 5,977,935 A | 11/1999 | Yasukawa et al. ............. 345/8 |
| 6,005,990 A * | 12/1999 | Barrett et al. ................ 382/323 |
| 6,008,781 A | 12/1999 | Furness, III et al. ............ 345/8 |
| 6,023,253 A | 2/2000 | Taniguchi et al. .............. 345/7 |
| 6,185,016 B1 * | 2/2001 | Popovich .................... 359/15 |

FOREIGN PATENT DOCUMENTS

| EP | 0 825 462 A1 | 2/1998 | ............ G02B/5/32 |
| EP | 0 826 986 A1 | 3/1998 | ............ G02B/5/20 |
| EP | 0 856 766 A2 | 8/1998 | ......... G02F/1/1333 |
| EP | 0 856 768 A2 | 8/1998 | ......... G02F/1/1347 |
| EP | 0 785 457 A3 | 10/1998 | ......... G02F/1/1333 |
| EP | 0 821 293 A3 | 11/1998 | ............ G03H/1/04 |
| EP | 0 856 766 A3 | 7/1999 | ......... G02F/1/1333 |
| EP | 0 856 768 A3 | 8/1999 | ......... G02F/1/1347 |
| FR | 2 610 733 A1 | 12/1988 | ............ G02B/27/10 |
| GB | 2 259 213 A | 3/1993 | ............ G09B/9/32 |
| JP | 3-84516 | 4/1991 | ............ G02B/27/22 |
| JP | 10 54959 | 2/1998 | ............ G02B/27/42 |
| WO | WO 94/18596 | 8/1994 | ............ G02B/27/00 |
| WO | WO 95/04294 | 2/1995 | |
| WO | WO 97/35223 | 9/1997 | ............ G02B/27/01 |
| WO | WO 97/36206 | 10/1997 | ......... G02F/1/1347 |
| WO | 98/04650 | 2/1998 | |

OTHER PUBLICATIONS

Iwamoto, Kazuyo et al., "High Resolution, Wide View Angle Head Mounted Display Using Eye Movement Tracking; System Structure and Evaluation Experiments,"IEEE International Workshop on Robot and Human Communication, May 7, 1995, pp. 289–294.

Marrakchi, A. et al., "Generation of Programmable Coherent Source Arrays Using Spatial Light Modulators," Optics Letters, vol. 16, No. 12, Jun. 15, 1991, pp. 931–933.

Natarajan, L.V., et al., "Holographic PDLC's for Optical Beam Modulation, Deflection, and Dynamic Filter Applications," (Invited Paper), work performed at the Materials Directorate of the Air Force Research Laboratory at Wright-–Patterson Air Force Base, 1998, pp. 44–51.

Patel, J. S. et al., "Electrically Controlled Polarization–independent Liquid–Crystal Fresnel Lens Arrays," Optics Letters, vol. 16, No. 7, Apr. 1, 1991, pp. 532–534.

Stankus, J.J., et al., "Electric–Field–Switchable Volume Holograms in Photorefractive Polymers," Optics Letters, vol. 19, No. 18, Sep. 15, 1994, pp. 1480–1482.

Sutherland, R. L. , "Optical Limiters, Switches, and Filters Based on Poloymer Dispersed Liquid Crystals," SPIE, vol. 1080, Liquid Crystal Chemistry, Physics, and Applications, 1989, pp. 83–90.

Sutherland, R. L., et al., Electrically Switchable Volume Gratings in Polymer–Dispersed Liquid Crystals, Applied Physics Letters, vol. 64, No. 9, Feb. 28, 1994, pp. 1074–1076.

Sutherland, R. L.,et al., "Switchable Holograms in New Photopolymer–Liquid Crystal Composite Materials," SPIE vol. 2404, Mar. 1995, pp. 132–143.

Tam, Eddy C., et al., "Spatial–Light Modulator–Based Electro–Optical Imaging System," Applied Optics, vol. 31, No. 5, Feb. 10, 1992, p. 578–579.

Tanaka, Keiji, et al., "Holographically Formed Liquid–Crystal/Polymer Device for Reflective Color Display," 2320 Journal of Society for Information Display, No. 1, Apr. 1994, pp. 37–40.

* cited by examiner positive dielectric liquid crystal negative dielectric liquid crystall

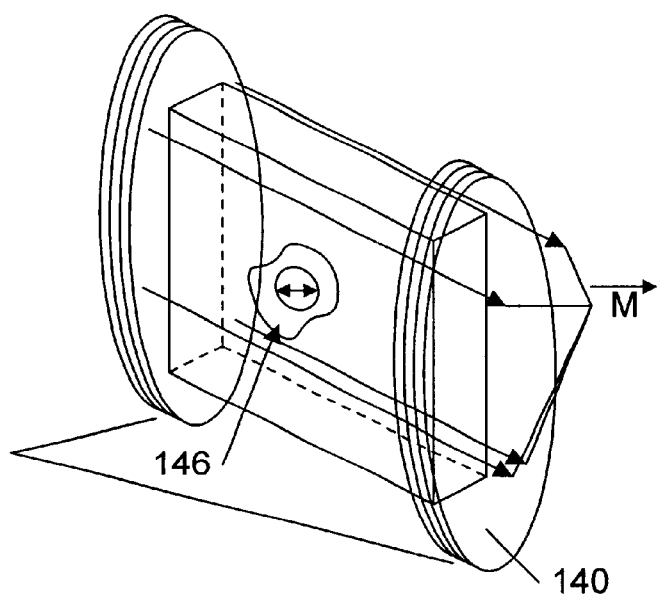
FIG. 10a
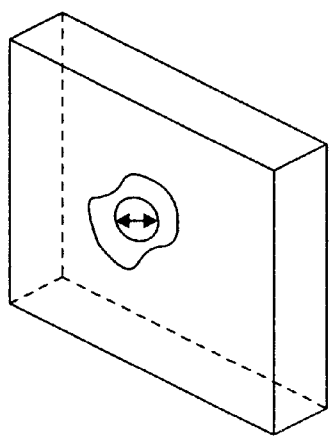 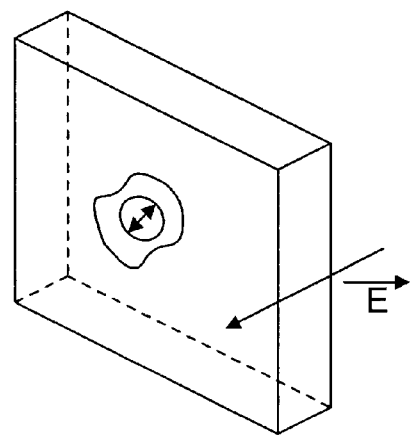
FIG. 10b          FIG. 10c

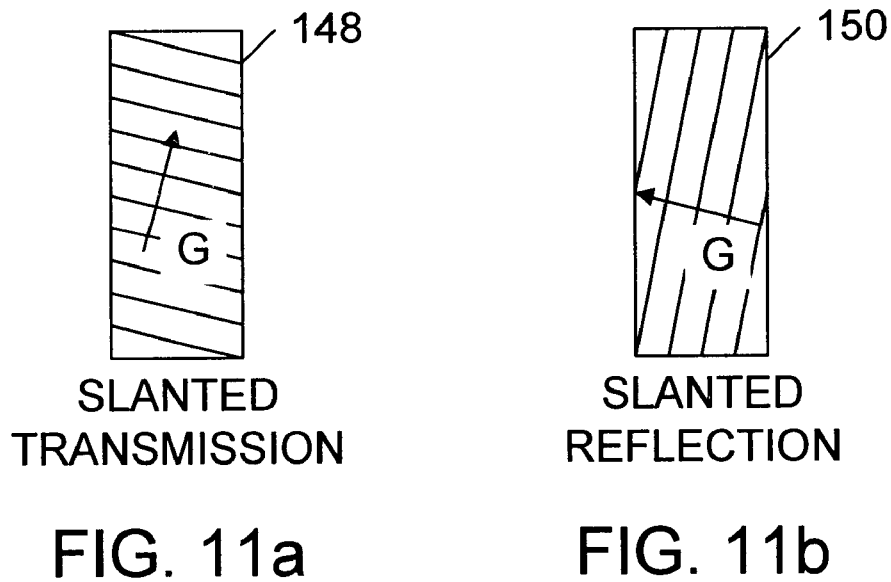
SLANTED TRANSMISSION
FIG. 11a
SLANTED REFLECTION
FIG. 11b
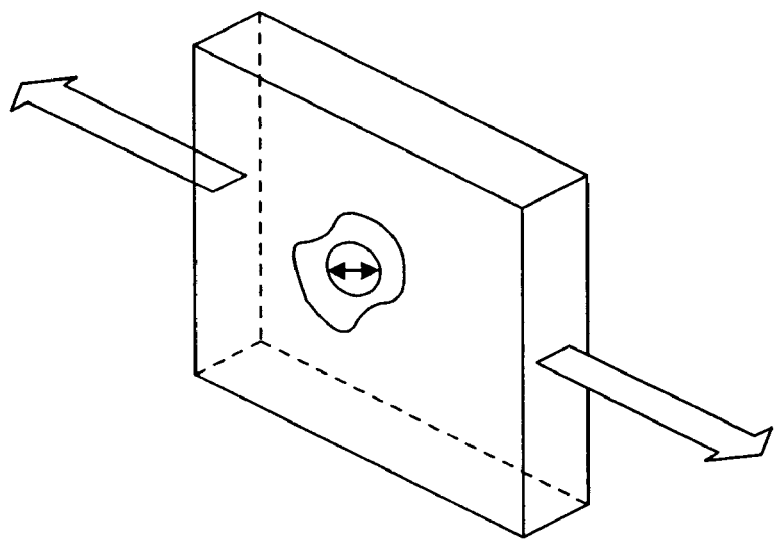
FIG. 12

LIGHT TRANSMITTED

LIGHT BLOCKED

TRANSMITTED

RETRO-REFLECTED

UNSWITCHED STATE

SWITCHED STATE

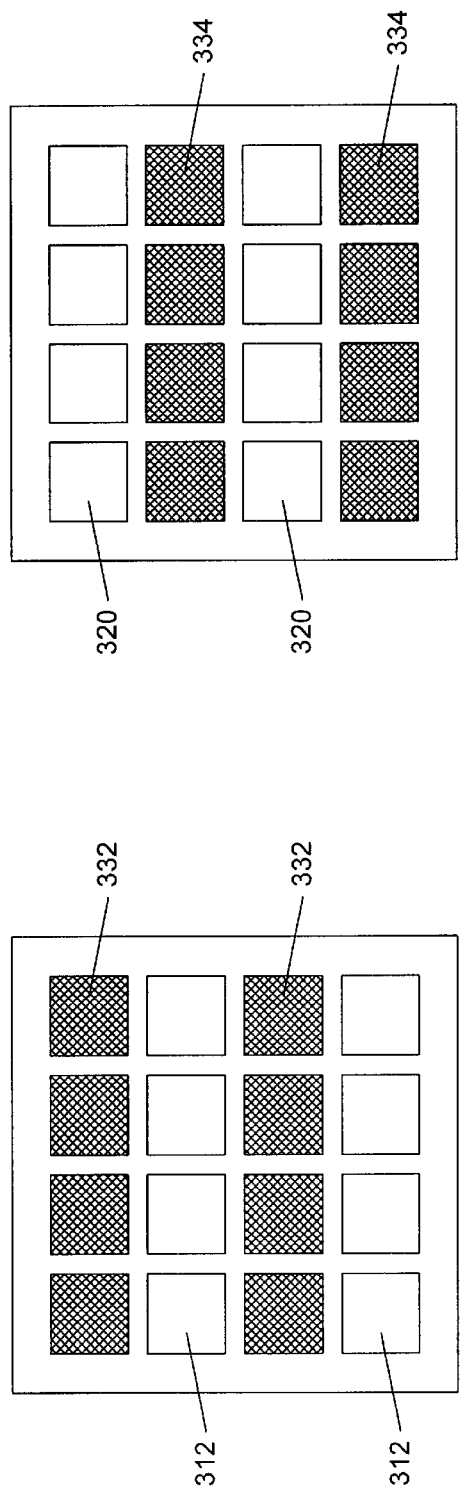
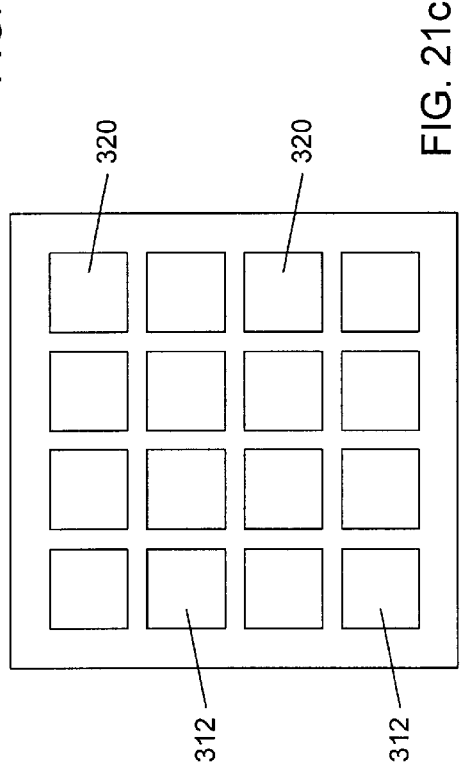
FIG. 21a
FIG. 21b
FIG. 21c

METHOD AND SYSTEM FOR DISPLAY RESOLUTION MULTIPLICATION

RELATED APPLICATIONS

This application claims priority to provisional application entitled HOLOGRAPHIC TECHNIQUE FOR DISPLAY RESOLUTION MULTIPLICATION, Ser. No. 60/104,582, filed Oct. 16, 1998.

BACKGROUND OF THE INVENTION

1. Field of the Invention

The present invention generally relates display systems, and more particularly to a holographic apparatus and method for multiplying the resolution of a display system.

2. Description of the Relevant Art

Display devices (e.g., computer monitors, television screen, and LCD panels) typically produce an image by selectively activating an array of pixels. The pixels each represent a fractional portion of the image which, when combined with the other pixels of the display, produce the full image. The resolution of the image refers to the number of pixels used to produce the image. In general, the more pixels which are used to create an image the better the image quality. For example, a computer display screen operating at a resolution of 1024×768 pixels produces images which tend to have observably better image quality than a similarly sized computer display screen operating at a resolution of 800×600 pixels.

The effect of a display's resolution on image quality also tends to become more noticeable as the surface area of the display screen increases. For example, a 17 inch display screen operating at a resolution of 800×600 pixels will produce images that appear sharper than a 50 inch display screen operating at the same resolution at the same viewing distance. As the size of the display screen increases, without any change in the resolution of the screen, the individual pixels of the display must be spaced further apart to fill up the increased area of the display. This tends to cause the image to appear less sharp, especially to observers close to the display.

As technology advances there is an ever-increasing desire to increase the resolution of display devices. However, increasing the number of pixels of a display devices may be difficult and often cause the display to be significantly more expensive than lower resolution devices. It is therefore desirable to develop a method of increasing the resolution of a display device without having to alter the number of pixels present in the display device.

SUMMARY OF THE INVENTION

The problems outlined above are n large part solved by a system and method for display resolution multiplication. In one embodiment, a system is provided that includes a display device comprising a plurality of light emitting pixels and at least a first optical element that contains at least a first hologram. A first pixel of the display emits first and second light in first and second directions, respectively. The first and second directions define a non-zero angle therebetween. The first optical element is positioned to receive the first light, and in response thereto, the first optical element diffracts the first light. The diffracted first light emerges from the first optical element in a direction substantially parallel to the second direction of the second light emitted from the first pixel. In one embodiment, the first optical element effectively increases the perceived size of the first pixel as seen by a viewer thereof.

In another embodiment, the system describe above also includes second and third optical elements. The second optical element is positioned to receive the first diffracted light while the third optical element is positioned to receive the second light. The second optical element operates in an active state or an inactive state. The second optical element transmits the diffracted first light without substantial alteration when the second optical element operates in the active state. The second optical element extinguishes the diffracted first light when the second optical element operates in the active state. In the active state, third optical element transmits the second light without substantial alteration. In the inactive state, the third optical element extinguishes the second light. The third optical element is configured to be active when the second optical element is inactive, and wherein the third optical element is configured to be inactive when the second optical element is active. In one embodiment, the states of second and third optical elements can be switched at the refresh rate of the display thereby effectively doubling the number of pixels seen by a viewer.

In one embodiment, the second and third optical elements contain second and third holograms, respectively. The second and third holograms may be recorded in a medium that includes a monomer dipentaerythritol hydroxypentaacrylate, a liquid crystal, a cross-linking monomer, a coinitiator, and a photoinitiator dye.

BRIEF DESCRIPTION OF THE DRAWINGS

Other objects and advantages of the invention will become apparent upon reading the following detailed description and upon reference to the accompanying drawings in which:

FIG. 10a is an elevational view of a reflection grating, made in accordance with the teachings of the description herein, disposed within a magnetic field generated by Helmholtz coils;

FIGS. 10b and 10c are elevational views of the reflection grating of FIG. 10a in the absence of an electric field (FIG. 10b) and with an electric field applied (FIG. 10c);

FIGS. 11a and 11b are representative side views of a slanted transmission grating (FIG. 11a) and a slanted reflection grating (FIG. 11b) showing the orientation of the grating vector G of the periodic planes of polymer channels and PDLC channels;

FIG. 12 is an elevational view of a reflection grating, made in accordance with the teachings of the description herein, when a shear stress field is applied thereto;

FIGS. 21a, 21b, and 21c are front views of an array of pixels and holographic optical elements of a display device;

Figure 1:
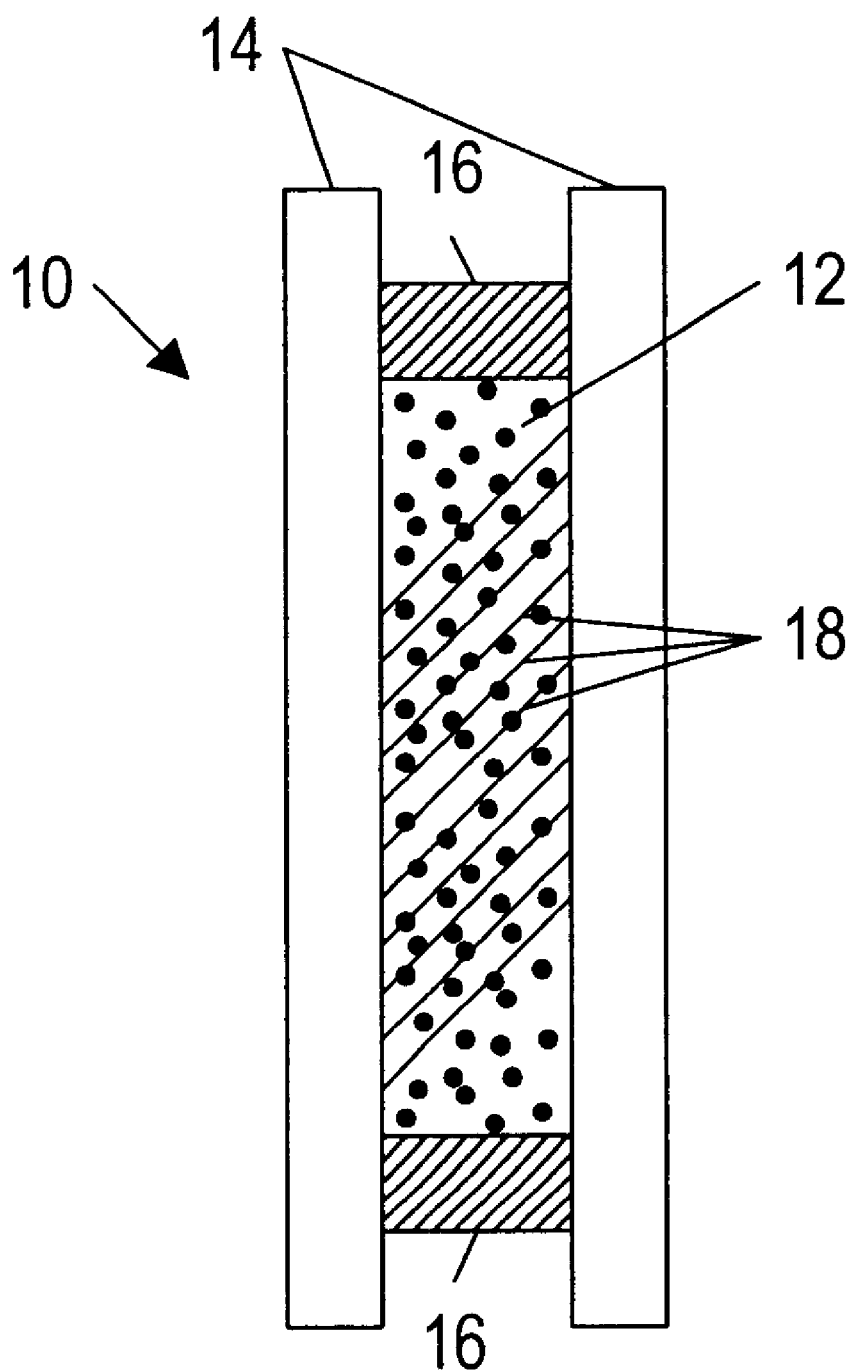
FIG. 1 is a cross-sectional view of an electrically switchable hologram made of an exposed polymer dispersed liquid crystal (PDLC) material made in accordance with the teachings of the description herein.

While the invention is susceptible to various modifications and alternative forms, specific embodiments thereof are shown by way of example in the drawings and will herein be described in detail. It should be understood, however, that the drawing and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

1. Switchable Hologram Materials And Devices

The present invention employs holographic optical elements formed, in one embodiment, from a polymer dispersed liquid crystal (PDLC) material including a monomer, a dispersed liquid crystal, a cross-linking monomer, a coinitiator and a photoinitiator dye. These PDLC materials exhibit clear and orderly separation of the liquid crystal and cured polymer, whereby the PDLC material advantageously provides high quality optical elements. The PDLC materials used in the holographic optical elements may be formed in a single step. The holographic optical elements may also use a unique photopolymerizable prepolymer material that permits in situ control over characteristics of resulting gratings, such as domain size, shape, density, ordering and the like. Furthermore, methods and materials taught herein may be used to prepare PDLC materials for optical elements including switchable transmission or reflection type holographic gratings.

Polymer dispersed liquid crystal materials, methods, and devices contemplated for use in the present invention are also described in R. L. Sutherland et al., "Bragg Gratings in an Acrylate Polymer Consisting of Periodic Polymer dispersed Liquid-Crystal Planes," *Chemistry of Materials*, No. 5, pp. 1533–1538 (1993); in R. L. Sutherland et al., "Electrically switchable volume gratings in polymer dispersed liquid crystals," *Applied Physics Letters*, Vol. 64, No. 9, pp. 1074–1076 (1994); and T. J. Bunning et al., "The Morphology and Performance of Holographic Transmission Gratings Recorded in Polymer dispersed Liquid Crystals," *Polymer*, Vol. 36, No. 14, pp. 2699–2708 (1995), all of which are fully incorporated by reference into this Detailed Description. U.S. patent application Ser. Nos. 08/273,436 and U.S. Pat. No. 5,698,343 to Sutherland et al., titled "Switchable Volume Hologram Materials and Devices," and "Laser Wavelength Detection and Energy Dosimetry Badge," respectively, are also incorporated by reference and include background material on the formation of transmission gratings inside volume holograms.

The process by which a hologram may be formed is controlled primarily by the choice of components used to prepare the homogeneous starting mixture, and to a lesser extent by the intensity of the incident light pattern. In one embodiment of polymer dispersed liquid crystal (PDLC) material may be used to create a switchable hologram in a single step. A feature of one embodiment of PDLC material is that illumination by an inhomogeneous, coherent light pattern initiates a patterned, anisotropic diffusion (or counter diffusion) of polymerizable monomer and second phase material, particularly liquid crystal (LC). Thus, alternating well-defined channels of second phase-rich material, separated by well-defined channels of a nearly pure polymer, may be produced in a single-stop process.

The resulting PDLC material may have an anisotropic spatial distribution of phase-separated LC droplets within the photochemically cured polymer matrix. Prior art PDLC materials made by a single-step process may achieve at best only regions of larger LC bubbles and smaller LC bubbles in a polymer matrix. The large bubble sizes are highly scattering which produces a hazy appearance and multiple ordering diffractions, in contrast to the well-defined first order diffraction and zero order diffraction made possible by the small LC bubbles of one embodiment of PDLC material in well-defined channels of LC-rich material. Reasonably well-defined alternately LC-rich channels and nearly pure polymer channels in a PDLC material are possible by multi-step processes, but such processes do not achieve the precise morphology control over LC droplet size and distribution of sizes and widths of the polymer and LC-rich channels made possible by one embodiment of PDLC material.

The same may be prepared by coating the mixture between two indium-tin-oxide (ITO) coated glass slides separated by spacers of nominally 10–20 $\mu$m thickness. The sample is placed in a conventional holographic recording setup. Gratings are typically recorded using the 488 nm line of an Argon ion laser with intensities of between about 0.1–100 mW/cm$^2$ and typical exposure times of 30–120 seconds. The angle between the two beams is varied to vary the spacing of the intensity peaks, and hence the resulting grating spacing of the hologram. Photopolymerization is induced by the optical intensity pattern. A more detailed discussion of exemplary recording apparatus may be found in R. L. Sutherland, et al., "Switchable holograms in new photopolymer-liquid crystal composite materials," Society of Photo-Optical Instrumentation Engineers (SPIE), Proceedings Reprint, Volume 2402, reprinted from Diffractive and Holographic Optics Technology II (1995), incorporated herein by reference.

The features of the PDLC material are influenced by the components used in the preparation of the homogeneous starting mixture and, to a lesser extent, by the intensity of the incident light pattern. In one embodiment, the prepolymer material comprises a mixture of a photopolymerizable monomer, a second phase material, a photoinitiator dye, a coinitiator, a chain extender (or cross-linker), and, optionally, a surfactant.

In one embodiment, two major components of the prepolymer mixture are the polymerizable monomer and the second phase material, which are preferably completely miscible. Highly functionalized monomers may be preferred because they form densely cross-linked networks which shrink to some extent and to tend to squeeze out the second phase material. As a result, the second phase material is moved anisotropically out of the polymer region and, thereby, separated into well-defined polymer-poor, second phase-rich regions or domains. Highly functionalized monomers may also be preferred because the extensive cross-linking associated with such monomers yields fast kinetics, allowing the hologram to form relatively quickly, whereby the second phase material will exist in domains of less than approximately 0.1 $\mu$m.

In one embodiment, a mixture of penta-acrylates in combination with di-, tri-, and/or tetra-acrylates may be used in order to optimize both the functionality and viscosity of the prepolymer material. Suitable acrylates, such as triethyleneglycol diacrylate, trimethylolpropane triacrylate, pentaerythritol triacrylate, pentaerythritol tetracrylate, pentaerythritol pentacrylate, and the like may be used. In one embodiment, it has been found that an approximately 1:4 mixture of tri- to penta-acrylate facilitates homogeneous mixing while providing a favorable mixture for forming 10–20 $\mu$m films on the optical plates.

The second phase material of choice is a liquid crystal (LC). This also allows an electro-optical response for the resulting hologram. The concentration of LC employed should be large enough to allow a significant phase separation to occur in the cured sample, but not so large as to make the sample opaque or very hazy. Below about 20% by weight very little phase separation occurs and diffraction efficiencies are low. Above about 35% by weight, the sample becomes highly scattering, reducing both diffraction efficiency and transmission. Samples fabricated with approximately 25% by weight typically yield good diffraction efficiency and optical clarity. In prepolymer mixtures utilizing a surfactant, the concentration of LC may be increased to 35% by weight without loss in optical performance by adjusting the quantity of surfactant. Suitable liquid crystals contemplated for use in the practice of the present invention may include the mixture of cyanobiphenyls marketed as E7 by Merck, 4'-n-pentyl-4-cyanobiphenyl, 4'-n-heptyl-4-cyanobiphenyl, 4'-octaoxy-4-cyanobiphenyl, 4'-pentyl-4-cyanoterphenyl, -methoxybenzylidene-4'-butylaniline, and the like. Other second phase components are also possible.

The polymer dispersed liquid crystal material employed may be formed from a prepolymer material that is a homogeneous mixture of a polymerizable monomer including dipentaerythritol hydroxypentacrylate (available, for example, from Polysciences, Inc., Warrington, Pa.), approximately 10–40 wt % of the liquid crystal E7 (which is a mixture of cyanobiphenyls marketed as E7 by Merck and also available from BDH Chemicals, Ltd., London, England), the chain-extending monomer N-vinylpyrrolidinone ("NVP") (available from the Aldrich Chemical Company, Milwaukee, Wis.), coinitiator N-phenylglycine ("NPG") (also available from the Aldrich Chemical Company, Milwaukee, Wis.), and the photoinitiator dye rose bengal ester; (2,4,5,7-tetraiodo-3',4',5',6'-tetrachlorofluorescein-6-acetate ester) marketed as RBAX by Spectragraph, Ltd., Maumee, Ohio). Rose bengal is also available as rose bengal sodium salt (which must be esterified for solubility) from the Aldrich Chemical Company. This system has a very fast curing speed which results in the formation of small liquid crystal micro-droplets.

The mixture of liquid crystal and prepolymer material are homogenized to a viscous solution by suitable means (e.g., ultrasonification) and spread between indium-tin-oxide (ITO) coated glass sides with spacers of nominally 15–100 $\mu$m thickness and, preferably, 10–20 $\mu$m thickness. The ITO is electrically conductive and serves as an optically transparent electrode. Preparation, mixing and transfer of the prepolymer material onto the glass slides are preferably done in the dark as the mixture is extremely sensitive to light.

The sensitivity of the prepolymer materials to light intensity is dependent on the photoinitiator dye and its concentration. A higher dye concentration leads to a higher sensitivity. In most cases, however, the solubility of the photoinitiator dye limits the concentration of the dye and, thus, the sensitivity of the prepolymer material. Nevertheless, it has been found that for more general applications, photoinitiator dye concentrations in the range of 0.2–0.4% by weight are sufficient to achieve desirable sensitivities and allow for a complete bleaching of the dye in the recording process, resulting in colorless final samples. Photoinitiator dyes that may be useful in generating PDLC materials are rose bengal ester (2,4,5,7-tetraiodo-3',4',5',6'-tetrachlorofluorescein-6-acetate ester); rose bengal sodium salt; eosin; eosin sodium salt; 4,5-diiodosuccinyl fluorescein; camphorquinone; methylene blue, and the like. These dyes allow a sensitivity to recording wavelengths across the visible spectrum from nominally 400 nm to 700 nm. Suitable near-infrared dyes, such as cationic cyanine dyes with trialkylborate anions having absorption from 600–900 nm as well as merocyanine dyes derived from spiropyran may also find utility in the present invention.

The coinitiator employed in the practice of the present invention controls the rate of curing in the free radical polymerization reaction of the prepolymer material. Optimum phase separation and, thus, optimum diffraction efficiency in the resulting PDLC material, are a function of curing rate. It has been found that favorable results may be achieved utilizing coinitiator in the range of 2–3% by weight. Suitable coinitiators include N-phenylglycine; triethyl amine; triethanolamine; N,N-dimethyl-2,6-diisopropyl aniline, and the like.

Other suitable dyes and dye coinitiator combinations that may be suitable for use in the present invention, particularly for visible light, include eosin and triethanolamine; camphorquinone and N-phenylglycine; fluorescein and triethanolamine; methylene blue and triethanolamine or N-phenylglycine; erythrosin B and triethanolamine; indolinocarbocyanine and triphenyl borate; iodobenzospiropyran and triethylamine, and the like.

The chain extender (or cross linker) employed in the practice of the present invention may help to increase the solubility of the components in the prepolymer material as well as increase the speed of polymerization. The chain extender is preferably a smaller vinyl monomer as compared with the pentacrylate, whereby it may react with the acrylate positions in the pentacrylate monomer, which are not easily accessible to neighboring pentaacrylate monomers due to steric hindrance. Thus, reaction of the chain extender monomer with the polymer increases the propagation length of the growing polymer and results in high molecular weights. It has been found that chain extender in general applications in the range of 10–18% by weight maximizes the performance in terms of diffraction efficiency. In the one embodiment, it is expected that suitable chain extenders may be selected from the following: N-vinylpyrrolidinone; N-vinyl pyridine; acrylonitrile; N-vinyl carbazole, and the like.

It has been found that the addition of a surfactant material, namely, octanoic acid, n the prepolymer material lowers the switching voltage and also improves the diffraction efficiency. In particular, the switching voltage for PDLC materials containing a surfactant are significantly lower than those of a PDLC material made without the surfactant. While not wishing to be bound by any particular theory, it is believed that these results may be attributed to the weakening of the anchoring forces between the polymer and the phase-separated LC droplets. SEM studies have shown that droplet sizes in PDLC materials including surfactants are reduced to the range of 30–50 nm and the distribution is more homogeneous. Random scattering in such materials is reduced due to the dominance of smaller droplets, thereby increasing the diffraction efficiency. Thus, it is believed that the shape of the droplets becomes more spherical in the presence of surfactant, thereby contributing to the decrease in switching voltage.

For more general applications, it has been found that samples with as low as 5% by weight of surfactant exhibit a significant reduction in switching voltage. It has also been found that, when optimizing for low switching voltages, the concentration of surfactant may vary up to about 10% by weight (mostly dependent on LC concentration) after which there is a large decrease in diffraction efficiency, as well as an increase in switching voltage (possibly due to a reduction in total phase separation of LC). Suitable surfactants include octanoic acid; heptanoic acid; hexanoic acid; dodecanoic acid; decanoic acid, and the like.

In samples utilizing octanoic acid as the surfactant, it has been observed that the conductivity of the sample is high, presumably owing to the presence of the free carboxyl (COOH) group in the octanoic acid. As a result, the sample increases in temperature when a high frequency (~2 KHz) electrical field is applied for prolonged periods of time. Thus, it is desirable to reduce the high conductivity introduced by the surfactant, without sacrificing the high diffraction efficiency and the low switching voltages. It has been found that suitable electrically switchable gratings may be formed from a polymerizable monomer, vinyl neononanoate ("VN") $C_8H_{17}CO_2CH=CH_2$, commercially available from the Aldrich Chemical Co. in Milwaukee, Wis. Favorable results have also been obtained where the chain extender N-vinylpyrrolidinone ("NVP") and the surfactant octanoic acid are replaced by 6.5% by weight VN. VN also acts as a chain extender due to the presence of the reactive acrylate monomer group. In these variations, high optical quality samples were obtained with about 70% diffraction efficiency, and the resulting gratings could be electrically switched by an applied field of $6V/\mu m$.

PDLC materials used in the present invention may also be formed using a liquid crystalline bifunctional acrylate as the monomer ("LC monomer"). LC monomers have an advantage over conventional acrylate monomers due to their high compatibility with the low molecular weight nematic LC materials, thereby facilitating formation of high concentrations of low molecular weight LC and yielding a sample with high optical quality. The presence of higher concentrations of low molecular weight LCs in the PDLC material greatly lowers the switching voltages (e.g., to $\sim 2V/\mu m$). Another advantage of using LC monomers is that it is possible to apply low AC or DC fields while recording holograms to pre-align the host LC monomers and low molecular weight LC so that a desired orientation and configuration of the nematic directors may be obtained in the LC droplets. The chemical formulate of several suitable LC monomers are as follows:

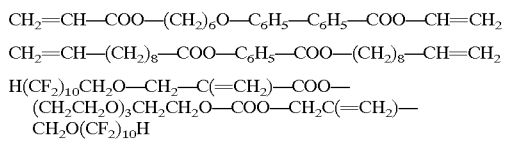

Semifluorinated polymers are known to show weaker anchoring properties and also significantly reduced switching fields. Thus, it is believed that semifluorinated acrylate monomers which are bifunctional and liquid crystalline may find suitable application in the present invention.

Referring now to FIG. 1, there is shown a cross-sectional view of an electrically switchable hologram 10 made of an exposed polymer dispersed liquid crystal material made according to the teachings of this description. A layer 12 of the polymer dispersed liquid crystal material is sandwiched between a pair of indium-tin-oxide coated glass slides 14 and spacers 16. The interior of hologram 10 shows Bragg transmission gratings 18 formed when layer 12 was exposed to an interference pattern from two intersecting beams of coherent laser light. The exposure times and intensities may be varied depending on the diffraction efficiency and liquid crystal domain size desired. Liquid crystal domain size may be controlled by varying the concentrations of photoinitiator, coinitiator and chain-extending (or cross-linking) agent. The orientation of the nematic directors may be controlled while the gratings are being recorded by application of an external electric field across the ITO electrodes.

Figure 2:
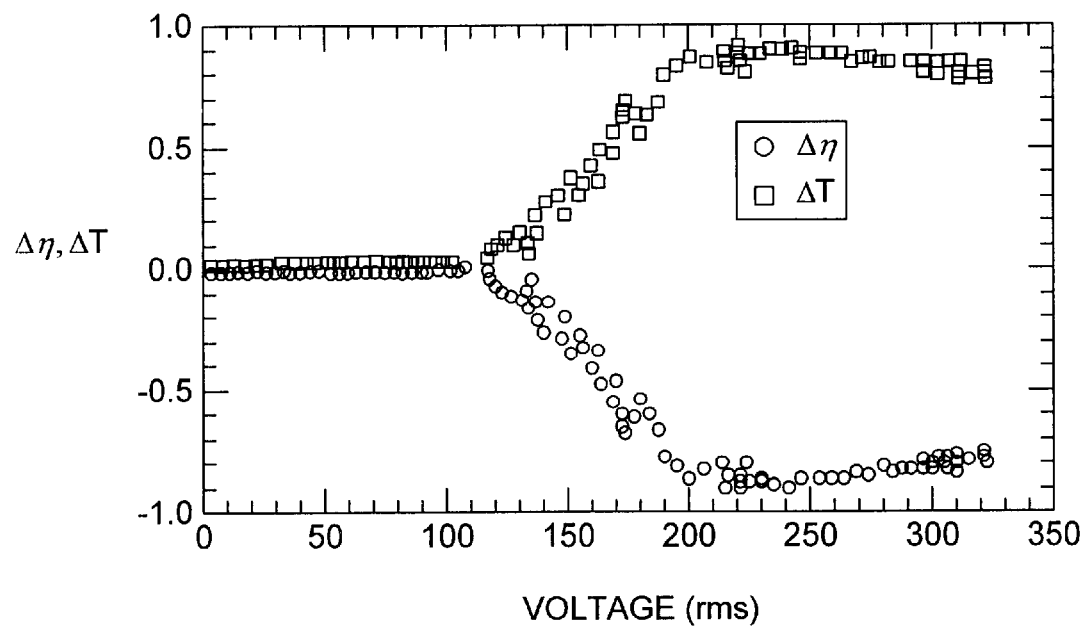
FIG. 2 is a graph of the normalized net transmittance and normalized net diffraction efficiency of a hologram made in accordance with the teachings of the description herein (without the addition of a surfactant) versus the rms voltage applied across the hologram.

The scanning electron micrograph shown in FIG. 2 of the referenced *Applied Physics Letters* article and incorporated herein by reference is of the surface of a grating which was recorded in a sample with a 36 wt % loading of liquid crystal using the 488 nm line of an argon ion laser at an intensity of 95 $mW/cm^2$. The size of the liquid crystal domains is about 0.2 $\mu m$ and the grating spacing is about 0.54 $\mu m$. This sample, which is approximately 20 $\mu m$ thick, diffracts light in the Bragg regime.

FIG. 2 is a graph of the normalized net transmittance and normalized net diffraction efficiency of a hologram made according to the teachings of his disclosure versus the root mean square voltage ("Vrms") applied across the hologram. $\Delta\eta$ is the change in first order Bragg diffraction efficiency. $\Delta T$ is the change in zero order transmittance. FIG. 2 shows that energy is transferred from the first order beam to the zero-order beam as the voltage is increased. There is a true minimum of the diffraction efficiency at approximately 225 Vrms. The peak diffraction efficiency may approach 100%, depending on the wavelength and polarization of the probe beam, by appropriate adjustment of the sample thickness. The minimum diffraction efficiency may be made to approach 0% by slight adjustment of the parameters of the PDLC material to force the refractive index of the cured polymer to be equal to the ordinary refractive index of the liquid crystal.

Figure 3:
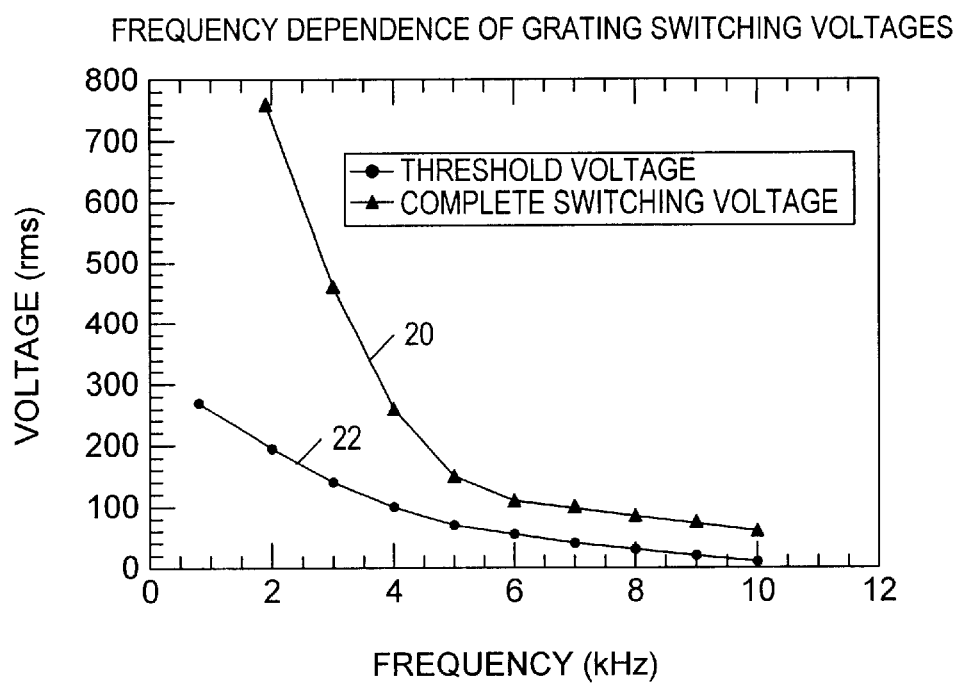
FIG. 3 is a graph of both the threshold and complete switching rms voltages needed for switching a hologram made in accordance with the teachings of the description herein to minimum diffraction efficiency versus the frequency of the rms voltage.

By increasing the frequency of the applied voltage, the switching voltage for minimum diffraction efficiency may be decreased significantly. This is illustrated in FIG. 3, which is a graph of both the threshold rms voltage 20 and the complete switching rms voltage 22 needed for switching a hologram made according to the teachings of this disclosure to minimum diffraction efficiency versus the frequency of the rms voltage. The threshold and complete switching rms voltages are reduced to 20 Vrms and 60 Vrms, respectively, at 10 kHz. Lower values are expected at even higher frequencies.

Figure 4:
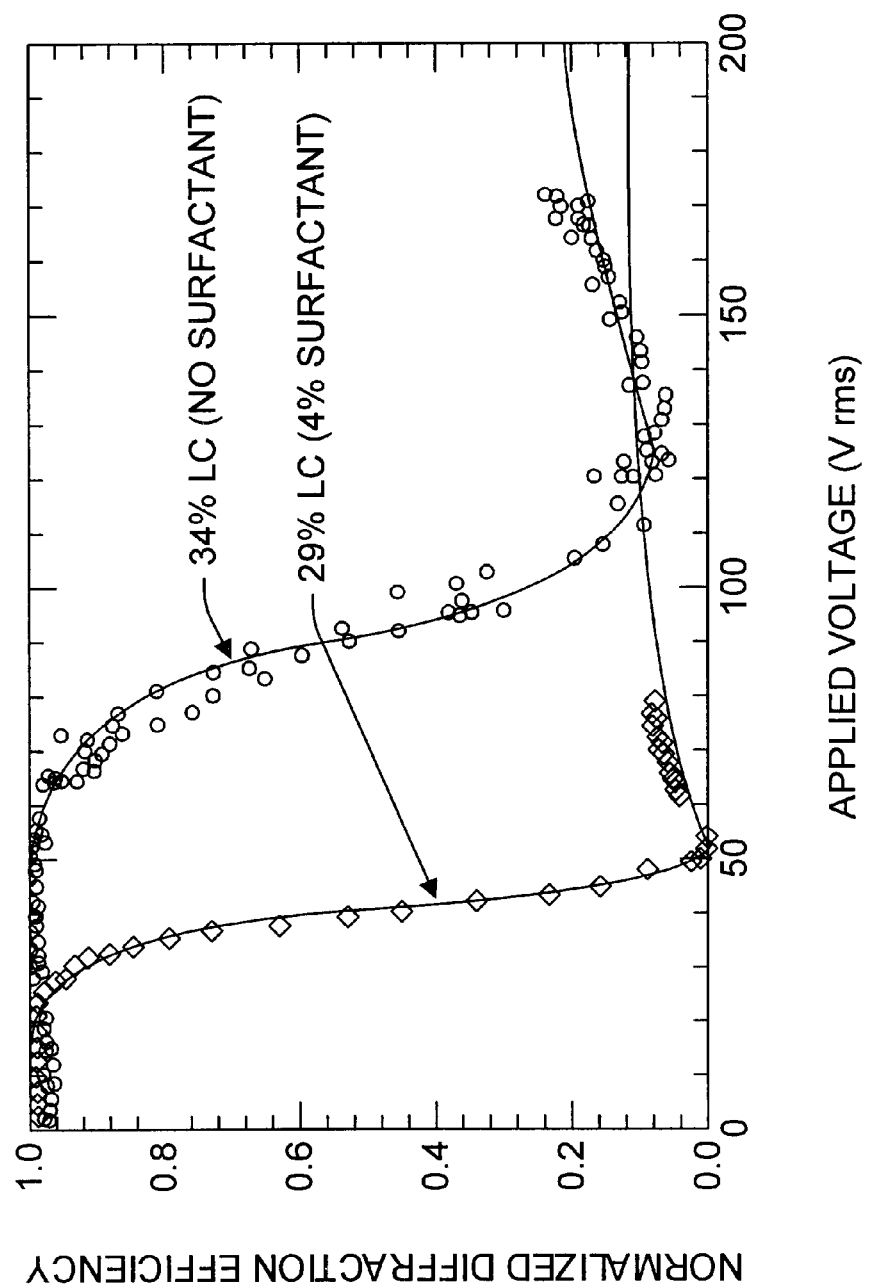
FIG. 4 is a graph of the normalized diffraction efficiency as a function of the applied electric field for a PDLC material formed with 34% by weight liquid crystal surfactant present and a PDLC material formed with 29% by weight liquid crystal and 4% by weight surfactant.
Figure 5:
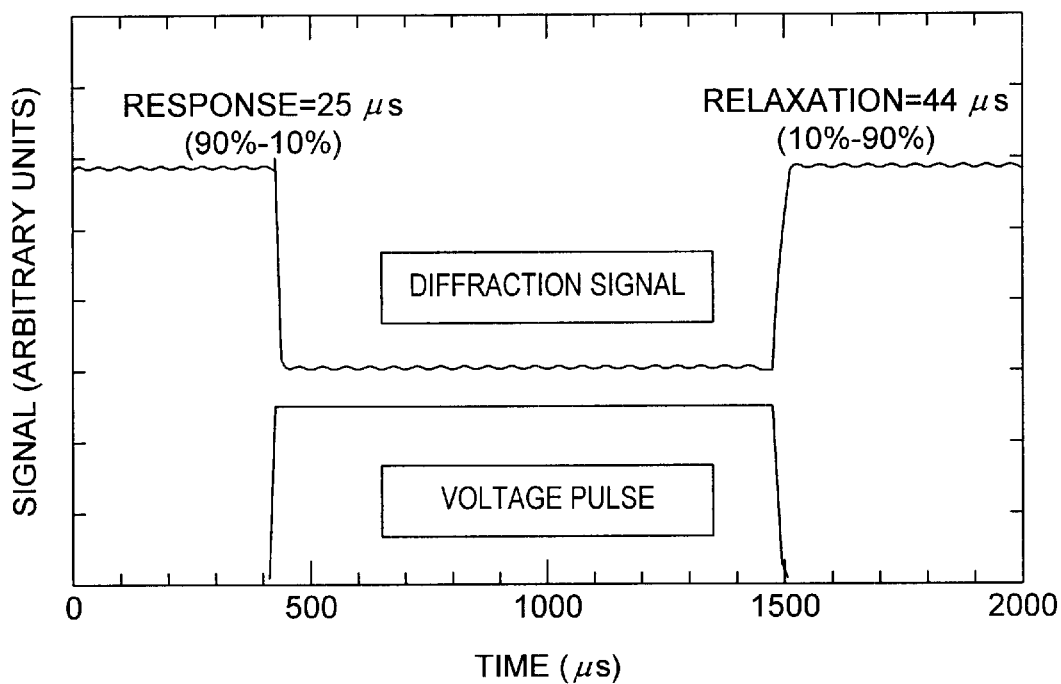
FIG. 5 is a graph showing the switching response time data for the diffracted beam in the surfactant-containing PDLC material in FIG. 4.
Figure 6:
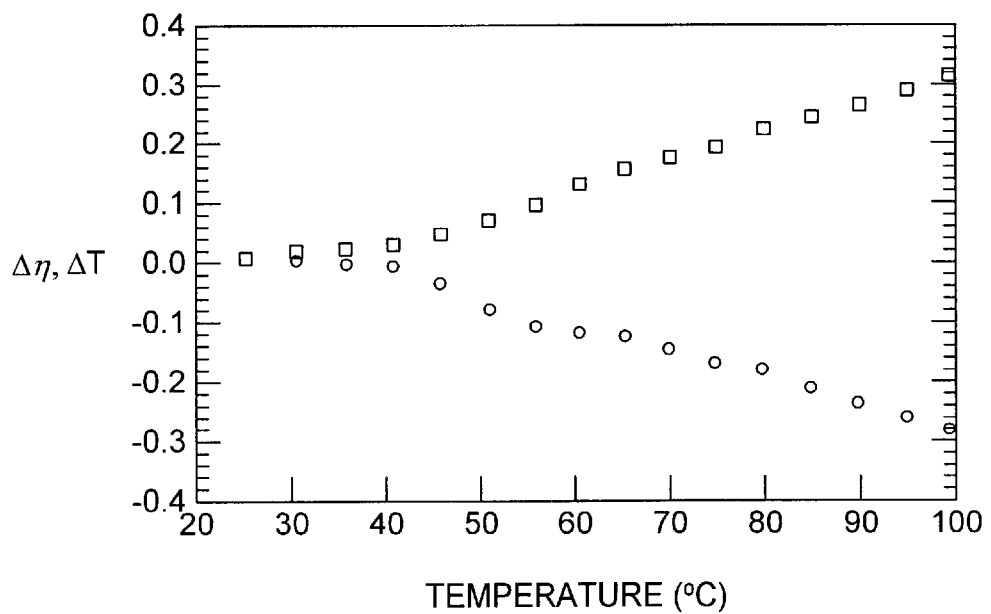
FIG. 6 is a graph of the normalized net transmittance and the normalized net diffraction efficiency of a hologram.

Smaller liquid crystal droplet sizes have the problem that it takes high switching voltages to switch their orientation. As described in the previous paragraph, using alternating current switching voltages at high frequencies helps reduce the needed switching voltage. As demonstrated in FIG. 4, it has been found that adding a surfactant (e.g., octanoic acid) the prepolymer material in amounts of about 4%–6% by weight of the total mixture results in sample holograms with switching voltages near 50 Vrms at lower frequencies of 1–2 kHz. As shown in FIG. 5, it has also been found that the use of the surfactant with the associated reduction in droplet size, reduces the switching time of the PDLC materials. Thus, samples made with surfactant may be switched on the order of 25–44 microseconds. Without wishing to be bound by any theory, the surfactant is believed to reduce switching voltages by reducing the anchoring of the liquid crystals at the interface between liquid crystal and cured polymer.

Thermal control of diffraction efficiency is illustrated in FIG. 5. FIG. 5 is a graph of the normalized net transmittance and normalized net diffraction efficiency of a hologram made according to the teachings of this disclosure versus temperature.

The polymer dispersed liquid crystal materials described herein successfully demonstrate the utility for recording volume holograms of a particular composition for such polymer dispersed liquid crystal systems.

Figure 7:
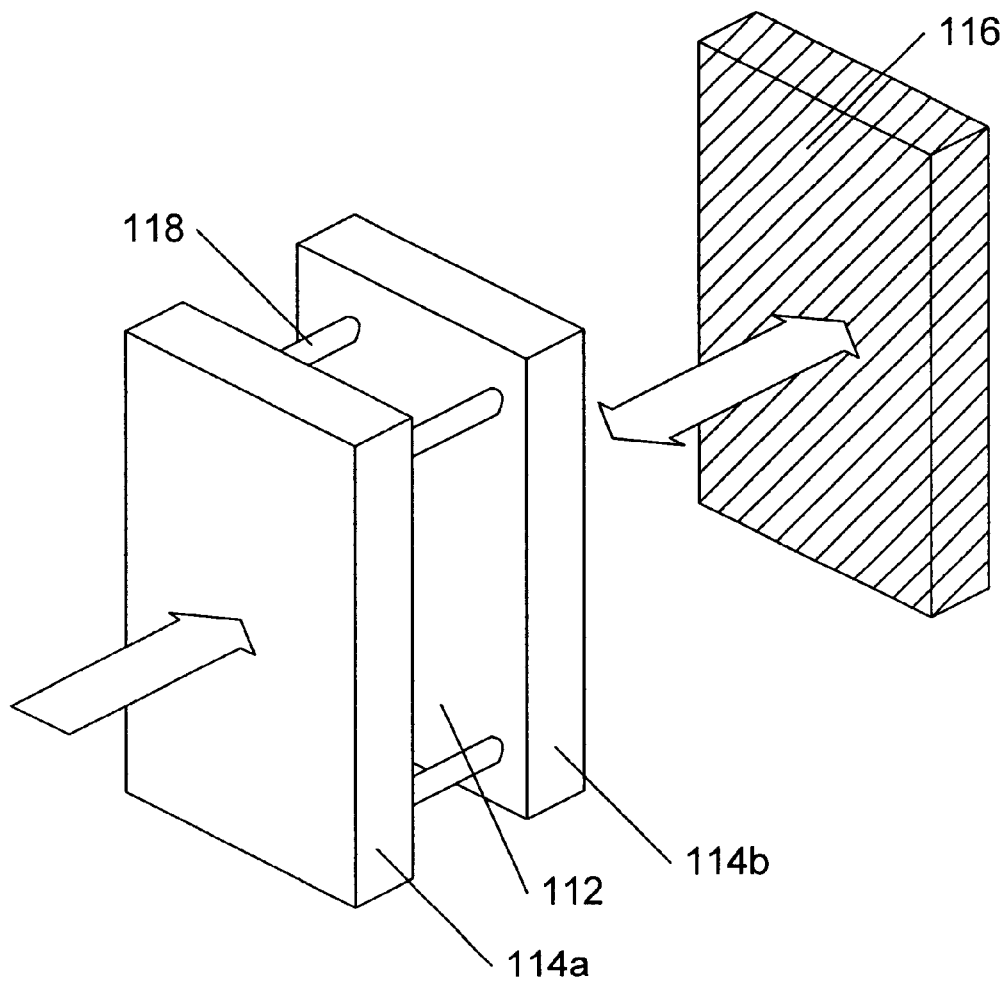
FIG. 7 is an elevational view of typical experimental arrangement for recording reflection gratings.

As shown in FIG. 7, a PDLC reflection grating is prepared by placing several drops of the mixture of prepolymer material 112 on an indium-tin oxide coated glass slide 114a. A second indium-tin oxide coated slide 114b is then pressed against the first, thereby causing the prepolymer material 112 to fill the region between the slides 114a and 114b. Preferably, the separation of the slides is maintained at approximately 20 $\mu m$ by utilizing uniform spacers 118. Preparation, mixing and transfer of the prepolymer material is preferably done in the dark. Once assembled, a mirror 116 may be placed directly behind the glass plate 114b. The distance of the mirror from the sample is preferably substantially shorter than the coherence length of the laser. The PDLC material is preferably exposed to the 488 nm line of an argon-ion laser, expanded to fill the entire plane of the glass plate, with an intensity of approximately 0.1–100 mWatts/cm$^2$ with typical exposure times of 30–120 seconds. Constructive and destructive interference within the expanded beam establishes a periodic intensity profile through the thickness of the film.

In one embodiment, the prepolymer material utilized to make a reflection grating comprises a monomer, a liquid crystal, a cross-linking monomer, a coinitiator, and a photoinitiator dye. The reflection grating may be formed from prepolymer material including by total weight of the monomer dipentaerythritol hydroxypentacrylate (DPHA), 35% by total weight of a liquid crystal including a mixture of cyano biphenyls (known commercially as "E7"), 10% by total weight of a cross-linking monomer including N-vinylpyrrolidinone ("NVP"), 2.5% by weight of the coinitiator N-phenylglycine ("NPG"), and $10^{-5}$ to $10^{-6}$ gram moles of a photoinitiator dye including rose bengal ester. Further, as with transmission gratings, the addition of surfactants is expected to facilitate the same advantageous properties discussed above in connection with transmission gratings. It is also expected that similar ranges and variation of prepolymer starting material will find ready application in the formation of suitable reflection gratings.

Figure 8A:
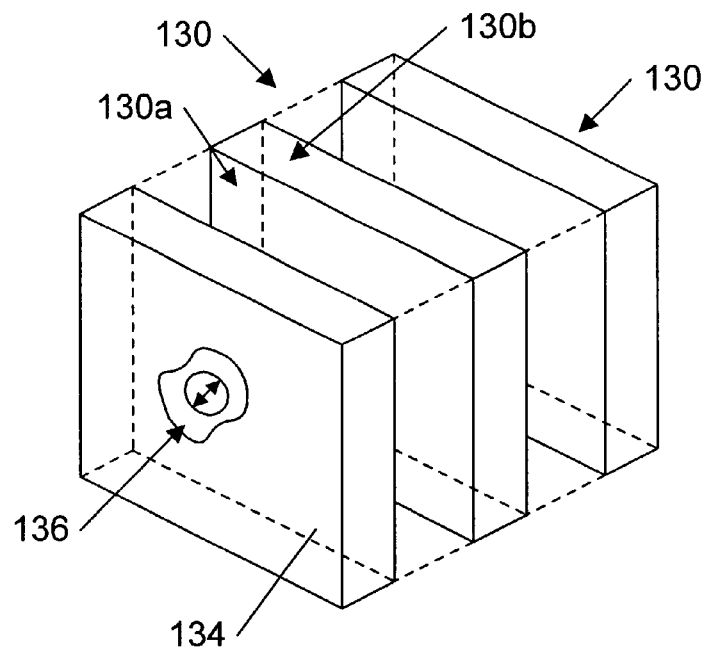
FIGS. 8a and 8b are elevational views of a reflection grating, made in accordance with the teachings of the description herein, having periodic planes of polymer channels and PDLC channels disposed parallel to the front surface in the absence of a field (FIG. 8a) and with an electric field applied (FIG. 8b) wherein the liquid-crystal utilized in the formation of the grating has a positive dielectric anisotropy.

It has been determined by low voltage, high resolution scanning electron microscopy ("LVHRSEM") that the resulting material comprises a fine grating with a periodicity of 165 nm with the grating vector perpendicular to the plane of the surface. Thus, as shown schematically in FIG. 8a, grating 130 includes periodic planes of polymer channels 130a and PDLC channels 130b which run parallel to the front surface 134. The grating spacing associated with these periodic planes remains relatively constant throughout the full thickness of the sample from the air/film to the film/substrate interface.

Although interference is used to prepare both transmission and reflection gratings, the morphology of the reflection grating differs significantly. In particular, it has been determined that, unlike transmission gratings with similar liquid crystal concentrations, very little coalescence of individual droplets was evident. Further more, the droplets that were present in the material were significantly smaller having diameters between 50 and 100 nm. Furthermore, unlike transmission gratings where the liquid crystal-rich regions typically comprise less than 40% of the grating, the liquid crystal-rich component of a reflection grating is significantly larger. Due to the much smaller periodicity associated with reflection gratings, i.e., a narrower grating spacing (~0.2 microns), it is believed that the time difference between completion of curing in high intensity versus low intensity regions is much smaller. It is also believed that the fast polymerization, as evidenced by small droplet diameters, traps a significant percentage of the liquid crystal in the matrix during gelation and precludes any substantial growth of large droplets or diffusion of small droplets into larger domains.

Analysis of the reflection notch in the absorbance spectrum supports the conclusion that a periodic refractive index modulation is disposed through the thickness of the film. In PDLC materials that are formed with the 488 nm line of an argon ion laser, the reflection notch typically has a reflection wavelength at approximately 472 nm for normal incidence and a relatively narrow bandwidth. The small difference between the writing wavelength and the reflection wavelength (approximately 5%) indicates that shrinkage of the film is not a significant problem. Moreover, it has been found that the performance of such gratings is stable over periods of many months.

In addition to the materials utilized in the one embodiment described above, it is believed that suitable PDLC materials could be prepared utilizing monomers such as triethyleneglycol diacrylate, trimethylolpropanetriacrylate, pentaerythritol triacrylate, pentaerythritol tetracrylate, pentaerythritol pentacrylate, and the like. Similarly, other coinitiators such as triethylamine, triethanolamine, N,N-dimethyl-2,6-diisopropylaniline, and the like could be used instead of N-phenylglycine. Where it is desirable to use the 458 nm, 476 nm, 488 nm or 514 nm lines of an Argon ion laser, the photoinitiator dyes rose bengal sodium salt, eosin, eosin sodium salt, fluorescein sodium salt and the like will give favorable results. Where the 633 nm line is utilized, methylene blue will find ready application. Finally, it is believed that other liquid crystals such as 4'-pentyl-4-cyanobiphenyl or 4'-heptyl-4-cyanobiphenyl, may be utilized.

Figure 8B:
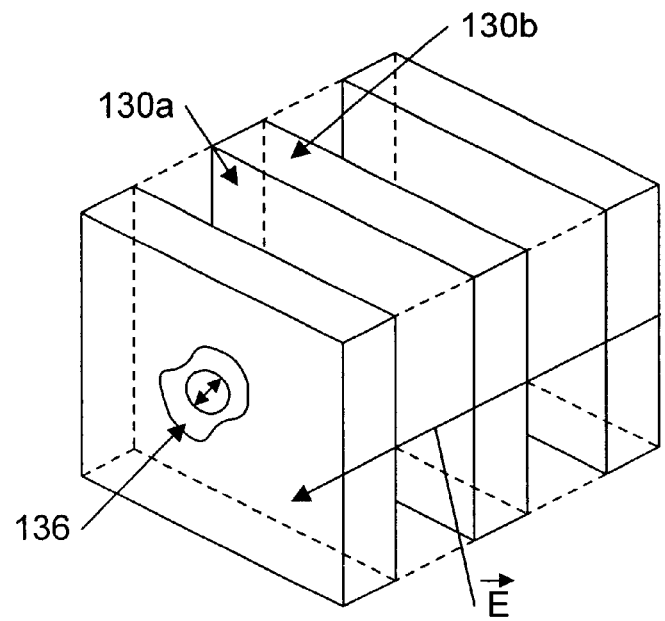

Referring again to FIG. 8a, there is shown an elevational view of a reflection grating 130 made in accordance with this disclosure having periodic planes of polymer channels 130a and PDLC channels 130b disposed parallel to the front surface 134 of the grating 130. The symmetry axis 136 of the liquid crystal domains is formed in a direction perpendicular to the periodic channels 130a and 130b of the grating 130 and perpendicular to the front surface 134 of the grating 130. Thus, when an electric field E is applied, as shown in FIG. 8b, the symmetry axis 136 is already in a low energy state in alignment with the field E and will reorient. Thus, reflection gratings formed in accordance with the procedure described above will not normally be switchable.

In general, a reflection grating tends to reflect a narrow wavelength band, such that the grating may be used as a reflection filter. In one embodiment, however, the reflection grating is formed so that it will be switchable. More particularly, switchable reflection gratings may be made utilizing negative dielectric anisotropy LCs (or LCs with a low cross-over frequency), an applied magnetic field, an applied shear stress field, or slanted gratings.

Figure 9A:
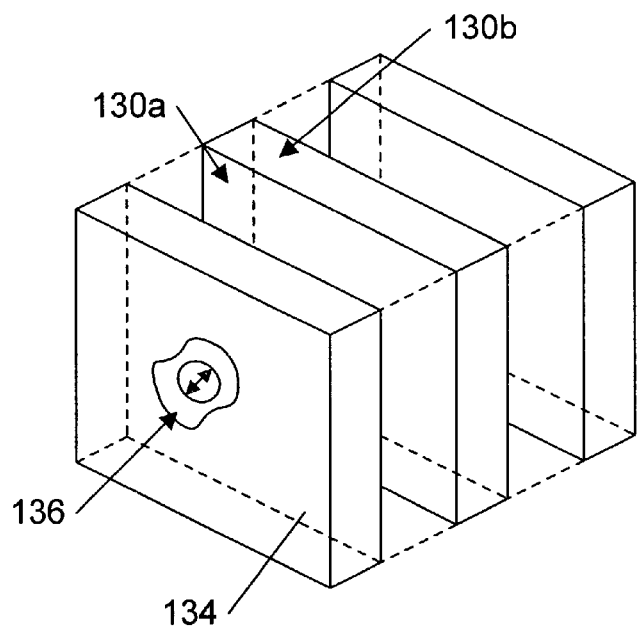
FIGS. 9a and 9b are elevational views of a reflection grating, made in accordance with the teachings of the description herein, having periodic planes of polymer channels and PDLC channels disposed parallel to the front surface of the grating in the absence of an electric field (FIG. 9a) and with an electric field applied (FIG. 9b) wherein the liquid crystal utilized in the formation of the grating has a negative dielectric anisotropy.
Figure 9B:
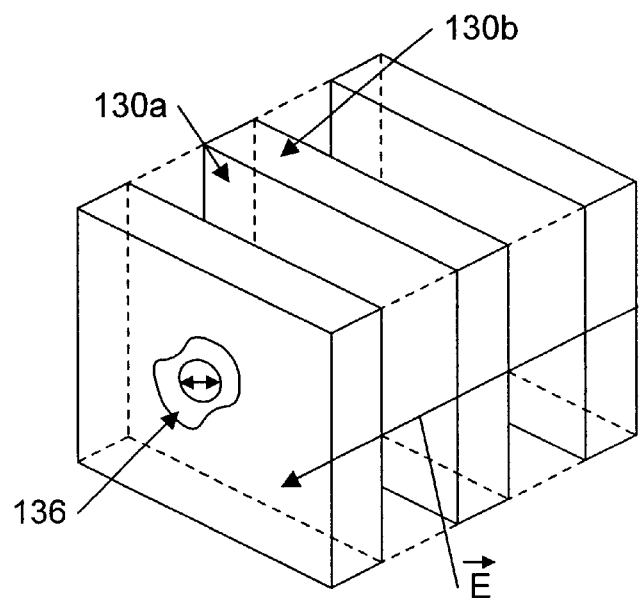
Figure 9C:
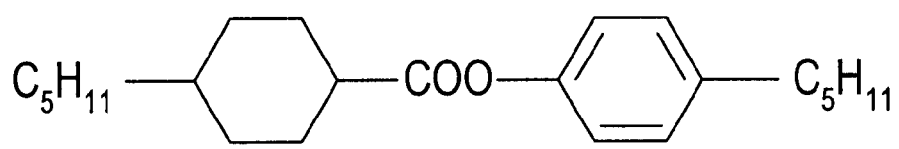
FIGS. 9c and 9d depict chemical formulas of various types of liquid crystal materials.
Figure 9C:
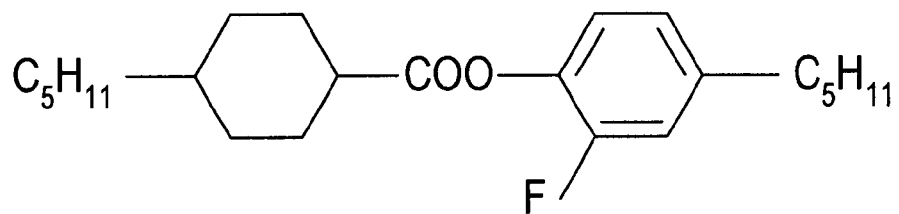
Figure 9C:
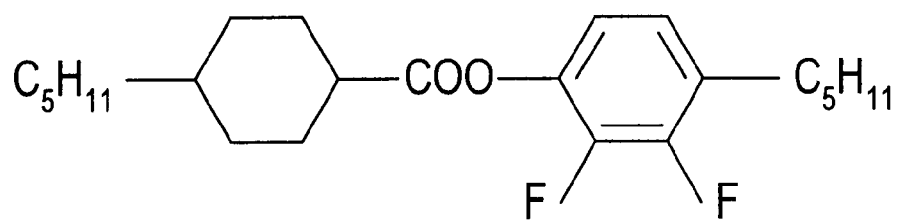
Figure 9C:
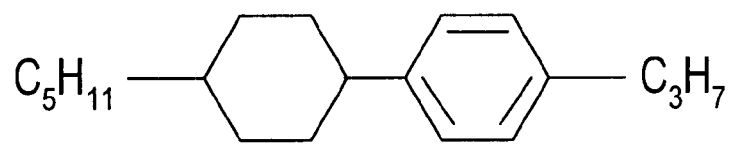
Figure 9C:
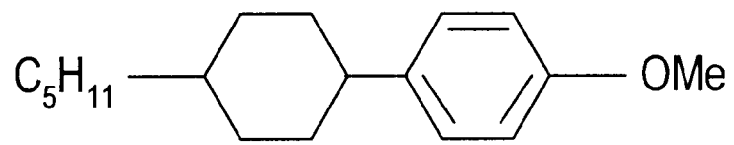

It is known that liquid crystals having a negative dielectric anisotropy ($\Delta\epsilon$) will rotate in a direction perpendicular to an applied field. As shown in FIG. 9a, the symmetry axis 136 of the liquid crystal domains formed with a liquid crystal having a negative $\Delta\epsilon$ will also be disposed in a direction perpendicular to the periodic channels 130a and 130b of the grating 130 and to the front surface 135 of the grating. However, when an electric field E is applied across such gratings, as shown in FIG. 9b, the symmetry axis of the negative $\Delta\epsilon$ liquid crystal will distort and reorient in a direction perpendicular to the field E, which is perpendicular to the film and the periodic planes of the grating. As a result, the reflection grating may be switched between a state where it is reflective and a state where it is transmissive. FIG. 9c depicts some examples of negative $\Delta\epsilon$ liquid crystals which may be in the methods and devices described herein.

Figure 9D:
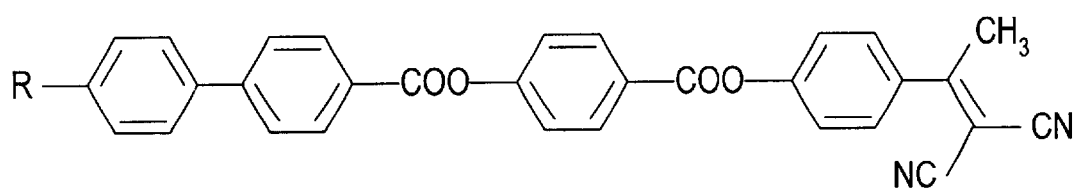
Figure 9D:
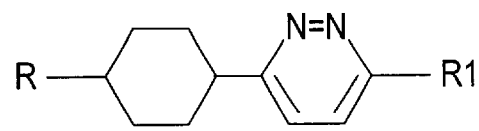

Liquid crystals may be found in nature (or synthesized) with either positive or negative $\Delta\epsilon$. Thus, it is possible to use a LC which has a positive $\Delta\epsilon$ at low frequencies, but becomes negative at high frequencies. The frequency (of the applied voltage) at which $\Delta\epsilon$ changes sign is called the cross-over frequency. The cross-over frequency will vary with LC composition, and typical values range from 1–10 kHz. Thus, by operating at the proper frequency, the reflection grating may be switched. It is expected that low crossover frequency materials may be prepared from a combination of positive and negative dielectric anisotropy liquid crystals. A suitable positive dielectric liquid crystal for use in such a combination contains four ring esters as shown in FIG. 9D. A strongly negative dielectric liquid crystal suitable for use in such a combination is made up of pyridazines as shown in FIG. 9D. Both liquid crystal materials are available from LaRoche & Co., Switzerland. By varying the proportion of the positive and negative liquid crystals in the combination, crossover frequencies form 1.4–2.3 kHz are obtained at room temperature. Another combination suitable for use in the present embodiment is a combination of the following: p-pentylphenyl-2-chloro-4-(p-pentylbenzoyloxy) benzoate and benzoate. These materials are available from Kodak Company.

In still more detailed aspects, switchable reflection gratings may be formed using positive $\Delta\epsilon$ liquid crystals. As shown in FIG. 10a, such gratings are formed by exposing the PDLC starting material to a magnetic field during the curing process. The magnetic field may be generated by the use of Helmholtz coils (as shown in FIG. 10a), the use of a permanent magnet, or other suitable means. Preferably, the magnetic field M is oriented parallel to the front surface of the glass plates (not shown) that are used to form the grating 140. As a result, the symmetry axis 146 of the liquid crystals will orient along the field while the mixture is fluid. When polymerization is complete, the field may be removed and the alignment of the symmetry axis of the liquid crystals will remain unchanged. (See FIG. 10b.) When an electric field is applied, as shown in FIG. 10c the positive $\Delta\epsilon$ liquid crystal will reorient in the direction of the field, which is perpendicular to the front surface of grating and to the periodic channels of the grating.

FIG. 11a depicts a slanted transmission grating 148 and FIG. 11b depicts a slanted reflection grating 150. A holographic transmission grating is considered slanted if the direction of the grating vector G is not parallel to the grating surface. In a holographic reflection grating, the grating is said to be slanted if the grating vector G is not perpendicular to the grating surface. Slanted gratings have many of the same uses as nonslanted grating such as visual displays, mirrors, line filters, optical switches, and the like.

Primarily, slanted holographic gratings are used to control the direction of a diffracted beam. For example, in reflection holograms a slanted grating is used to separate the specular reflection of the film from the diffracted beam. In a PDLC holographic grating, a slanted grating has an even more useful advantage. The slant allows the modulation depth of the grating to be controlled by an electric field when using either tangential or homeotropic aligned liquid crystals. This is because the slant provides components of the electric field in the directions both tangent and perpendicular to the grating vector. In particular, for the reflection grating, the LC domain symmetry axis will be oriented along the grating vector G and may be switched to a direction perpendicular to the film plane by a longitudinally applied field E. This is the typical geometry for switching of the diffraction efficiency of the slanted reflection grating.

When recording slanted reflection gratings, it is desirable to place the sample between the hypotenuses of two right-angle glass prisms. Neutral density filters may then be placed in optical contact with the back faces of the prisms using index matching fluids so as to frustrate back reflections which would cause spurious gratings to also be recorded. The incident laser beam is split by a conventional beam splitter into two beams which are then directed to the front faces of the prisms, and then overlapped in the sample at the desired angle. The beams thus enter the sample from opposite sides. This prism coupling technique permits the light to enter the sample at greater angles. The slant of the resulting grating is determined by the angle which the prism assembly is rotated (i.e., the angle between the direction of one incident beam an the normal to the prism front face at which that beam enters the prism).

As shown in FIG. 12, switchable reflection gratings may be formed in the presence of an applied shear stress field. In this method, a shear stress would be applied along the direction of a magnetic field M. This could be accomplished, for example, by applying equal and opposite tensions to the two ITO coated glass plates which sandwich the prepolymer mixture while the polymer is still soft. This shear stress would distort the LC domains in the direction of the stress, and the resultant LC domain symmetry axis will be preferentially along the direction of the stress, parallel to the PDLC planes and perpendicular to the direction of the applied electric field for switching.

Reflection grating prepared in accordance with this description may find application in color reflective displays, switchable wavelength filters for laser protection, reflective optical elements and the like.

Figure 13:
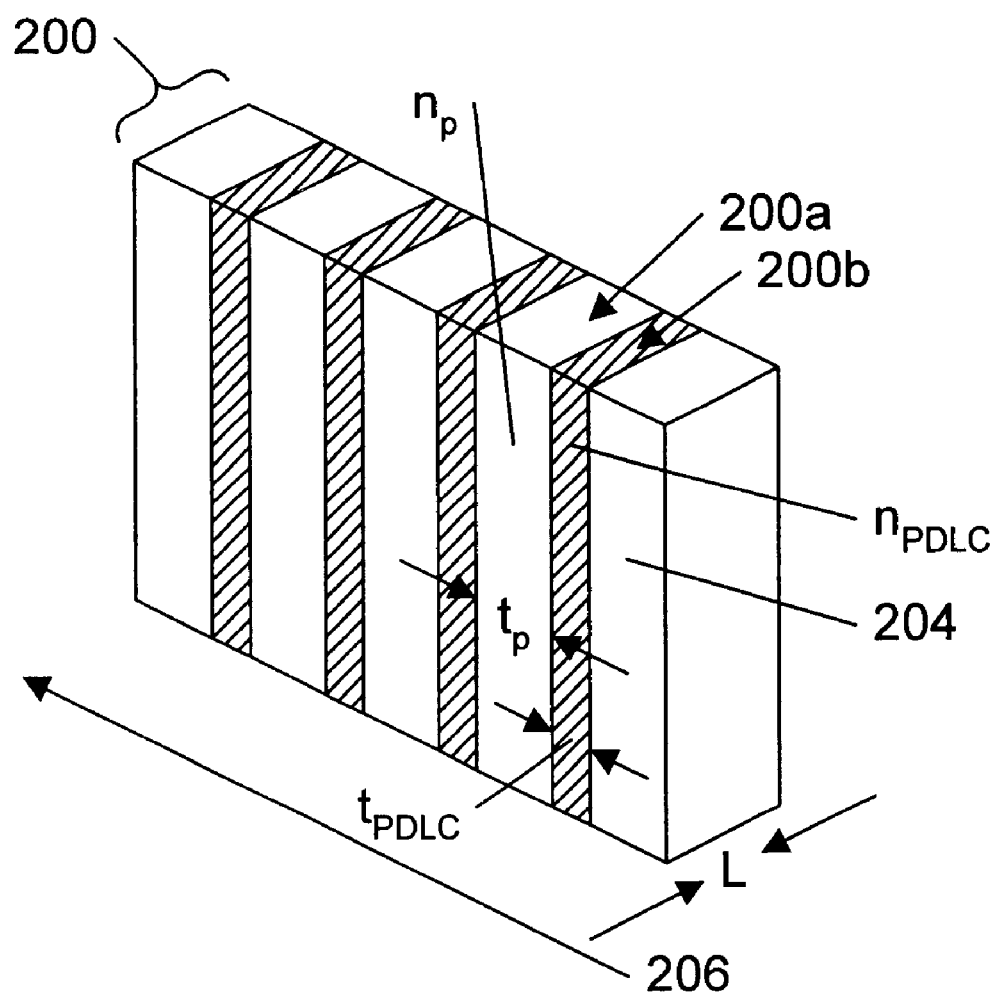
FIG. 13 is an elevational view of a subwavelength grating, made in accordance with the teachings of the description herein, having periodic planes of polymer channels and PDLC channels disposed perpendicular to the front surface of the grating.

In one embodiment, PDLC materials may be made that exhibit a property known as form birefringence whereby polarized light that is transmitted through the grating will have its polarization modified. Such gratings are known as subwavelength gratings, and they behave like a negative uniaxial crystal, such as calcite, potassium dihydrogen phosphate, or lithium niobate, with an optic axis perpendicular to the PDLC planes. Referring now to FIG. 13, there is shown an elevational view of a transmission grating 200 made in accordance with this description having periodic planes of polymer planes 200a and PDLC planes 200b disposed perpendicular to the front surface 204 of the grating 200. The optic axis 206 is disposed perpendicular to polymer planes 200a and the PDLC planes 200b. Each polymer plane 200a has a thickness $t_p$ and refractive index $n_p$, and each PDLC plane 200b has a thickness $t_{PDLC}$ and refractive index $n_{PDLC}$.

Where the combined thickness of the PDLC plane and the polymer plane is substantially less than an optical wavelength (i.e. $(t_{PDLC}+t_p)<<\lambda$), the grating will exhibit form birefringence. As discussed below, the magnitude of the shift in polarization is proportional to the length of the grating. Thus, by carefully selecting the length, L, of the subwavelength grating for a given wavelength of light, one may rotate the plane of polarization or create circularly polarized light. Consequently, such subwavelength gratings may be designed to act as a half-wave or quarter-wave plate, respectively. Thus, an advantage of this process is that the birefringence of the material may be controlled by simple design parameters and optimized to a particular wavelength, rather than relying on the given birefringence of any material at that wavelength.

To form a half-wave plate, the retardance of the subwavelength grating must be equal to one-half of a wavelength, i.e. retardance=$\lambda/2$, and to form a quarter-wave plate, the retardance must be equal to one-quarter of a wavelength, i.e. retardance=$\lambda/4$. It is known that the retardance is related to the net birefringence, $|\Delta n|$, which is the difference between the ordinary index of refraction, $n_o$, and the extraordinary index of refraction $n_e$, of the sub-wavelength grating by the following relation:

$$\text{Retardance}=|\Delta n|L=|n_e-n_o|L$$

Thus, for a half-wave plate, i.e. a retardation equal to one-half of a wavelength, the length of the subwavelength grating should be selected so that:

$$L=\lambda/(2|\Delta n|)$$

Similarly, for a quarter-wave plate, i.e. a retardance equal to one-quarter of a wavelength, the length of the subwavelength grating should be selected so that:

$$L=\lambda/(4|\Delta n|)$$

Figure 14A:
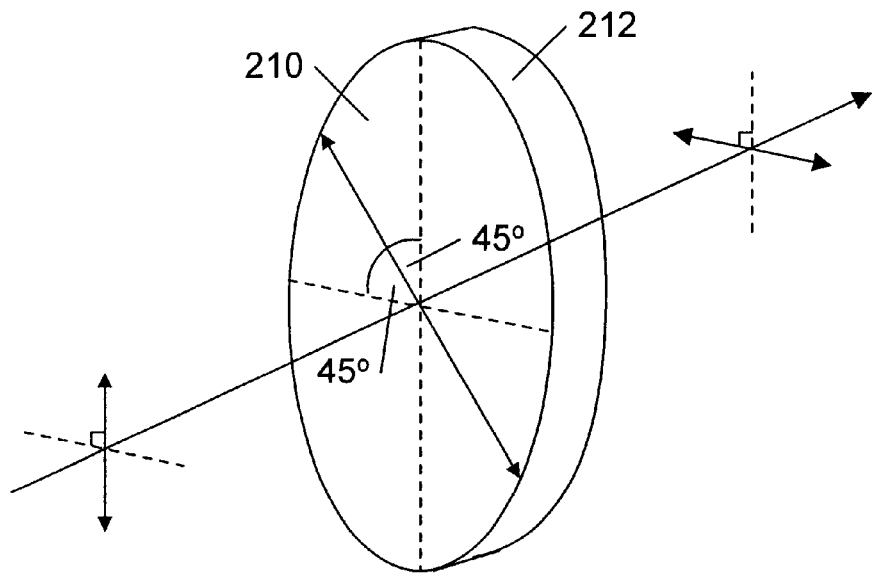
FIG. 14a) is an elevational view of a switchable subwavelength, made in accordance with the teachings of the description herein, wherein the subwavelength grating functions as a half wave plate whereby the polarization of the incident radiation is rotated by 90°.
Figure 14B:
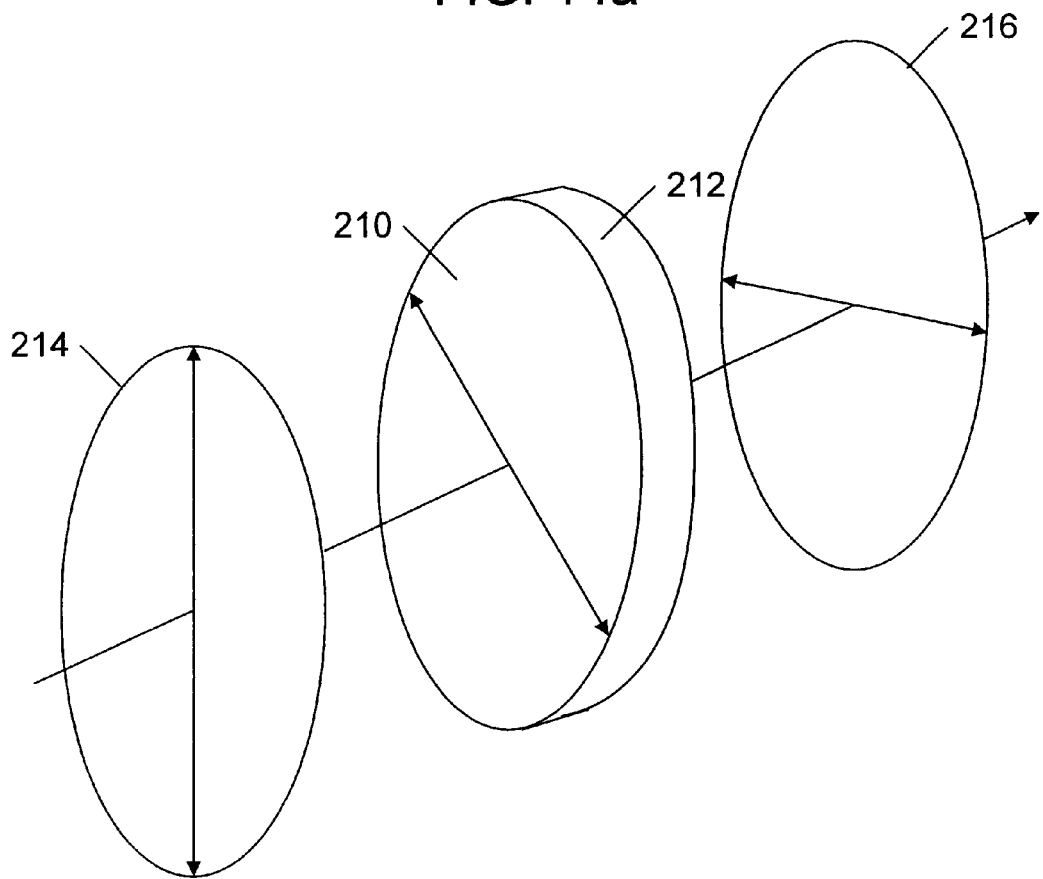
FIG. 14b) is an elevational view of the switchable half wave plate shown in FIG. 14a) disposed between crossed polarizers whereby the incident light is transmitted.
Figure 14C:
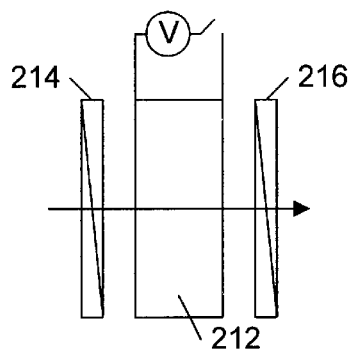
FIGS. 14c) and 14d) are side views of the switchable half wave plate and crossed polarizes shown in FIG. 14b) and showing the effect of the application of a voltage to the plate whereby the polarization of the light is no longer rotated and thus blocked by the second polarizer.
Figure 14D:
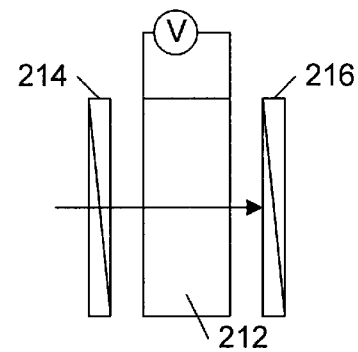

If, for example, the polarization of the incident light is at an angle of 45° with respect to the optic axis 210 of a half-wave plate 212, as shown in FIG. 14a, the plane polarization will be preserved, but the polarization of the wave exiting the plate will be shifted by 90°. Thus, referring now to FIG. 14b) and 14c, where the half-wave plate 212 is placed between cross polarizers 214 and 216, the incident light will be transmitted. If an appropriate switching voltage is applied, as shown in FIG. 14d, the polarization of the light is not rotated and the light will be blocked by the second polarizer.

Figure 15A:
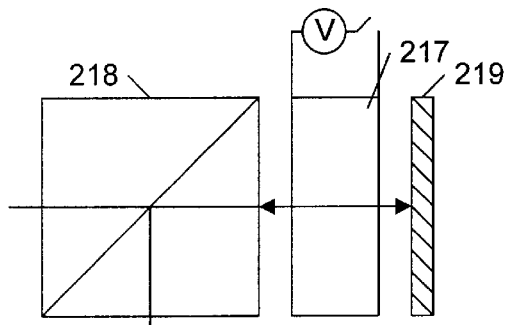
FIG. 15a) is a side view of a switchable subwavelength grating, made in accordance with the teachings of the description herein, wherein the subwavelength grating functions as a quarter wave plate whereby plane polarized light is transmitted through the subwavelength grating, retroreflected by a mirror and reflected by the beam splitter.
Figure 15B:
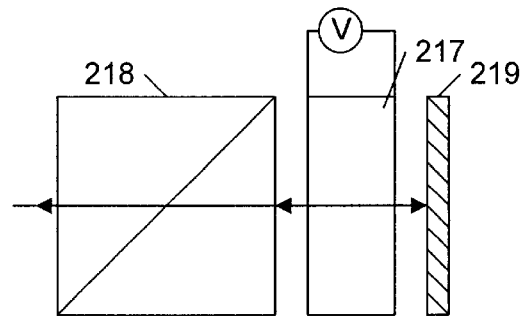
FIG. 15b) is a side view of the switchable subwavelength grating of FIG. 15a) and showing the effect of the application of a voltage to the plate whereby the polarization of the light is no longer modified, thereby permitting the reflected light to pass through the beam splitter.

For a quarter wave plate plane polarized light is converted to circularly polarized light. Thus, referring now to FIG. 15a, where quarter wave plate 217 is placed between a polarizing beam splitter 218 and a mirror 219, the reflected light will be reflected by the beam splitter 218. If an appropriate switching voltage is applied, as shown in FIG. 15b, the reflected light will pass through the beam splitter and be retroreflected on the incident beam.

Figure 16A:
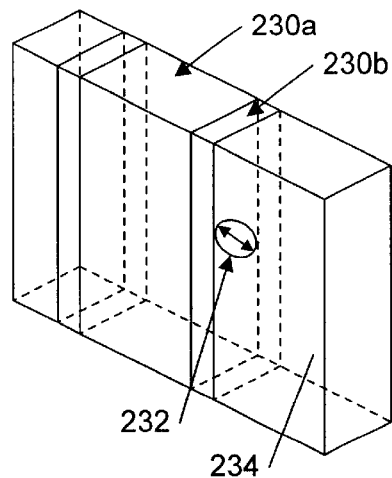
FIGS. 16a) and 16b) are elevational views of a transmission grating, made in accordance with the teachings of the description herein, having periodic planes of polymer channels and PDLC channels disposed perpendicular to the front face of the grating in the absence of an electric field (FIG. 16a) and with an electric field applied (FIG. 16b) wherein the liquid crystal utilized in formation of the grating has a positive dielectric anisotropy.
Figure 16B:
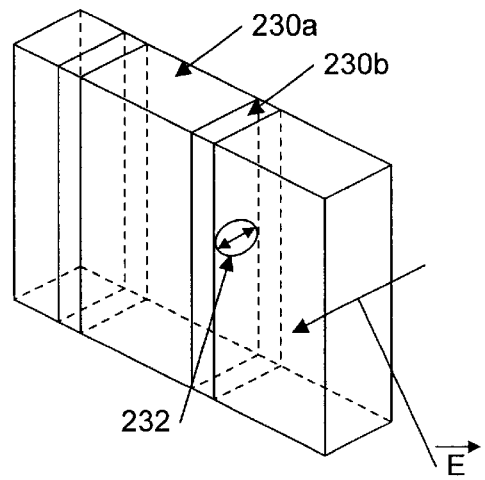

Referring now to FIG. 16a, there is shown an elevational view of a subwavelength grating 230 recorded in accordance with the above-described methods and having periodic planes of polymer channels 230a and PDLC channels 230b disposed perpendicular to the front surface 234 of grating 230. As shown in FIG. 16a, the symmetry axis 232 of the liquid crystal domains is disposed in a direction parallel to the front surface 234 of the grating and perpendicular to the periodic channels 230a and 230b of the grating 230. Thus, when an electric field E is applied across the grating, as shown in FIG. 15b, the symmetry axis 232 distorts and reorients in a direction along the field E, which is perpendicular to the front surface 234 of the grating and parallel to the periodic channels 230a and 230b of the grating 230. As a result, subwavelength grating 230 may be switched between a state where it changes the polarization of the incident radiation and a state in which it does not. Without wishing to be bound by any theory, it is currently believed that the direction of the liquid crystal domain symmetry 232 is due to a surface tension gradient which occurs as a result of the anisotropic diffusion of monomer and liquid crystal during recording of the grating and that this gradient causes the liquid crystal domain symmetry to orient in a direction perpendicular to the periodic planes.

As discussed in Born and Wolf, Principles of Optics, 5$^{th}$ Ed., New York (1975) and incorporated herein by reference, the birefringence of a subwavelength grating is given by the following relation:

$$n_e^2 - n_o^2 = -[(f_{PDLC})(f_P)(n_{PDLC}^2 - n_p^2)]/[f_{PDLC}n_{PDLC}^2 + f_P n_p^2]$$

Where
  $n_o$=the ordinary index of refraction of the subwavelength grating;
  $n_e$=the extraordinary index of refraction;
  $n_{PDLC}$=the refractive index of the PDLC plane;
  $n_P$=the refractive index of the polymer plane
  $n_{LC}$=the effective refractive index of the liquid crystal seen by an incident optical wave;
  $f_{PDLC}=t_{PDLC}/(t_{PDLC}+t_P)$
  $f_P=t_P/(t_{PDLC}+t_P)$
Thus, the net birefringence of the subwavelength grating will be zero if $n_{PDLC}=n_p$.

It is known that the effective refractive index of the liquid crystal, $n_{LC}$, is a function of the applied electric field, having a maximum when the field is zero and value equal to that of the polymer, $n_p$, at some value of the electric field, $E_{MAX}$. Thus, by application of an electric field, the refractive index of the liquid crystal, $n_{LC}$, and, hence, the refractive index of the PDLC plane may be altered. Using the relationship set forth above, the net birefringence of a subwavelength grating will be a minimum when $n_{PDLC}$ is equal to $n_p$, i.e. when $n_{LC}=n_p$. Therefore, if the refractive index of the PDLC plane may be matched to the refractive index of the polymer plane, i.e. $n_{PDLC}=n_p$, by the application of an electric field, the birefringence of the subwavelength grating may be switched off.

The following equation for net birefringence, i.e. $|\Delta n = |n_e - n_o|$, follows from the equation given in Born and Wolf (reproduced above):

$$\Delta n = -[(f_{PDLC})(f_P)(n_{PDLC}^2 - n_p^2)]/[2n_{AVG}(f_{PDLC}n_{PDLC}^2 + f_P n_p^2)]$$

where $n_{AVG}=(n_e+n_o)/2$

Furthermore, it is known that the refractive index of the PDLC plane $n_{PDLC}$ is related to the effective refractive index of the liquid crystal seen by an incident optical wave, $n_{LC}$, and the refractive index of the surrounding polymer plane, $n_p$, by the following relation:

$$N_{PDLC}=n_p+f_{LC}[n_{LC}-n_P]$$

Where $f_{LC}$ is the volume fraction of liquid crystal dispersed in the polymer within the PDLC plane, $f_{LC}=[V_{LC}/(V_{LC}+V_P)]$.

By way of example, a typical value for the effective refractive index for the liquid crystal in the absence of an electric field is $n_{LC}=1.7$, and for the polymer layer $n_P=1.5$. For the grating where the thickness of the PDLC planes and the polymer planes are equal (i.e. $t_{PDLC}=t_P$, $f_{PDLC}=0.5=f_P$) and $f_{LC}=0.35$, the net birefringence, $\Delta n$, of the subwavelength grating is approximately 0.008. Thus, where the incident light has a wavelength of 0.8 μm, the length of the subwavelength grating should be 50 μm for a half-wave plate and a 25 μm for a quarter-wave plate. Furthermore, by application of an electric field of approximately 5 V/μm, the refractive index of the liquid crystal may be matched to the refractive index of the polymer and the birefringence of the subwavelength grating turned off. Thus, the switching voltage, $V_n$, for a half-wave plate is on the order of 250 volts, and for a quarter-wave plate approximately 125 volts.

By applying such voltages, the plates may be switched between the on and off (zero retardance) states on the order of microseconds. As a means of comparison, current Pockels cell technology may be switched in nanoseconds with voltages of approximately 1000–2000 volts, and bulk nematic liquid crystals may be switched on the order of milliseconds with voltages of approximately 5 volts.

Figure 17:
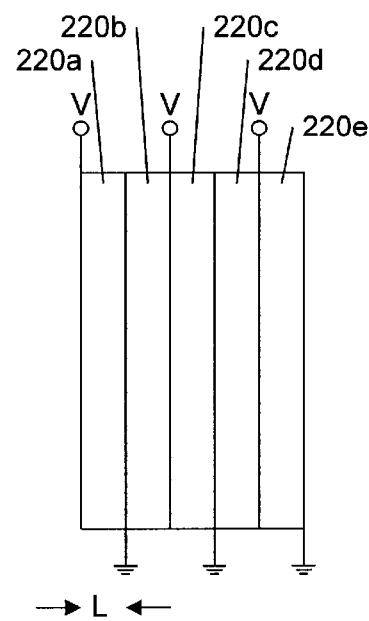
FIG. 17 is a side view of five subwavelength gratings wherein the gratings are stacked and connected electrically in parallel thereby reducing the switching voltage of the subwavelength grating.

In an alternative embodiment, as shown in FIG. 17, the switching voltage of the subwavelength grating may be reduced by stacking several subwavelength gratings 220a–220e together, and connecting them electrically in parallel. By way of example, it has been found that a stack of five gratings each with a length of 10 μm yields the thickness required for a half-wave plate. It should be noted that the length of the sample is somewhat greater than 50 μm, because each grating includes an indium-tin-oxide coating which acts as a transparent electrode. The switching voltage for such a stack of plates, however, is only 50 volts.

Subwavelength gratings in accordance with the this description are expected to find suitable application in the areas of polarization optics and optical switches for displays and laser optics, as well as tunable filters for telecommunications, colorimetry, spectroscopy, laser protection, and the like. Similarly, electrically switchable transmission gratings have many applications for which beams of light must be deflected or holographic images switched. Among these applications are: Fiber optic switches, reprogrammable N×N optical interconnects for optical computing, beam steering for laser surgery, beam steering for laser radar, holographic image storage and retrieval, digital zoom optics (switchable holographic lenses), graphic arts and entertainment, and the like. A switchable hologram is one for which the diffraction efficiency of the hologram may be modulated by the application of an electric field, and may be switched from a fully on state (high diffraction efficiency) to a fully off state (low or zero diffraction efficiency). A static hologram is one whose properties remain fixed independent of an applied field. In accordance with this description, a high contrast static hologram may also be created. In this variation of this description, the holograms are recorded as described previously. The cured polymer film is then soaked in a suitable solvent at room temperature for a short duration and finally dried. For the liquid crystal E7, methanol has shown satisfactory application. Other potential solvents include alcohols such as ethanol, hydrocarbons such as hexane and heptane, and the like. When the material is dried, a high contrast status hologram with high diffraction efficiency results. The high diffraction efficiency is a consequence of the large index modulation in the film ($\Delta n$~0.5) because the second phase domains are replaced with empty (air) voids (n~1).

Similarly, in accordance with this description a high birefringence static subwavelength wave-plate may also be formed. Due to the fact that the refractive index for air is significantly lower than for most liquid crystals, the corresponding thickness of the half-wave plate would be reduced accordingly. Synthesized wave-plates in accordance with this description may be used in many applications employing polarization optics, particularly where a material of the appropriate birefringence that the appropriate wavelength is unavailable, too costly, or too bulky.

The term polymer dispersed liquid crystals and polymer dispersed liquid crystal material includes, as may be appropriate, solutions in which none of the monomers have yet polymerized or cured, solutions in which some polymerization has occurred, and solutions which have undergone complete polymerization. Those of skill in the art will clearly understand that the use herein of the standard term used in the art, polymer dispersed liquid crystals (which grammatically refers to liquid crystals dispersed in a fully polymerized matrix) is meant to include all or part of a more grammatically correct prepolymer dispersed liquid crystal material or a more grammatically correct starting material for a polymer dispersed liquid crystal material.

2. System and Method of Increasing the Resolution of a Display Device

Figure 18A:
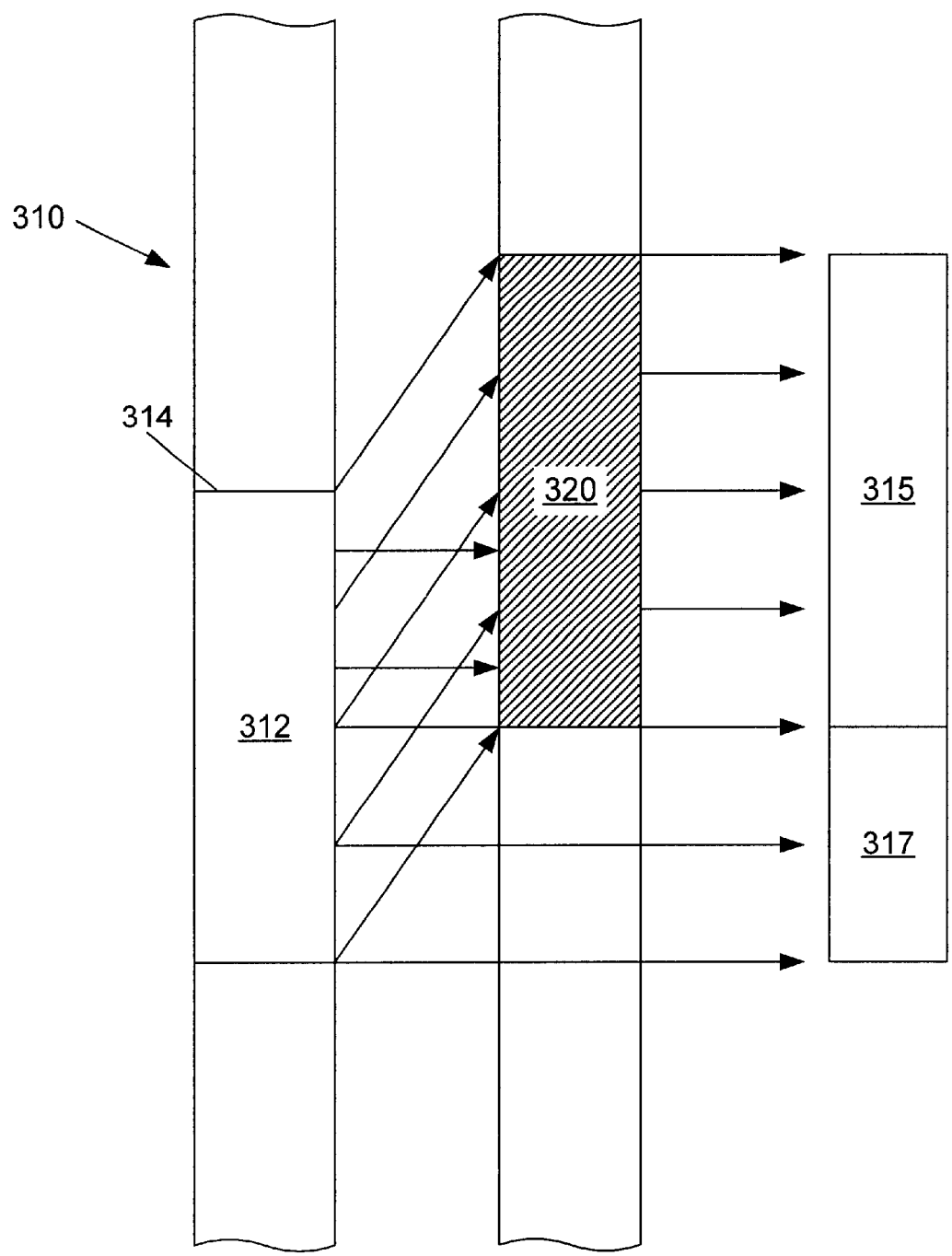
FIGS. 18a and 18b are side views of a display system which includes a holographic optical element positioned in front of and offset from a pixel of a display device.
Figure 18B:
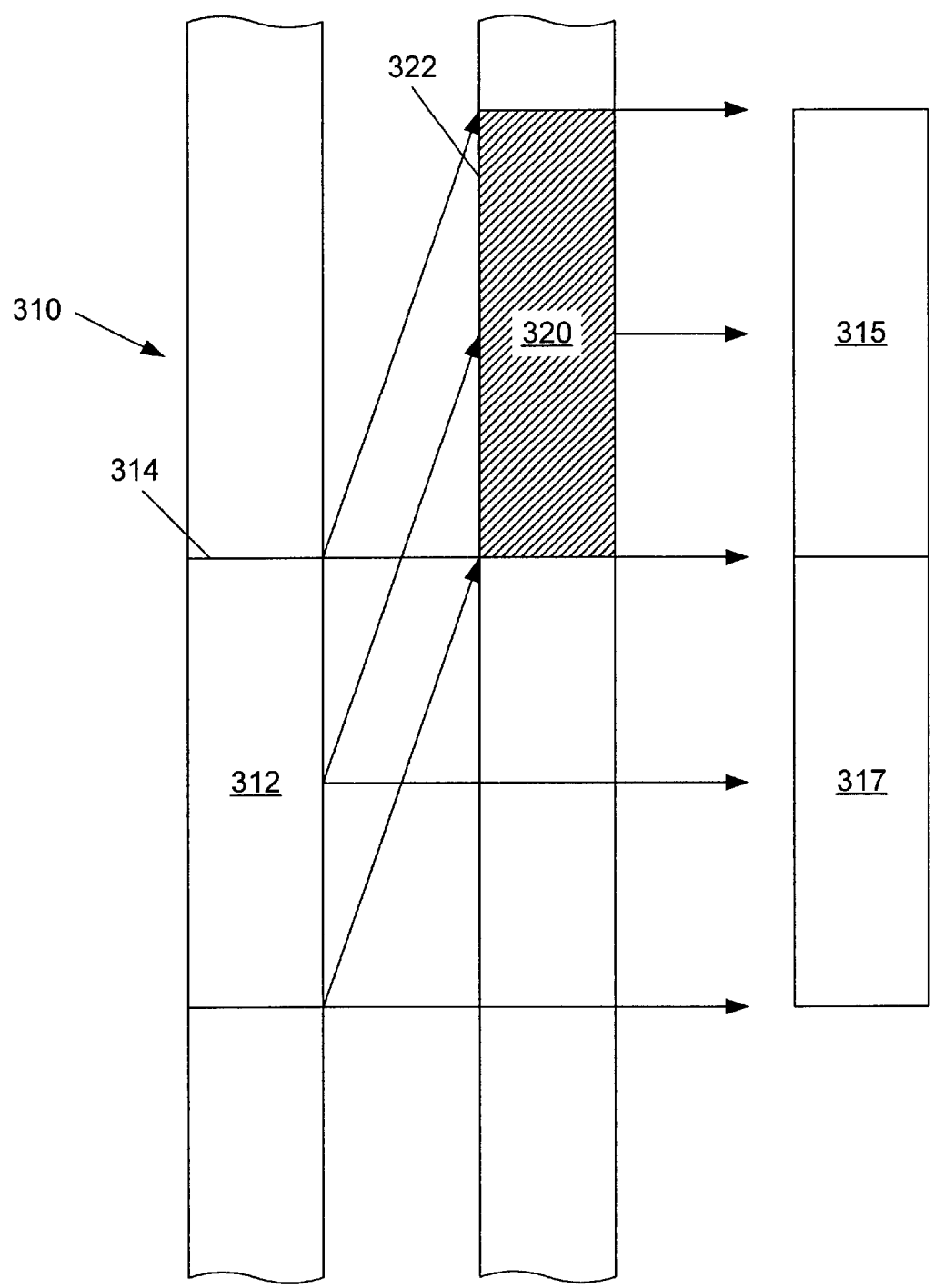

FIGS. 18a and 18b depict cross sections of a display system in which the perceived size of pixels of the display may be increased. A display device 310 includes at least one pixel 312 which emits light. Examples of such display devices include cathode ray tube displays, liquid crystal displays, plasma displays, and digital micromirror displays. Display devices may be used in televisions, visual projection devices, and computer monitors. In an embodiment, the perceived pixel size of a display device may be increased by placing a holographic optical element 320 in front of the pixel 312. As used herein light emanating from the pixel 312 is considered to be moving in a forward direction. Any object that is subsequently struck by the light emanating from the pixel is considered to be "in front of" the pixel. The holographic optical element 320 may be positioned such that at least a portion of the holographic optical element extends beyond the outer boundary 314 of the pixel 312, as depicted in FIG. 18a. Alternatively, the holographic optical element may positioned entirely outside the outer boundary 314 of the pixel 312, as depicted in FIG. 18b. The holographic optical element 320 is configured to be substantially transparent to incident light which strikes the back surface 322 of the holographic optical element at a predefined range of angles. The holographic optical element 320 is further configured to diffract light which is incident upon the back surface 322 at an appropriate angle such that the diffracted light emerges from the holographic optical element substantially normal to the front surface of the holographic optical element. A "normal" direction is herein defined as a perpendicular line drawn from a tangent of an outer surface of an object. Light that strikes the holographic optical element 320 at an angle outside of the predefined range of angles will tend to pass through the optical element without deviation. Alternatively, the optical element may be configured such that a portion of the incident light that strikes the optical element outside the predefined range of angles may be eliminated by total internal reflection at the hologram/air interface, i.e., at the output surface of the holographic optical element. It should be understood that while the holographic optical elements, and other elements described later, appear to be separated from each other, the elements may be actually in contact with each other to form a single integrated layer. While the pixel and holographic optical elements are herein depicted as square shaped, it should be understood that a variety of different shapes may be used, including, but not limited to rectangular, circular and oval shapes. It should also be understood that the pixel and the holographic optical elements may have different shapes and/or sizes.

By using an offset arrangement of the holographic optical element 320 from the pixel 312, the perceived size of a pixel may be increased without altering the size or number of pixels of the display device. As depicted in FIG. 18a and FIG. 18b, a portion of the light emitted from the pixel 312 that propagates mainly in the forward direction will not altered by the holographic optical element 320. Only the light emitted from pixel 312 that is incident on hologram 320 at the appropriate angle will be diffracted by the holographic optical element 320. Light which is emitted from the pixel in a normal direction from the pixel may be inhibited from passing through the holographic optical element 320. The combination of pixel 312 and holographic optical element 320 creates two perceived pixels 315 and 317. In the embodiment depicted in FIG. 18a, the perceived pixels 315 and 317 overlap such that the pixel will appear slightly larger than the actual size of the pixel 312. In the embodiment depicted in FIG. 18b, the combination of perceived pixels 315 and 317 will appear to be about twice the size of the actual pixel 320. Such an enlargement of the pixel 312 may be particularly useful in large display devices in which the resolution is typically controlled by the resolution of the incoming signal. By enlarging the size of the pixel, while maintaining the same resolution, a sharper, less pixelated image may be produced.

The holographic optical element 320 may be a hologram of an optical component which is formed in a receiving material. The hologram receiving material may be a film or a liquid crystal. In one embodiment, a polymer dispersed liquid crystal may be used, such as was described earlier. The use of the holographic systems described earlier may allow the holographic optical element to be formed from a switchable hologram. A number of different optical components may be defined by the hologram of the holographic optical element. Examples of such elements may include diffraction gratings, diffusers, light-shaping diffusers, lenses, prisms, and filters.

Figure 19:
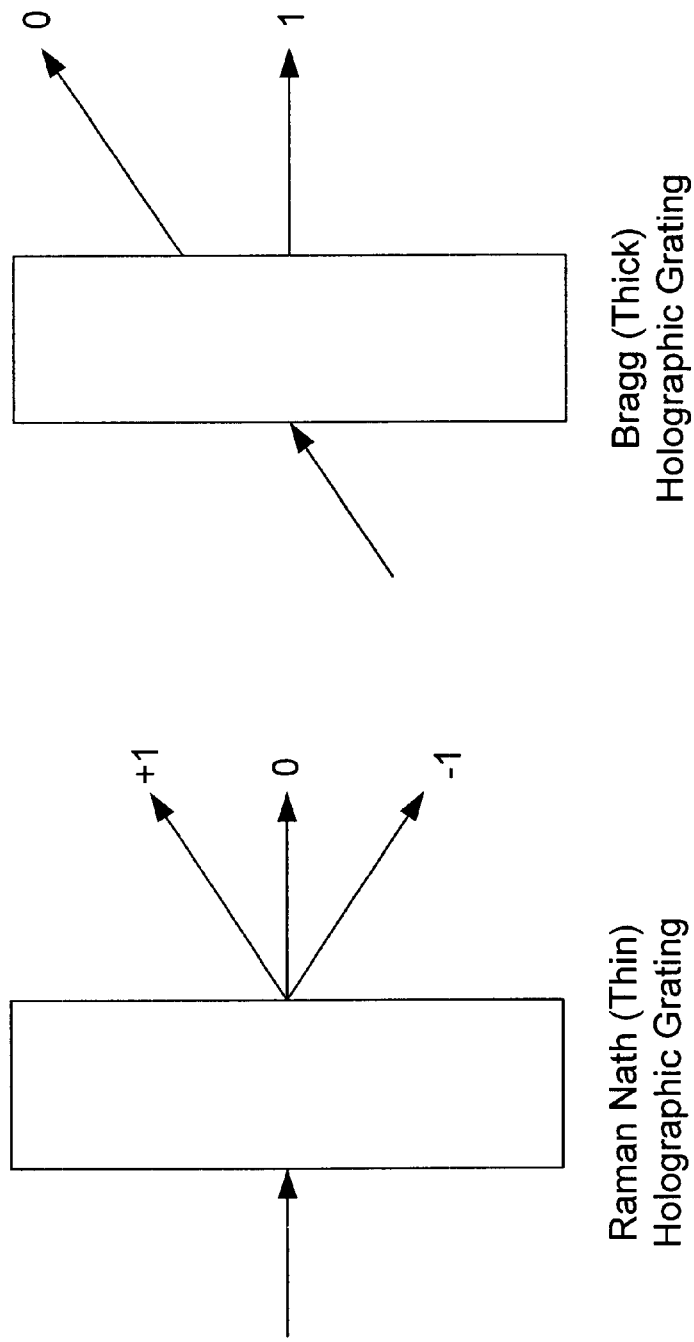
FIG. 19 are side views of the optical modes produced by Raman Nath and Bragg diffraction gratings.

In one embodiment, the hologram could be a Bragg type hologram. Bragg holograms may provide diffraction efficiencies up to a theoretical maximum of 100%. In a Bragg hologram, for a given input beam of a given angle of incidence, the emerging light will have two main components, as depicted in FIG. 19. The two main components include a zeroth order beam which propagates in the direction of the incident beam and a first order diffracted beam which propagates in the direction at an angle θ from the input beam where θ is determined by the Bragg diffraction relation:

$$2nd \sin \theta = \lambda$$

where n is the average refractive index of the holographic medium, d is the separation of the holographic fringes formed at the intersection of the recording beams, and λ is the wavelength. There may also be higher order diffraction components (not shown) representing a small portion of the total diffracted light.

In another embodiment, the hologram could be a Raman Nath or thin phase hologram. Thin holograms will give rise to +/−1 diffracted orders and a zeroth order beam, as depicted in FIG. 19. The maximum diffraction efficiency in the first order is 33.8% for a sinusoidal profile and 40.4% for a square profile. The use of a Raman Nath hologram may allow the pixel to be doubled or tripled in the manner described below.

Figure 20A:
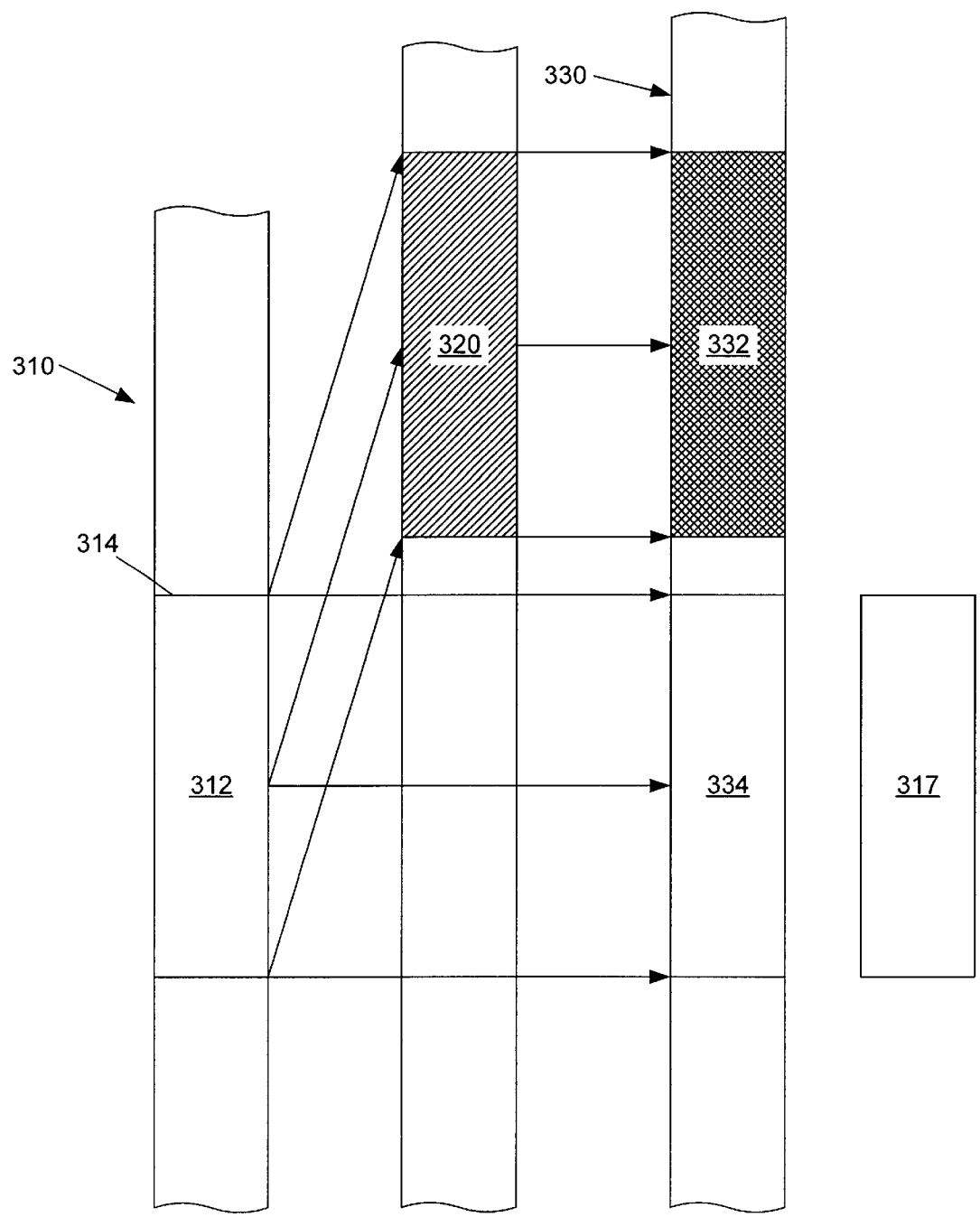
FIGS. 20a and 20b are side views of a display system which includes a holographic optical element positioned in front of and offset from a pixel of a display device and shutters positioned in front of the pixel and the holographic optical element.
Figure 20B:
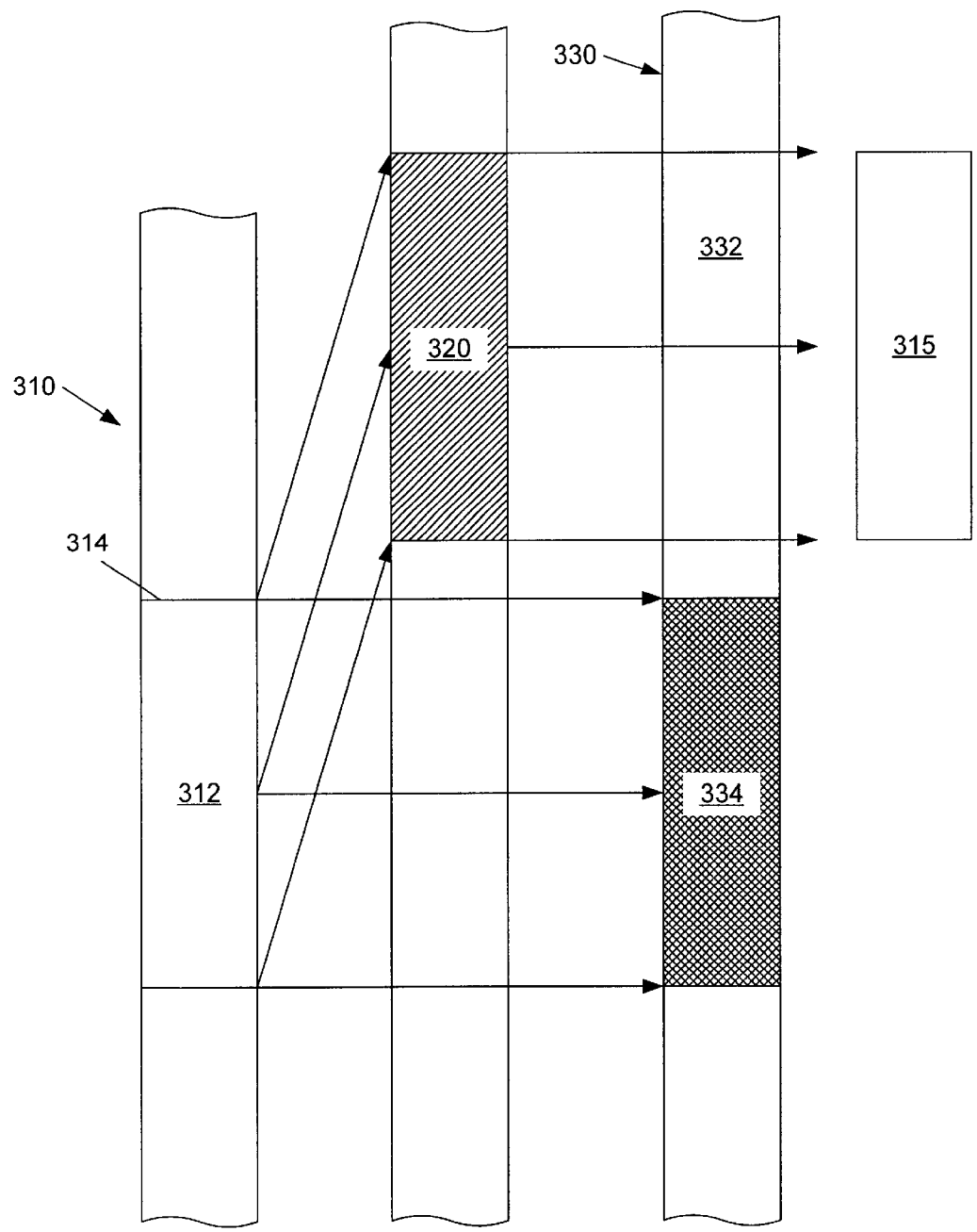

FIGS. 20a and 20b depict a display system in which the perceived number of pixels of the display may be increased. A display device 310 includes at least one pixel 312 which emits light. In an embodiment, the perceived resolution of a display device may be increased by placing a holographic optical element 320 and a shutter array 330 in front of the pixel. The holographic optical element 320 may be positioned entirely outside the outer boundary 314 of the pixel 312, as depicted in FIGS. 20a and 20b. Alternatively, the holographic optical element may be placed in an overlapping position as previously described and depicted in FIG. 18a or the holographic optical element may be substantially aligned with an outer edge of a pixel, as depicted in FIG. 18b. The shutter array 330 may include several individual shutters such as 332 and 334, the optical state of which may be individually controlled. The shutter array 330 may use any technology that provides sufficient light extinction by absorption, reflection or polarization rejection when the shutter is in an inhibiting or closed state and sufficient transmission of light when the shutter is in a transmitting or open state. The shutters may have a switching speed that is comparable with video display refresh rates. Examples of such technologies include switchable holographic optical elements such as those described above. Alternatively, the shutter array may be based on fast liquid crystals such as ferroelectric or other liquid crystals. In another embodiment, the shutters may be mechanical devices such as movable doors or mirrors.

FIGS. 20a and 20b depict a sequence in which a single pixel may be displayed as two separate pixels such that the perceived resolution of the display device is increased. As depicted in FIG. 20a, a first shutter element 332 is in an active state, that is the shutter will inhibit any incident light from passing through the shutter element. Second shutter element 334 is in an inactive state, that is the shutter will allow incident light to pass through the shutter. A portion of the light emitted by the pixel 312 propagates in a forward direction, normal to the pixel, and through the inactive second shutter 334 to produce perceived pixel 317. Another portion of the light emitted from the pixel 312 is incident on the holographic optical element 320 at the appropriate angle to be diffracted by the holographic optical element. The diffracted light from holographic optical element 320 will predominantly be diffracted such that the light is emitted from the holographic optical element, normal to the holographic optical element, and toward the first shutter 332. The light striking the activated first shutter 332 is substantially inhibited from passing through the shutter. The overall result is that only a single pixel 317 is perceived at this moment.

After a predetermined time period following the situation depicted in FIG. 20a, the first shutter element 332 is now switched to an inactive state while the second shutter element 334 is switched to an active state. A portion of the light emitted by the pixel 312 propagates in a forward direction, normal to the pixel, and is blocked by second shutter element 334. Another portion of the light emitted from the pixel 312 is incident on the holographic optical element 320 at the appropriate angle to be diffracted by the holographic optical element. The diffracted light from holographic optical element 320 will predominantly be diffracted such that the light is emitted from the holographic optical element, normal to the holographic optical element, and toward the first shutter 332. The light striking the inactivated first shutter 332 is substantially transmitted through the shutter to produce the perceived pixel 315.

By rapidly and alternatively switching the shutters 332 and 334 from active to inactive states, the actual pixel 312 may be multiplied to two perceived pixels 315 and 317. If the switching is performed at a fast enough speed, a user of the display system will perceive two pixels in that region of a single pixel. In this manner the resolution of a display device may be increased without increasing the number of pixels.

This is further illustrated in FIGS. 21a–c which depict a display system that includes an array of pixels 312. The array depicted in FIG. 21a includes an array of holographic optical elements 320 and an array of shutters positioned in front of the pixels. The array of shutters includes an array of first shutters 332 and an array of second shutters 334 (shown in FIG. 21b). FIG. 21a depicts the array when the first array of shutters 332 are in an active state while the second array of shutters 334 are in an inactive state. At this moment, the actual pixels 312 would be perceived by a user of the display system.

As described above the shutters may be substantially simultaneously switched from an active state to an inactive state or from an inactive state to an active state after a predetermined time period. FIG. 21b depicts the display system after the first array of shutters are switched to an inactive state and the second array of shutters are switched to an active state. This allows light from the array of holographic optical elements 320 to be perceived by a user of the display system. The second array of shutters blocks the light from the pixel 312.

By rapidly switching between the display system states depicted in FIGS. 21a and 21b, the perceived resolution of a display system may be increased. By switching between the two states at a speed faster than a human eye can differentiate, the display system may appear as depicted in FIG. 21c, where the number of pixels will appear to be doubled.

This type of display system may be particularly useful for display systems which use an interlaced system for scanning (e.g., television screens). Such display systems typically require two scans to complete a pictures image. The first scan causes all of the even row pixels to emit light. A second scan causes all of the odd row pixels to emit light. The two scans are typically performed at a rapid rate such that the perceived image includes all of the odd and even rows. The above described display system may take the data from an interlaced system and use it to double the resolution of the display. Instead of using the odd/even information to produce signals in alternate rows of-pixels, the odd/even information may be used to light up all of the pixels. For example, all of the pixels may be signal to emit light when the even row information of an image is received. As the pixels emit light the shutter system may be switched such that the light emitted by the pixels may be seen by a user of the display. When the odd row information arrives, the shutters may be switched such that the light from the pixel will only be emitted through the holographic optical element. Thus the perceived resolution of the display is doubled without an increase in the amount of information transmitted to the display system or the speed at which it is transmitted.

In other display systems the information is typically transmitted all at once. In order to increase the resolution of such systems, additional information may be required. Thus to double a display system, at least two sets of data need to be sent. Each set of data will correspond to the two perceived pixels to be generated from a single pixel. In order to maintain the appropriate appearance and to avoid screen flicker the display rate and data transmission rates may also have to be increased.

In another embodiment, a first holographic optical element 320 may be positioned adjacent to a pixel 312 and a second optical holographic element 325 is positioned in front of pixel 312 as depicted in FIG. 22. The first holographic optical element 320 may be configured to diffract light as described above. The second optical holographic element may be configured to converge (i.e., focus), diverge (i.e., disperse) the incident light, or filter the light. A number of optical elements may be formed in the second optical holographic element including diffusers, light-shaping diffusers, lenses, and filters.

Furthermore, the first optical holographic element may be configured to be converging or diverging of the incident light as well as diffracting. In one embodiment, an additional optical element 350 may be placed in front of the first holographic optical element to either converge or diverge the light emitted from the first holographic optical element. Optical element 350 may be holographic or non-holographic. Alternatively, optical element 350 may be superimposed with the diffraction holographic grating in a liquid crystal medium. Methods for forming two or more holographic optical components within a single liquid crystal layer have been previously described. Alternatively, only one of either first optical holographic element 320 or second optical holographic element 325 may be converging or diverging of incident light. Alternatively, one of the optical holographic elements may be converging while the other element may be diverging.

Figure 22A:
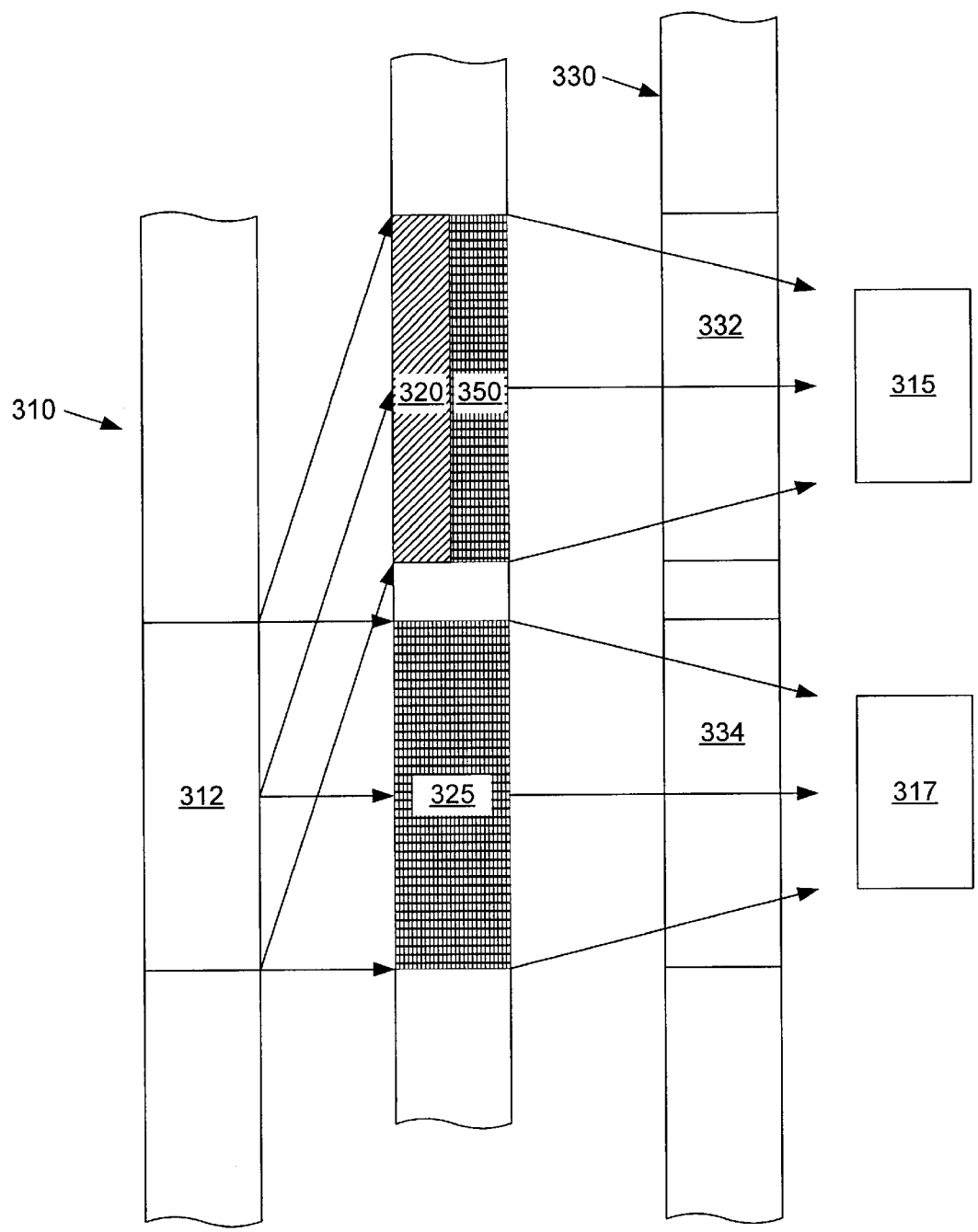
FIGS. 22a is a side view of a display system which includes a holographic optical element positioned in front of and offset from a pixel of a display device, converging optical elements positioned in front of the holographic optical element and the pixel, and shutters positioned in front of the converging optical elements.

In the embodiment depicted in FIG. 22a, first optical holographic element 320, coupled with optical element 350, is configured to diffract and converge the incident light. The second optical holographic element 325 may be configured to be converging of incident light. Thus both the perceived pixel 315 and the perceived pixel 317 will appear to be smaller than the pixel 312. This may be useful if it is desired to increase the intensity of light from the pixels. By converging the light to a smaller area, the intensity of light from the perceived pixels 315 and 317 may be increased.

Figure 22B:
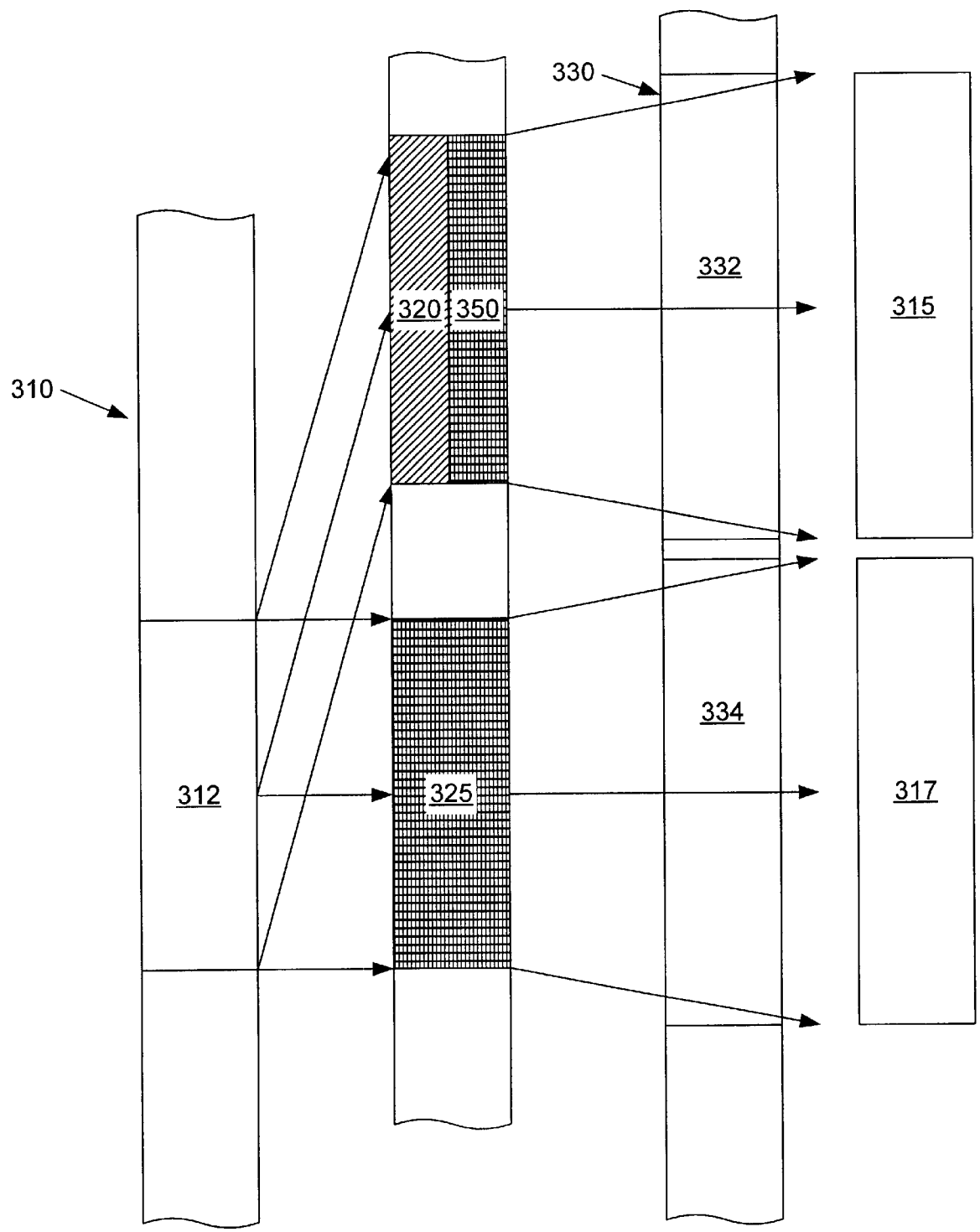
FIGS. 22b is a side view of a display system which includes a holographic optical element positioned in front of and offset from a pixel of a display device, diverging optical elements positioned in front of the holographic optical element and the pixel, and shutters positioned in front of the diverging optical elements.

In another embodiment, depicted in FIG. 22b, first optical holographic element 320, coupled with optical element 350, is configured to diffract and diverge the incident light. The second optical holographic element 325 may be configured to be diverging of incident light. Thus both the perceived pixel 315 and the perceived pixel 317 will appear to be larger than the pixel 312. This may be useful in displays designed for direct viewing or when the display forms an input image for a viewing apparatus. In these types of displays the light emitted from the display device should be diffuse in order to allow a user of the display system to view the projected images from a variety of angles.

Figure 23:
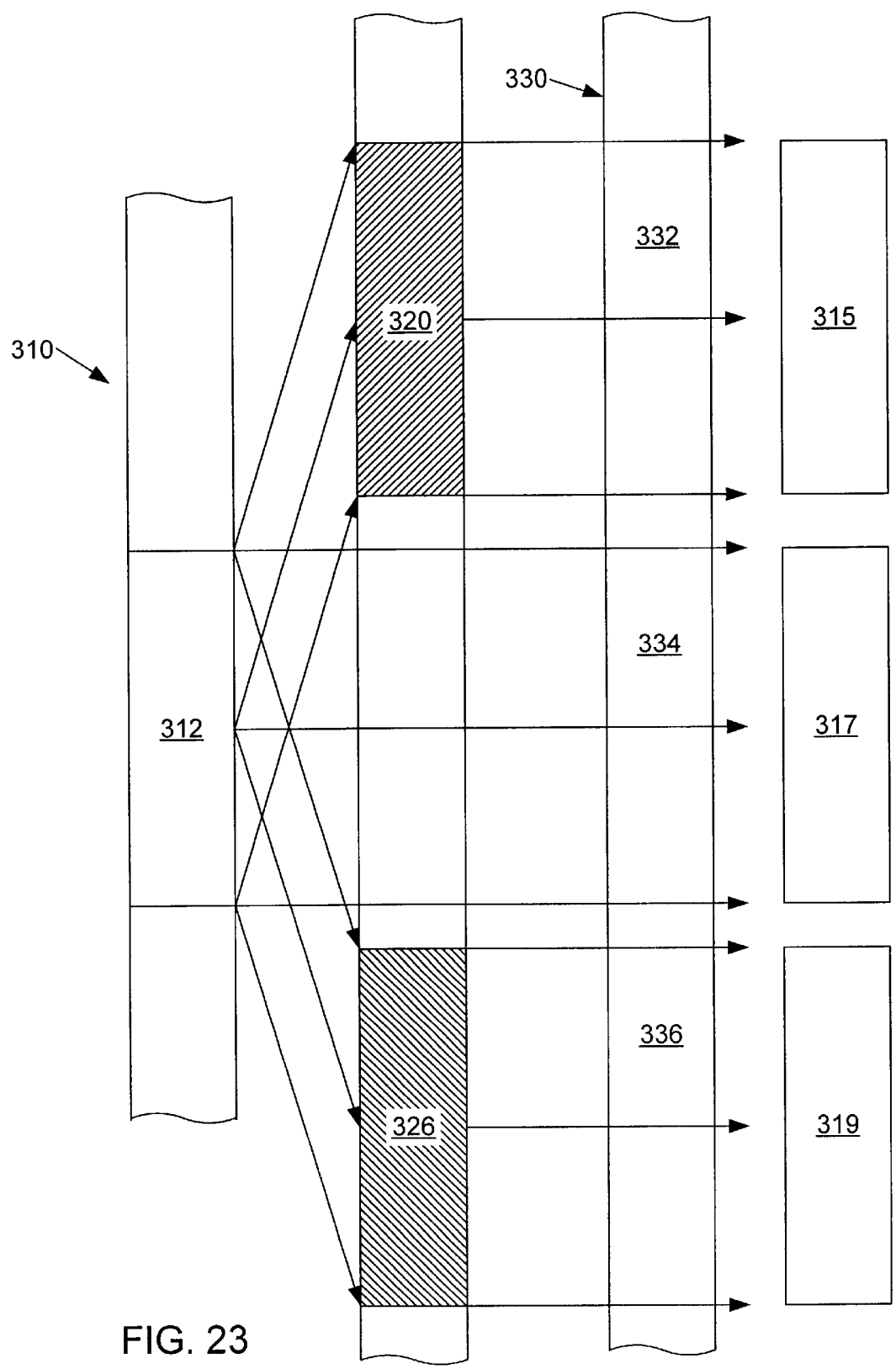
FIG. 23 is a side view of a display system which includes a pair of holographic optical elements positioned in front of and offset from a pixel of a display device and shutters positioned in front of the pixel and the holographic optical elements.

In some embodiments, a setup may be used to triple the resolution of a single pixel. As depicted in FIG. 23, two holographic optical elements 320 and 326 may be placed adjacent to a pixel 312 on opposing sides of the pixel. The first and second holographic optical elements may be configured to diffract light that is incident at a predefined range of angle toward the user of a display system. The diffraction of light by the first and second holographic optical elements may cause three perceived pixels 315, 317, and 319 to be displayed. In this manner, the resolution of a system may be tripled. It should be understood that while the holographic optical elements are depicted as being on opposing sides of pixel 312, that other arrangements, such as an L-shaped arrangement, of the holographic optical elements may be used to increase the resolution. As described above, shutters 332, 334, and 336 may be placed in front of the holographic optical elements 320 and 326 and the pixel. The shutters may be sequentially activated and deactivated such that only one pixel is displayed at a time. Alternatively, the shutter may be controlled to allow two or three of the pixels to be simultaneously displayed.

In another embodiment, electrically switchable holograms may be used to increase the resolution of a display device. As described above, a hologram of an optical component may be formed within a holographic recording medium (hereinafter referred to as an "emulsion material" or "emulsion"). The emulsion comprises a polymer material having microdroplets of liquid crystal dispersed therein. The hologram recorded in the emulsion has the ability to selectively diffract light at certain wavelengths into different modes in response to a voltage applied to the emulsion. Light passing through the hologram in the same direction as the light is received from the light source is referred to as the zero (0th) order mode (See FIG. 19). When no voltage is applied on either side of the emulsion, the liquid crystals droplets are oriented such that the hologram is present in the emulsion and light is diffracted from the 0th order mode to a first order mode of the hologram. Alternatively, when a voltage is applied to the emulsion, the liquid crystal droplets become realigned effectively erasing the hologram and the incoming light passes through the emulsion in the 0th order mode. The percentage of light diffracted into the various modes of the hologram varies in proportion to the strength of the electric field or voltage applied to the emulsion. Controlling the voltage that is supplied to the electrode for each pixel is an electronic control circuit. The electronic circuit may include a digital-to-analog converter that allows a processor to write a digital value to each electrode location and to have that digital value converted to a corresponding analog voltage that selectively controls the amount of light transferred between the modes of the hologram at that pixel location. Depending upon the number of pixels in the display, the electronic circuit may be designed to simultaneously address all the electrodes or may write to the electrodes in a raster fashion.

Figure 24A:
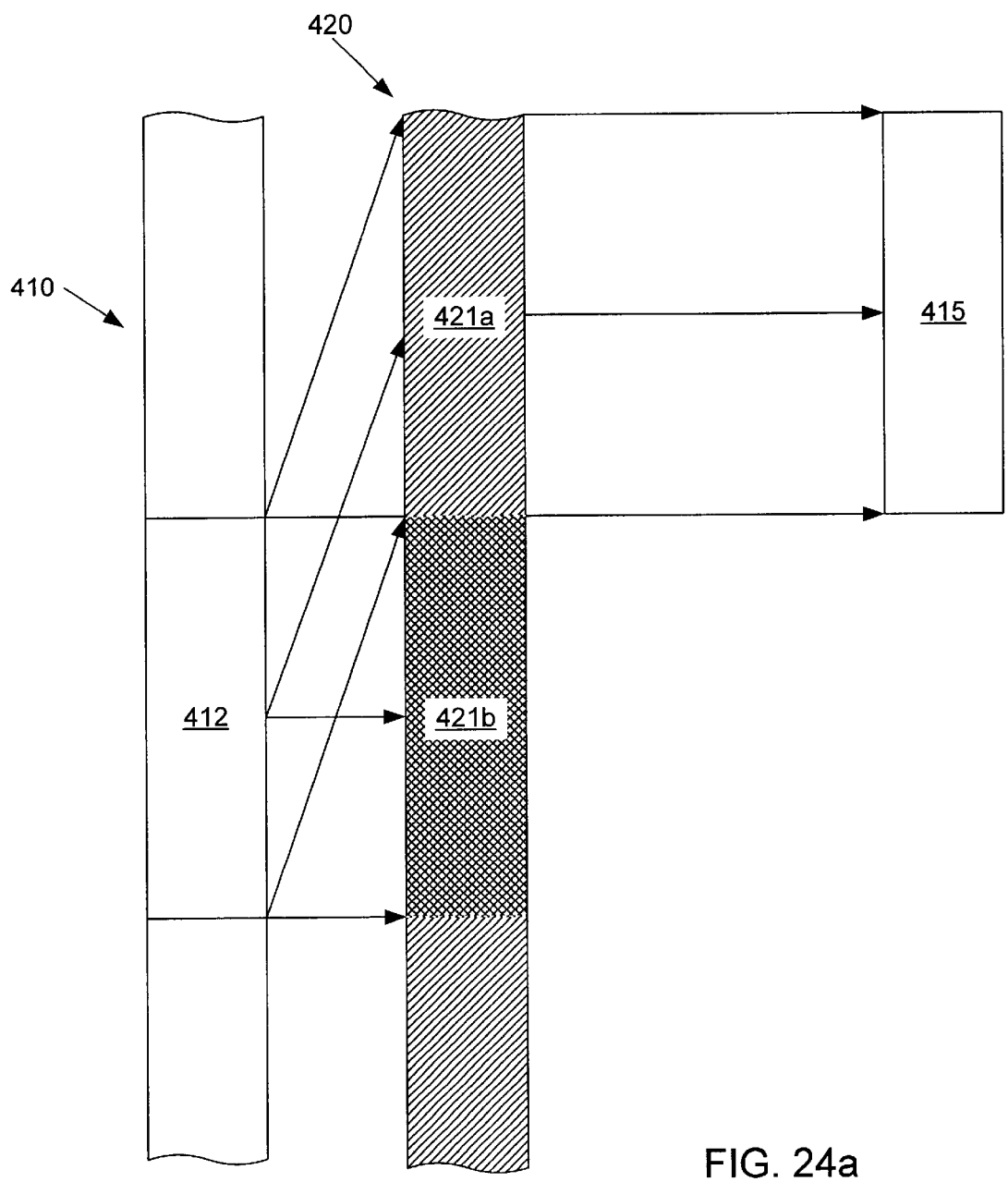
FIGS. 24a) and 24b) are side views of a display system which includes a switchable holographic optical element positioned in front of a pixel of a display device.
Figure 24B:
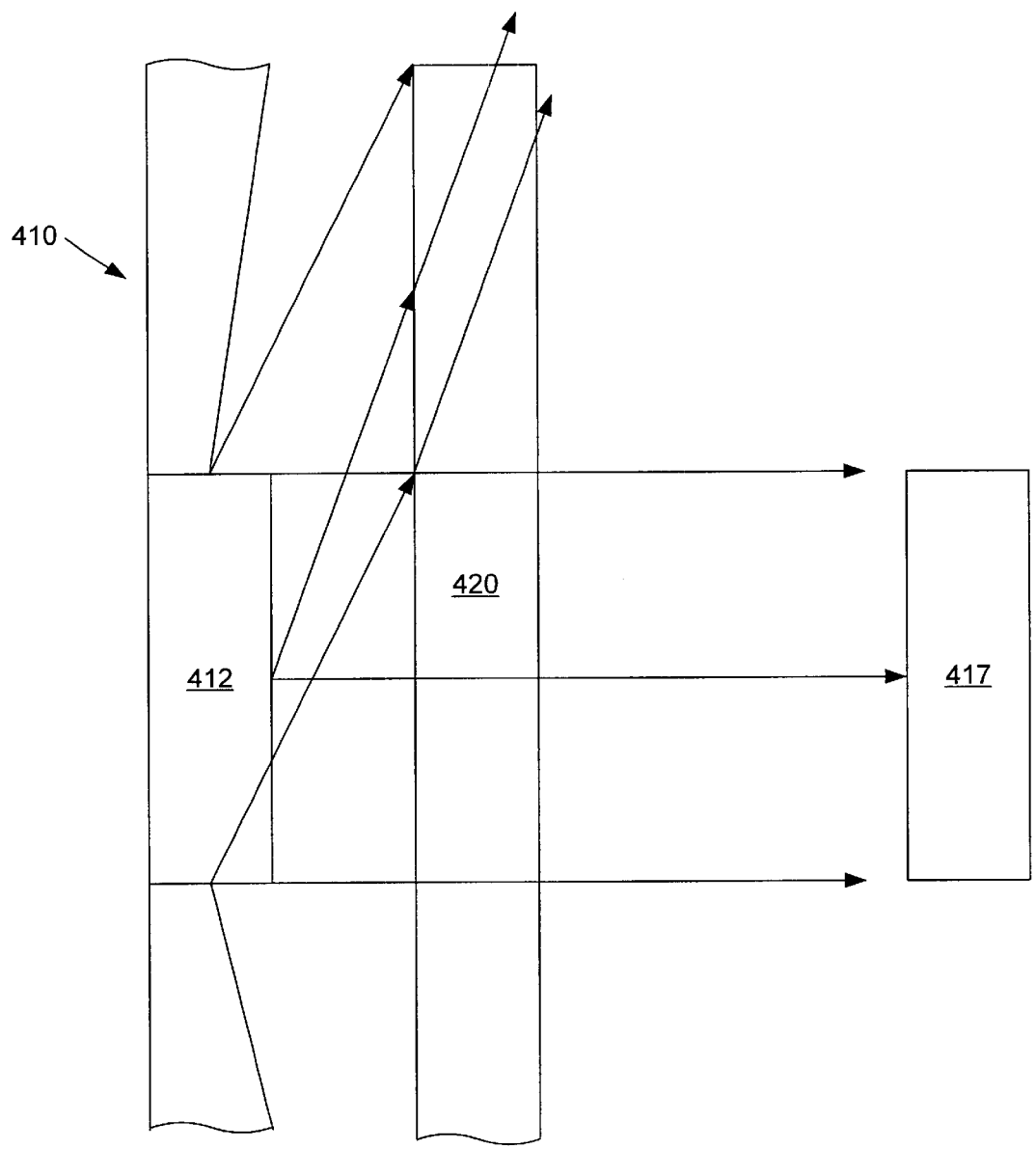

FIGS. 24a) and 24b) depict a switchable holographic optical element 420 placed in front of a pixel 412 of a display device 410. The switchable holographic optical element 420 may extend over the entire surface of the display device. The switchable holographic optical element may include images of at least two different types of holograms in the same emulsion layer. As depicted in FIG. 24a, a single switchable holographic optical element 420 includes images of two optical elements. The first optical element 421a, may be a diffraction element that is positioned in a offset position from the pixel. The second optical element 421b, may be an element configured to inhibit the passage of light through the switchable holographic optical element. The second optical element 421b, may be a reflective element or absorptive element. As described above, a switchable holographic optical element 420 may exhibit two states. When activated, i.e., when an electric voltage is applied to the hologram, the liquid crystal is realigned such that the switchable holographic optical elements 421a and 421b are substantially transparent. When inactivated, i.e., in the absence of an applied electric voltage, the liquid crystal is arranged such that the holographic optical elements 421a and 421b are present in the emulsion.

The switchable holographic optical element 420 depicted in FIG. 24a, is in an inactive state that allows the first and second optical elements (421a and 421b) to be present in the emulsion. In one embodiment, the first optical element 421a is a hologram of a diffraction grating. Light that is incident at the appropriate angle will be passed through the hologram. Light from the pixel 412 that is emitted in a normal direction from the pixel will encounter the second optical element 421b. The second optical element 421b may be configured to inhibit passage of light from the pixel through the switchable holographic optical element 420. As depicted in FIG. 24a, only one pixel 415, generated from the diffracted light, is seen while the switchable holographic optical element is in an inactive state.

After a predetermined time period following the situation depicted in FIG. 24a, the switchable holographic optical element 420 is now switched to an active state. In the active state, the switchable holographic optical element 420 will become substantially transparent to light, that is the hologram of the diffraction grating will substantially disappear from the emulsion. The emulsion will then exhibit zeroth order and the incident light will travel through the switchable holographic optical element 420 without any significant diffraction. Light traveling normal to the switchable holographic optical element 420 will continue through and will form the perceived pixel 417. Light at other angles will not be diffracted, and will tend to be non-visible to a user of the display system. Thus, only perceived pixel 417 is seen when the switchable holographic optical element 420 is activated. In this manner the switchable holographic optical element 420 may act as both a diffraction system and a shutter to allow sequential display of the two perceived pixels 415 and 417.

Figure 25A:
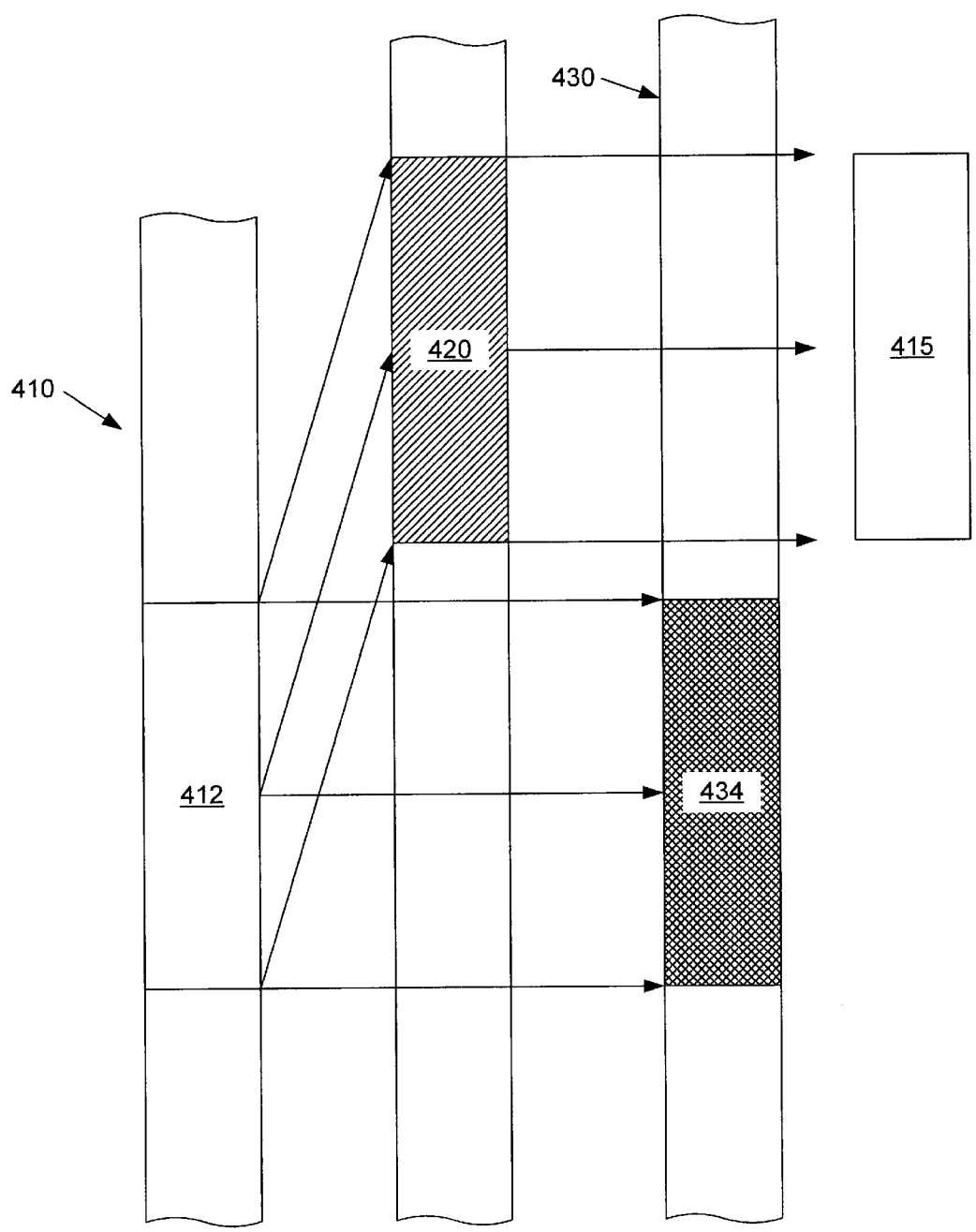
FIGS. 25a) and 25b) are side views of a display system which includes a switchable holographic optical element positioned in front of and offset from a pixel of a display device and a shutter positioned in front of the pixel.
Figure 25B:
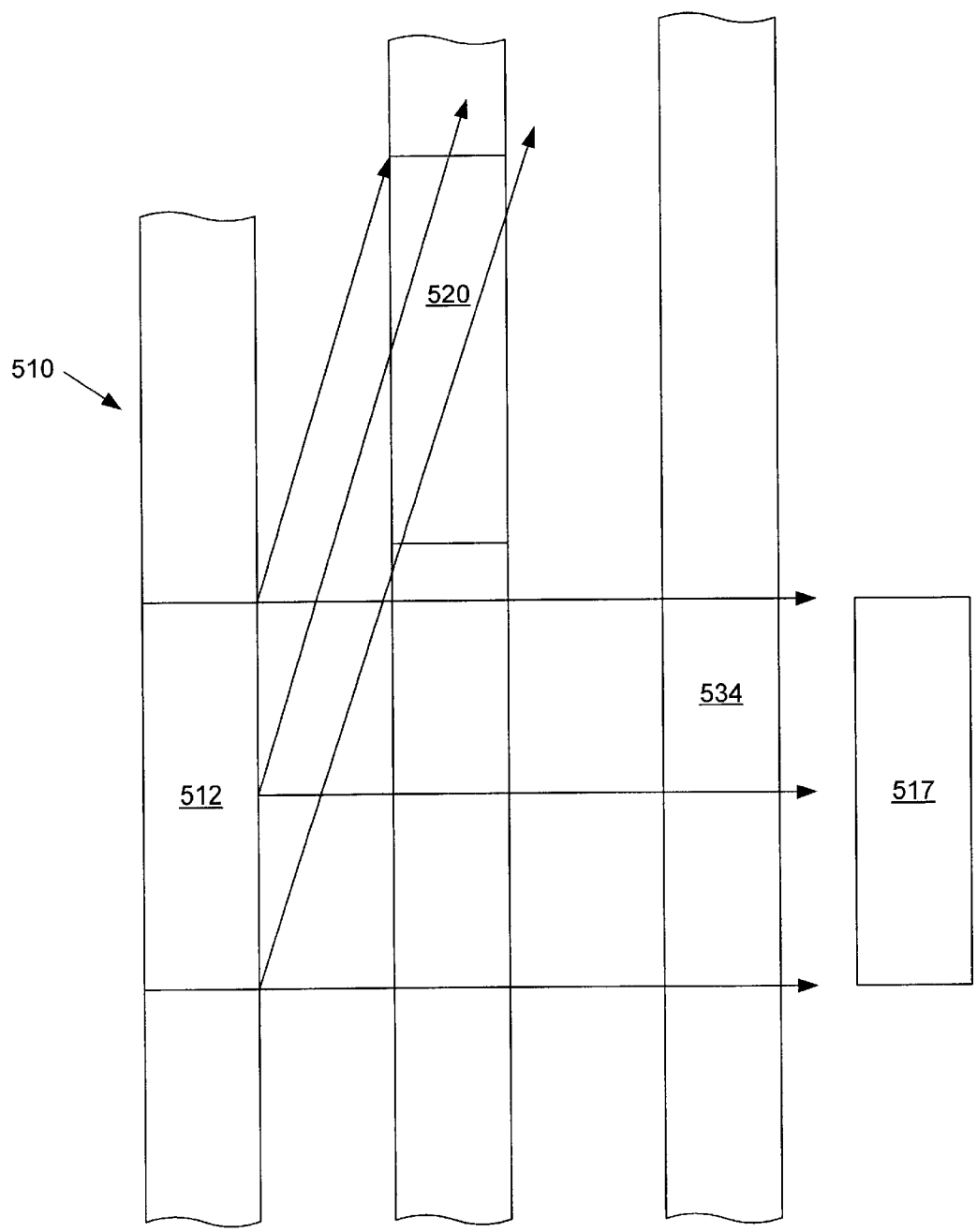

In another embodiment, a switchable holographic optical element 420 and a shutter element 434 are used to sequentially display a pair of perceived pixels from a single pixel, as depicted in FIGS. 25a and 25b. In this embodiment, a switchable holographic optical element 420 may be placed substantially adjacent to a pixel 412. A shutter element 434 may be placed such that the light from the pixel traveling in a substantially normal direction from the pixel is blocked by the shutter when the shutter is in an activated state. As depicted in FIG. 25a, the shutter will block a portion of the light from the pixel, while the switchable holographic optical element 420 diffracts light toward the front of the display system. Thus only perceived pixel 415 is seen.

After a predetermined time period following the situation depicted in FIG. 25a, the switchable holographic optical element 420 is now switched to an inactive state, as depicted in FIG. 25b. In the active state, the switchable holographic optical element 420 becomes substantially transparent to light. The state of the shutter is also changed from an active state to an inactive state. In the inactive state, the shutter will also become substantially transparent to light. Thus perceived pixel 417 will be seen while perceived pixel 415 disappears.

The above-described systems are typically optimized for a narrow spectrum of light. In one embodiment, the pixel emits monochromatic light. The pixel, for example may be part of a color display unit which uses three colors of pixels, red, blue and green, to create a color image. Thus the pixels 312 and 412 depicted in the above-described figures may be a red, blue or green pixel or pixel that emits substantially monochromatic light.

Most modem display devices are configured to display colors. Typically, color display devices emit red, blue and green light to produce a color image. In many cases a pixel of a color display device may be composed of three sub-pixels a red sub-pixel, a blue sub-pixel, and a green sub-pixel. Alternatively, a pixel may be configured to sequentially emit red, blue and green colors. In either case, the display device may be modified to allow the resolution of a color display device to be increased.

Figure 26A:
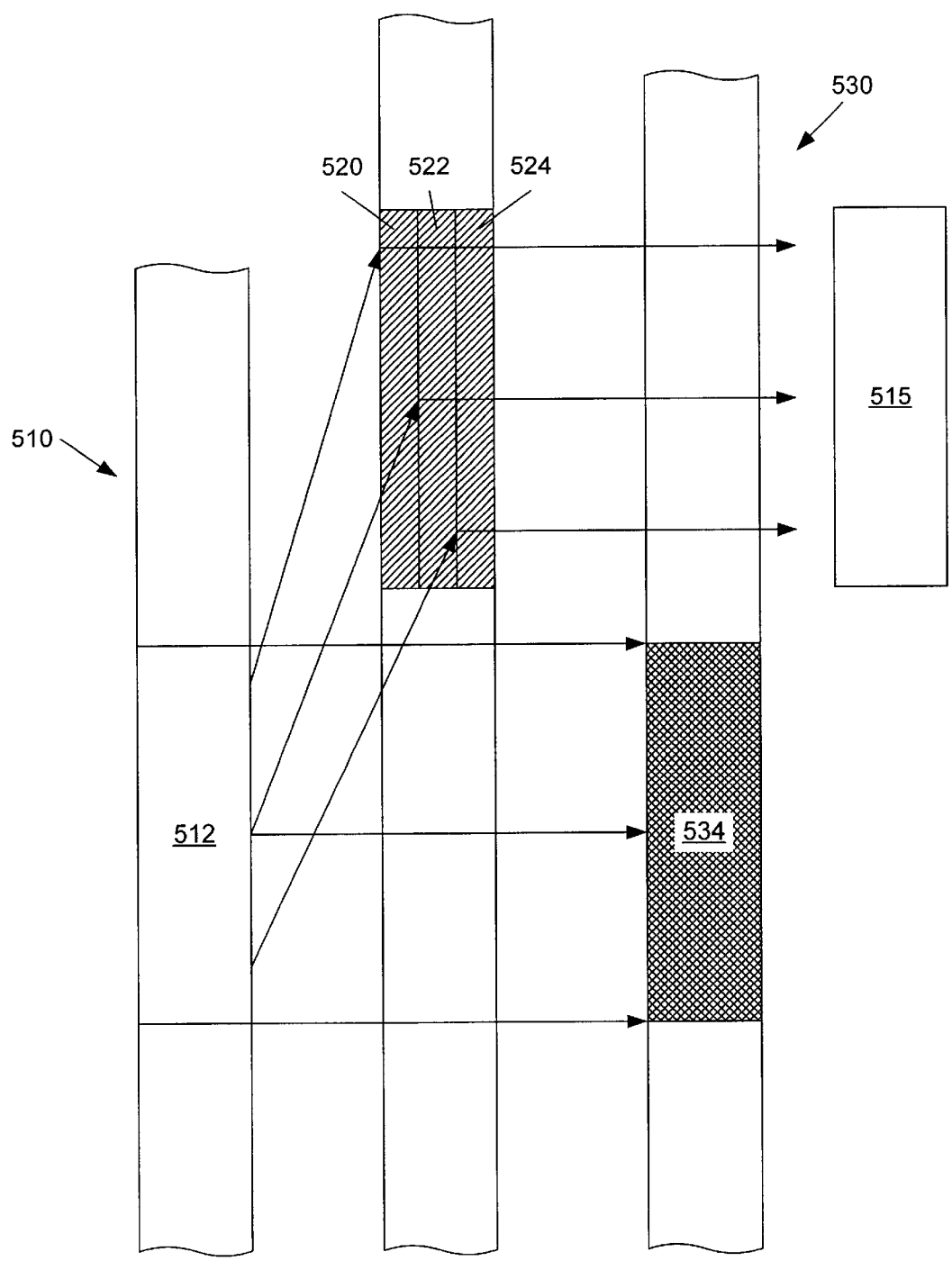
FIGS. 26a) and 26b) are side views of a display system which includes a three switchable holographic optical element, each of which is configured to diffract a different wavelength of light, positioned in front of and offset from a color emitting pixel of a display device and a shutter positioned in front of the pixel.

In one embodiment, three switchable holographic optical elements 520, 522, 524 may be placed in front of a colored light emitting pixel, offset from the pixel, as depicted in FIG. 26a. The pixel may be configured to sequentially emit red, green, and blue light. Switchable holographic optical element 520 has a hologram recorded in it that is optimized to diffract red light. Switchable holographic optical element 522 has a hologram recorded in it that is optimized to diffract green light. Switchable holographic optical element 524 has a hologram recorded in it that is optimized to diffract blue light. Each of the switchable holographic optical elements 520, 522, and 524 have a set of electrodes configured to apply a variable voltage to each of the switchable holographic optical elements.

In this embodiment of the invention, only one set of electrodes associated with the emulsions 520, 522 and 524 is activated at any one time. With the electrodes enabled, a selected amount of light is diffracted into the 1st order mode of the hologram and towards a user, while light in the 0th order mode is directed such that the user cannot see the light. The electrodes on each of the three holograms are sequentially enabled such that a selected amount of red, green and blue light is directed towards a user for each pixel location on the display. Provided that the rate at which the holograms are sequentially enabled is faster than the response time of a human eye, a color image will be created in the viewer's eye due to the integration of the red, green and blue monochrome images created from each of the emulsions 520, 522, and 524. A shutter 534 in front of the pixel 312 may block a portion of the light emitted from the pixel. Thus only a single pixel 515 may be perceived at any given moment.

Figure 26B:
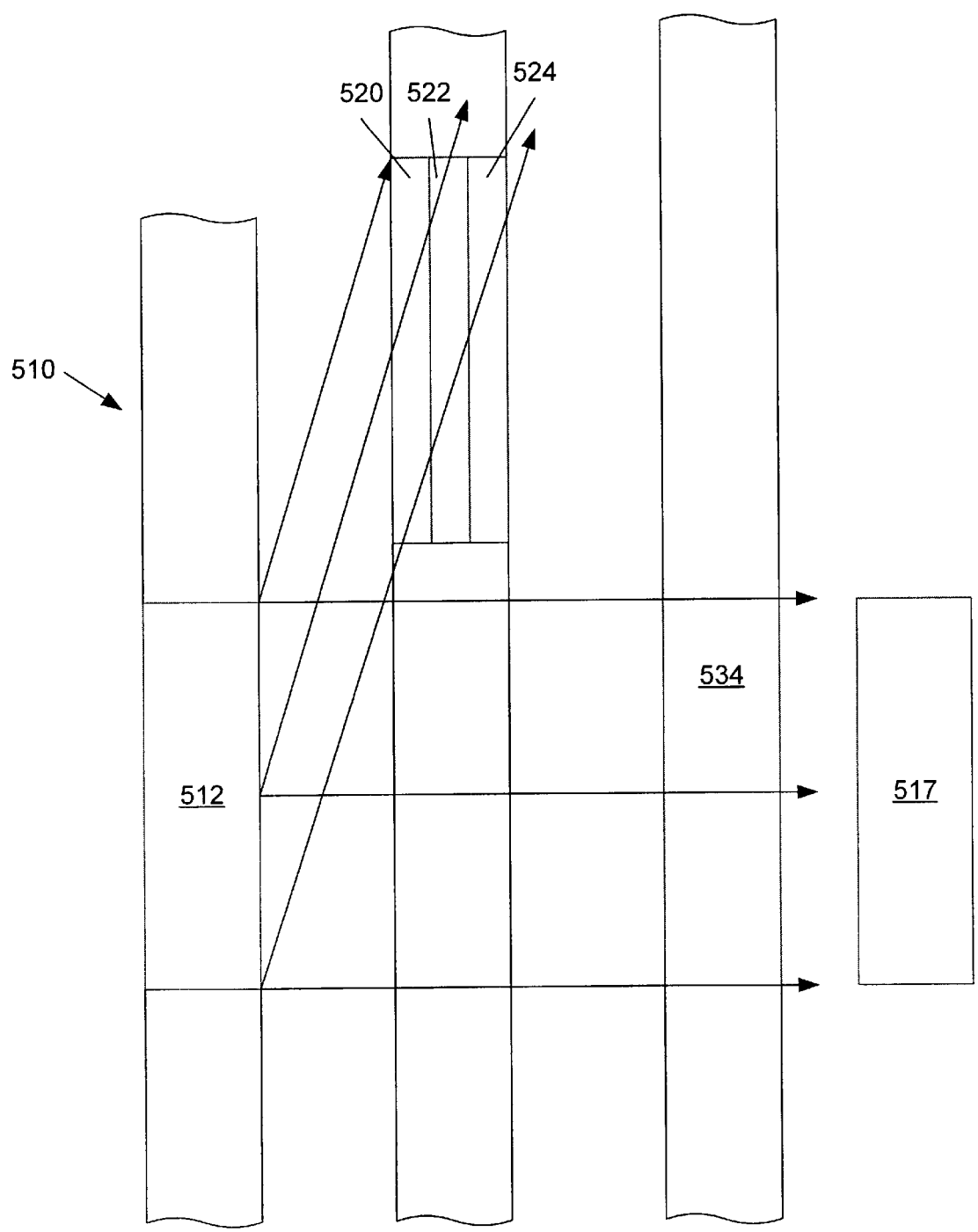

The switching of the holographic optical elements 520, 522, and 524 is coordinated with the colors emitted by the pixel 512. When the pixel emits red light, for example, the holographic optical elements associated with green light and blue light (522 and 524) are activated such that the they are substantially transparent to the incident light. The holographic optical element 520, however, is left in an inactive state so that the incident red light is diffracted toward the user. Similarly, when green light is emitted by the pixel, holographic optical elements 520 and 524 are activated while holographic optical element 522 is in an inactive state. Finally, when blue light is emitted by the pixel, holographic optical elements 520 and 522 are activated while holographic optical elements 524 is in an inactive state After display of the pixel 515, formed by diffraction of the light by the holographic optical elements 520, 522, and 524, the perceived pixel 517 is displayed, as depicted in FIG. 26b. At this moment, the holographic optical element 520, 522, and 524 are all switched to an active state, thus allowing any incident light to travel through the holographic optical elements substantially undiffracted. The shutter 534 is switched to an inactive state such that the incident light from the pixel is transmitted to a user as perceived pixel 517. By rapidly switching between the two states depicted in FIGS. 26a and 26b, a color pixel may be multiplied. Is should be understood that the display system depicted in FIGS. 26a) and 26b) may also include some of the previously described elements such as additional shutters and light diverging /converging lenses.

Figure 27A:
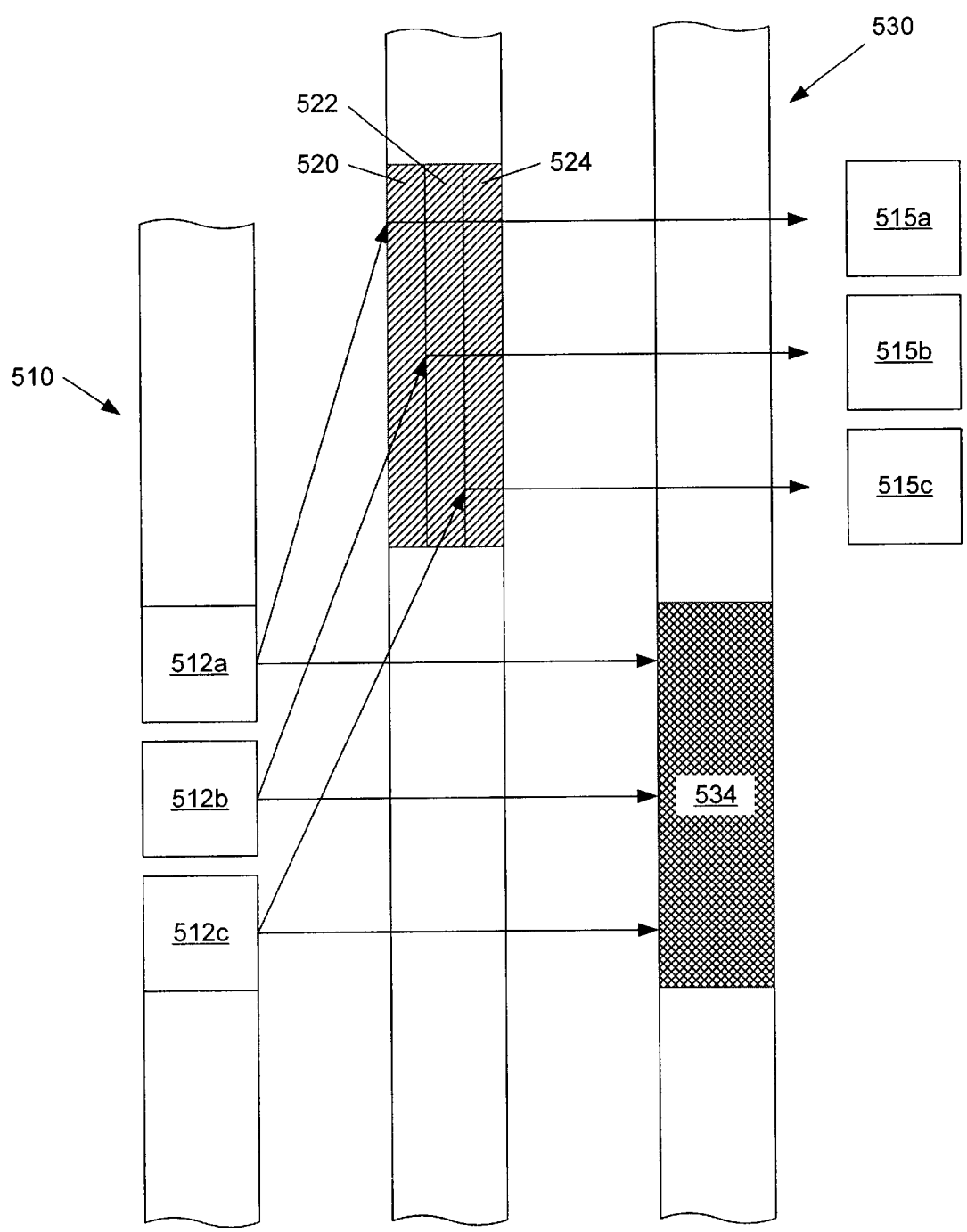
FIGS. 27a and 27b are side views of a display system which includes three switchable holographic optical element, each of which is configured to diffract a different wavelength of light, positioned in front of and offset from a color emitting pixel composed of three sub-pixels and a shutter positioned in front of the pixel.

In another embodiment, three switchable holographic optical elements 520, 522, 524 may be placed in front of a colored light emitting pixel, offset from the pixel, as depicted in FIG. 27a. The pixel may include three distinct sub-pixels 512a, 512b, and 512c, each of the sub-pixels being configured to emit either red, green, or blue light. Switchable holographic optical element 520 has a hologram recorded in it that is optimized to diffract red light. Switchable holographic optical element 522 has a hologram recorded in it that is optimized to diffract green light. Switchable holographic optical element 524 has a hologram recorded in it that is optimized to diffract blue light. Each of the switchable holographic optical elements 520, 522, and 524 have a set of electrodes configured to apply a variable voltage to each of the switchable holographic optical elements.

In this embodiment of the invention, only one set of electrodes associated with the emulsions 520, 522 and 524 is activated at any one time, as described previously. The electrodes on each of the three holograms are sequentially enabled such that a selected amount of red, green and blue light is directed towards a user for each pixel location on the display. A shutter 534 in front of the pixel 312 may block a portion of the light emitted from the pixel. Thus only a single pixel 515 may be perceived at any given moment.

The switching of the holographic optical elements 520, 522, and 524 is coordinated such that each of the colors emitted by the sub-pixels 512a, 512b, and 512c are diffracted to produce a perceived pixel 515 which is composed of three sub-pixels 515a, 515b, and 515c. The sub-pixels 512a, 512b, and 512c of the pixel 512 may be configured to continuously emit colored light. The switchable holographic optical elements, however, are sequentially activated to allow each of the primary display colors to be diffracted. For example, the holographic optical elements associated with green light and blue light (522 and 524) are activated such that they are substantially transparent to the incident light. The holographic optical element 520, however, is left in an inactive state so that the incident red light is diffracted toward the user. Similarly, holographic optical elements 520 and 524 are activated while holographic optical element 522 is in an inactive state to allow diffraction of green light. Finally, holographic optical elements 520 and 522 are activated while holographic optical elements 524 is in an inactive state so that the incident blue light is diffracted toward a user.

Figure 27B:
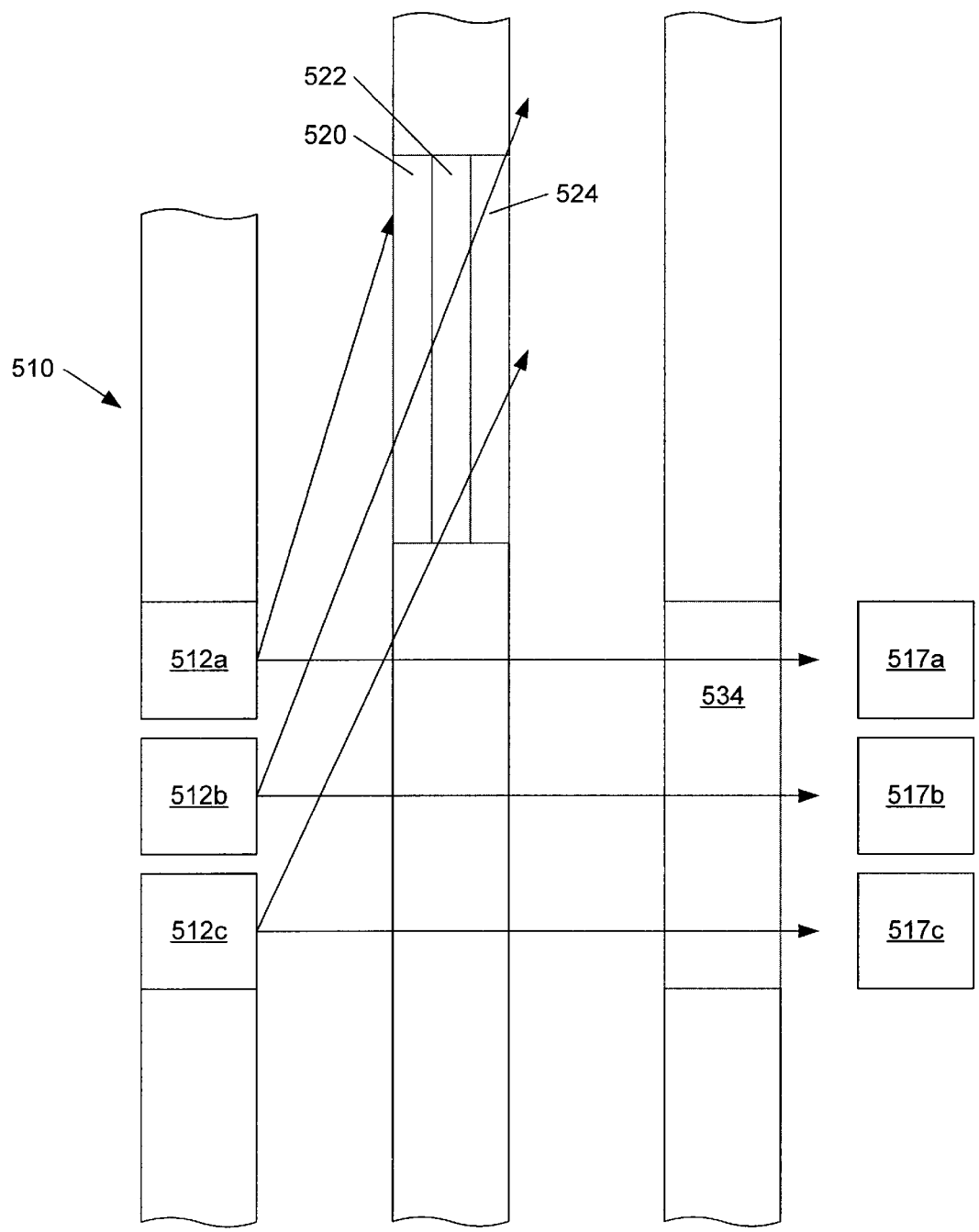

After display of the pixel 515, formed by diffraction of the light by the holographic optical elements 520, 522, and 524, the perceived pixel 517 is displayed, as depicted in FIG. 27b. At this moment, the holographic optical element 520, 522, and 524 are all switched to an active state, thus allowing any incident light to travel through the holographic optical elements substantially undiffracted. The shutter 534 is switched to an inactive state such that the incident light from the pixel is transmitted to a user as perceived pixel 517. By rapidly switching between the two states depicted in FIGS. 27a and 27b, a color pixel may be multiplied. Is should be understood that the display system depicted in FIGS. 27a and 27b may also include some of the previously described elements such as additional shutters and light diverging/ converging lenses.

Figure 28A:
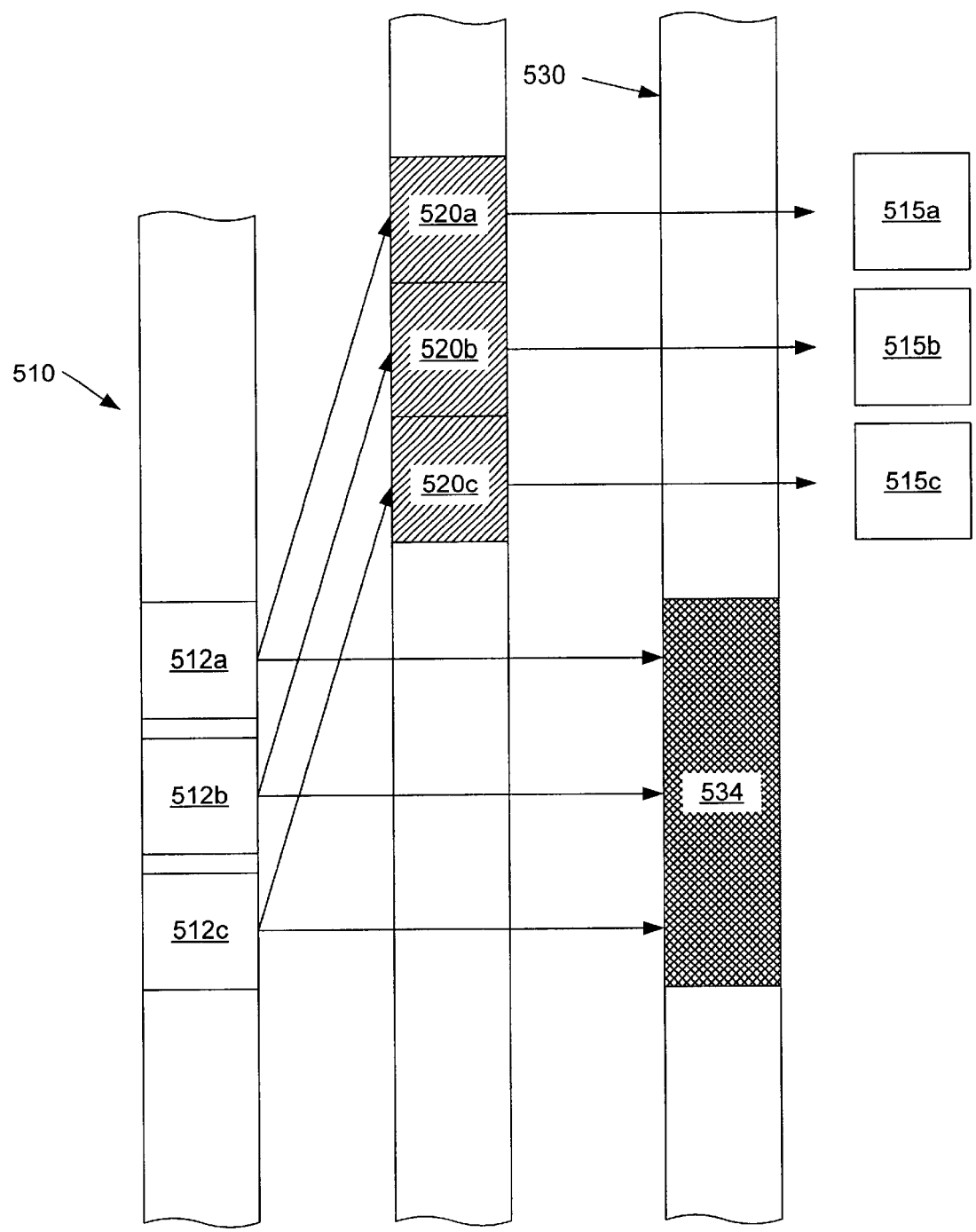
FIGS. 28a and 28b are side views of a display system which includes three stacked switchable holographic optical element, each of which is configured to diffract a different wavelength of light, positioned in front of and offset from a color emitting pixel composed of three sub-pixels and a shutter positioned in front of the pixel.

In another embodiment, three laterally displaced holographic optical elements 520a, 520b, 520c may be placed in front of a colored light emitting pixel, offset from the pixel, as depicted in FIG. 28a. The pixel may include three distinct sub-pixels 512a, 512b, and 512c, each of the sub-pixels being configured to emit either red, green, or blue light. Holographic optical element 520a has a hologram recorded in it that is optimized to diffract red light. Holographic optical element 520b has a hologram recorded in it that is optimized to diffract green light. Holographic optical element 520c has a hologram recorded in it that is optimized to diffract blue light. The holographic optical elements 520a, 520b, and 520c may be switchable holographic elements. Switchable holographic optical elements 520a, 520b, and 520c have a set of electrodes configured to apply a variable voltage to each of the switchable holographic optical elements. Alternatively, a single electrode may be coupled to each of the switchable holographic optical elements to allow the elements to be substantially simultaneously activated and deactivated.

When non-switchable holographic optical elements are used, the display system may also include a shutter (not shown) placed in front of the holographic optical elements (similar to the arrangements shown in FIGS. 22a and 22b). In an embodiment, in which switchable holographic optical elements are used, shutters may not be required to allow sequential display of two perceived pixels. As depicted in FIG. 28a, all of the switchable holographic optical elements may be deactivated to allow incident light to be diffracted toward a user. Since each of the switchable holographic optical elements is stacked above each other, they may substantially simultaneously diffract light to produce perceived pixels 515a, 515b, and 515c.

Figure 28B:
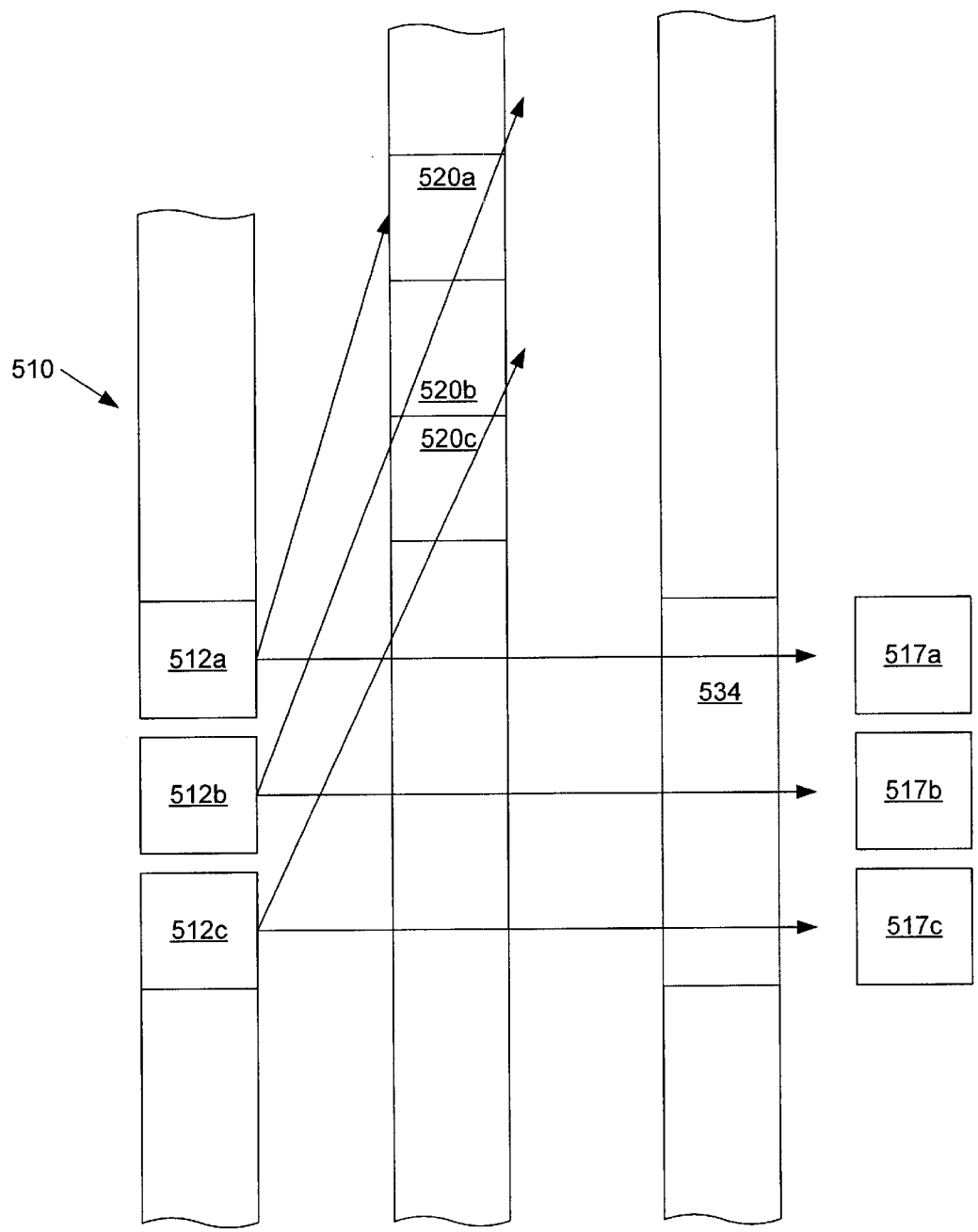

After display of the pixel 515, formed by diffraction of the light by the holographic optical elements 520a, 520b, and 520c, the perceived pixel 517 is displayed, as depicted in FIG. 28b. At this moment, the holographic optical element 520a, 520b, and 520c are all switched to an active state, thus allowing any incident light to travel through the holographic optical elements substantially undiffracted. The shutter 534 is switched to an inactive state such that the incident light from the pixel is transmitted to a user as perceived pixel 517. By rapidly switching between the two states depicted in FIGS. 28a and 28b, a color pixel may be multiplied. Is should be understood that the display system depicted in FIGS. 28a and 28b may also include some of the previously described elements such as additional shutters and light diverging/converging lenses.

While the present invention has been described with reference to particular embodiments, it will be understood that the embodiments are illustrated and that the invention scope is not so limited. Any variations, modifications, additions and improvements to the embodiments described are possible. These variations, modifications, additions and improvements may fall within the scope of the invention as detailed within the following claims.

What is claimed is:

1. An apparatus comprising:
   a display device comprising a plurality of light emitting pixels, wherein a first pixel is configured to emit a first and second light in first and second directions, respectively, wherein the first and second directions define a non-zero angle therebetween;
   a first optical element comprising first, second, and third holograms each one of which is configured to operate in an active state or an inactive state, wherein the first hologram is configured to diffract red bandwidth light when operating in the active state, wherein the first hologram is configured to transmit red bandwidth light without diffraction when operating in the inactive state, wherein the second hologram is configured to diffract green bandwidth light when operating in the active state, wherein the second hologram is configured to transmit green bandwidth light without diffraction when operating in the inactive state, and wherein the third hologram is configured to diffract blue bandwidth light when operating in the active state, wherein the third hologram is configured to transmit blue bandwidth light without diffraction when operating in the inactive state;
   wherein the first optical element is positioned to receive the first light, wherein the first optical element is configured to diffract the first light, wherein the diffracted first light emerges from the first optical element in a direction substantially parallel to the second direction.

2. The apparatus of claim 1 wherein the first optical element comprises a first holographic recording medium, wherein the first hologram is recorded in the first holographic recording medium.

3. The apparatus of claim 1 wherein the first optical element comprises a first holographic recording medium, wherein the first holographic recording medium comprises liquid crystal elements, and wherein the first hologram is recorded in the first holographic recording medium.

4. The apparatus of claim 3 wherein the first holographic recording medium comprises a photo-polymer.

5. The apparatus of claim 1 wherein the first optical element comprises a first holographic recording medium, wherein the first hologram is recorded in the first holographic recording medium, wherein the first hologram is formed during a hologram recording process whereby a polymer dispersed liquid crystal material undergoes phase separation to create regions populated by liquid crystal droplets and to create regions of clear photopolymer interspersed by regions populated by liquid crystal droplets.

6. The apparatus of claim 1 wherein the first optical element comprises a first holographic recording medium, wherein the first hologram is recorded in the first holographic recording medium, wherein the first hologram comprises a first thick phase hologram.

7. The apparatus of claim 1 wherein the first optical element comprises a first holographic recording medium, wherein the first hologram is recorded in the first holographic recording medium, wherein the first hologram comprises a first thin phase hologram.

8. The apparatus of claim 1 further comprising a fourth optical element, wherein the fourth optical element is positioned adjacent the first optical element and configured to receive the second light, wherein the fourth optical element is configured to converge the second light.

9. The apparatus of claim 1 further comprising a fourth optical element, wherein the fourth optical element is positioned adjacent the first optical element and configured to receive the second light, wherein the fourth optical element is configured to diverge the second light.

10. The apparatus of claim 1 wherein the display device is a color LCD display device, and wherein the first pixel emits multiple wavelengths of light.

11. The apparatus of claim 1 wherein the first, second, and third holograms are positioned within a single plane.

12. The apparatus of claim 1, wherein the first pixel comprises three sub-pixels, the first sub-pixel configured to emit red light, the second sub-pixel configured to emit green light and the third sub-pixel configured to emit blue light.

13. The apparatus of claim 1, wherein the first optical element is configured such that the passage of light emitted by a second pixel of the display device through the first optical element is substantially inhibited.

14. An apparatus comprising:
   a display device comprising a plurality of light emitting pixels, wherein a first pixel is configured to emit a first and second light in first and second directions, respectively, wherein the first and second directions define a non-zero angle therebetween;
   a first optical element comprising a first hologram, wherein the first optical element is positioned to receive the first light, wherein the first hologram is configured to diffract the first light, wherein the diffracted first light emerges from the first optical element in a direction substantially parallel to the second direction;
   a second optical element positioned to receive the first diffracted light, and;
   a third optical element positioned to receive the second light;
   wherein the second optical element is configured to operate in an active state or an inactive state, wherein the second optical element is configured to transmit the diffracted first light without substantial alteration when the second optical element operates in the active state, and wherein the second optical element is configured to extinguish the diffracted first light when the second optical element operates in the active state;
   wherein the third optical element is configured to operate in the active state or the inactive state, wherein the third optical element is configured to transmit the second light without substantial alteration when the third optical element operates in the active state, and wherein the third optical element is configured to extinguish the second light when the third optical element operates in the active state;
   wherein the third optical element is configured to be active when the second optical element is inactive, and wherein the third optical element is configured to be inactive when the second optical element is active.

15. An apparatus comprising:
a display device comprising a plurality of light emitting pixels, wherein a first pixel is configured to emit a first and second light in first and second directions, respectively, wherein the first and second directions define a non-zero angle therebetween;
a first optical element comprising a first hologram, wherein the first optical element is positioned to receive the first light, wherein the first hologram is configured to diffract the first light, wherein the diffracted first light emerges from the first optical element in a direction substantially parallel to the second direction;
a second optical element comprising a second hologram, wherein the second optical element is positioned to receive the first diffracted light, and;
a third optical comprising a third hologram, wherein the third optical element is positioned to receive the second light;
wherein the second optical element is configured to operate in an active state or an inactive state, wherein the second optical element is configured to transmit the diffracted first light without substantial alteration when the second optical element operates in the active state, and wherein the second optical element is configured to diffract the diffracted first light when the second optical element operates in the active state, wherein the twice diffracted first light emerges from the second optical element at a third direction, wherein the second and third directions define a non-zero angle therebetween;
wherein the third optical element is configured to operate in the active state or the inactive state, wherein the third optical element is configured to transmit the second light without substantial alteration when the third optical element operates in the active state, and wherein the third optical element is configured to diffract the second light when the third optical element operates in the active state, wherein the diffracted second light emerges from the third optical element in a fourth direction, wherein the fourth and second directions define a non-zero angle therebetween;
wherein the third optical element is configured to be active when the second optical element is inactive, and wherein the third optical element is configured to be inactive when the second optical element is active.

16. The apparatus of claim 15:
wherein the second hologram is one of three holograms comprised in the second optical element, wherein each of the three holograms of the second optical element is configured to operate in the active state or the inactive state, wherein each of the three holograms of the second optical element is configured to diffract a distinct visible bandwidth of light when operating in the active state, and wherein each of the three holograms of the second optical element is configured to transmit substantially all visible bandwidth without diffraction when operating in the inactive state;
wherein the third hologram is one of three holograms comprised in the third optical element, wherein each of the three holograms of the third optical element is configured to operate in the active state or the inactive state, wherein each of the three holograms of the third optical element is configured to diffract a distinct visible-bandwidth of light when operating in the active state, and wherein each of the three holograms of the third optical element is configured to transmit substantially all visible bandwidth without diffraction when operating in the inactive state.

17. The apparatus of claim 15 wherein the three holograms of the second and third optical elements are positioned within a common plane.

18. The apparatus of claim 15 wherein the three holograms of the second optical element are aligned on a first common axis, and wherein the three holograms of the third optical element are aligned on a second common axis, wherein the first and second common axes are spaced apart and parallel.

19. An apparatus comprising:
a display device comprising a plurality of light emitting pixels, wherein a first pixel is configured to emit a first and second light in first and second directions, respectively, wherein the first and second directions define a non-zero angle therebetween;
a first optical element comprising a first hologram, wherein the first optical element is positioned to receive the first light, wherein the first hologram is configured to diffract the first light, wherein the diffracted first light emerges from the first optical element in a direction substantially parallel to the second direction;
wherein the first optical element comprises a front and a back surface, wherein the first optical element is configured to diffract the first light if the first light is received on the front surface at an angle that is within a predefined range of angles measured with respect to a normal to the front surface, and wherein the first optical element is substantially opaque to the first light if the first light is received on the front surface at an angle that is outside the predefined range of angles angle measured with respect to a normal to the front surface.

20. A display system comprising:
a display device comprising a first pixel and a second pixel, the first and second pixels being separated from each other by a non-light producing space, wherein the first and second pixels are configured to emit light in a forward direction;
a holographic optical element having a front and back surface, the holographic optical element being positioned in front of the first and second pixels over at least a portion of the non-light producing space, wherein light emitted from the first pixel strikes the back surface of the holographic optical element, and wherein the holographic element diffracts the light emitted from the first pixel such that the diffracted light emerges from the front surface of the holographic optical element substantially normal to the front surface of the holographic optical element, and wherein at least a portion of the diffracted light emerges from the holographic optical element at a position in front of the intervening non-light producing space, and wherein the holographic optical element is configured such that the passage of light emitted by the second pixel through the holographic optical element is substantially inhibited;
a first shutter element positioned in front of the holographic optical element, and wherein the first shutter element is substantially opaque to light when in an active state, and wherein the second shutter element is substantially transparent to light in an inactive state; and
a second shutter element positioned in front of the pixel, wherein the second shutter element is substantially opaque to light when in an active state, and wherein the second shutter element is substantially transparent to light in an inactive state.

21. The display system of claim 20, wherein the holographic optical element is formed from a polymer dispersed liquid crystal material, and wherein the holographic optical element is switchable between an active state and an inactive state.

22. The display system of claim 20, wherein the entire holographic optical element is positioned in front of the non-light producing space.

23. The display system of claim 22, further comprising an additional holographic optical element, the additional holographic element being substantially optically aligned with the pixel and adjacent to the holographic optical element.

24. The display system of claim 23, wherein the additional holographic element is substantially contained within the outer boundary of the first pixel.

25. The display system of claim 20, wherein the first shutter element is configured to be in an active state when the second shutter element is in an inactive state, and wherein the second shutter element is configured to be in an active state when the first shutter element is in an inactive state.

26. The display system of claim 20, wherein the first and second shutter elements are switchable holographic optical elements.

27. The display system of claim 20, wherein the display device is a color LCD display device, and wherein the pixel emits multiple wavelengths of light.

28. The display system of claim 20, wherein the holographic optical element comprises three superimposed switchable holograms, wherein the first hologram is configured to diffract red light, wherein the second hologram is configured to diffract green light, and wherein the third hologram is configured to diffract blue light.

29. The display system of claim 20, wherein the pixel comprises three sub-pixels, the first sub-pixel emitting red light, the second sub-pixel emitting green light and the third sub-pixel emitting blue light, and wherein the holographic optical element comprises three sub-holograms, wherein the first sub-hologram is configured to diffract red light, wherein the second sub-hologram is configured to diffract green light, and wherein the third sub-hologram is configured to diffract blue light.

30. The display system of claim 20, wherein the holographic element is a switchable holographic optical element, and wherein the holographic optical element extends over the first and second pixels, and wherein the holographic optical element in an inactive state allows light traveling in a normal direction to the holographic optical element to pass through the element, and wherein the holographic optical element in an active state allows only light incident at a predefined angle to pass through the holographic optical element, and wherein the holographic optical element in an active state diffracts the incident light such that it emerges in a substantially normal direction from the holographic optical element.

31. An apparatus for enhancing the resolution of a display device, the display device comprising an array of pixels, the apparatus comprising
  a holographic optical element layer comprising an array of holograms having a spatial frequency equal to the spatial frequency of the pixels of the display device;
  a shutter element layer positioned in front of the holographic optical element layer, the shutter element layer comprising a first array of shutters and a second array of shutters, the first array of shutters and the second array of shutters having a spatial frequency equal to the spatial frequency of the array of holograms, wherein the first array of shutter and the second array of shutters are coplanar and non-overlapping, and wherein the first array of shutters are in front of the array of holograms;
  wherein the apparatus is positionable over the display device such that the second array of shutters is in front of the pixels of the display.

32. The apparatus of claim 31, wherein the holographic optical element layer is formed from a liquid crystal material.

33. The apparatus of claim 31, wherein the array of holograms are switchable holograms.

34. The apparatus of claim 31, wherein the holographic optical element layer is formed from a polymer dispersed liquid crystal material.

35. The apparatus of claim 31, wherein the array of holograms comprises an array of diffraction grating holograms.

36. The apparatus of claim 31, further comprising an additional array of holograms formed in the holographic optical element layer, the additional array of holograms being coplanar and non-overlapping with the array of holograms, and wherein the additional array of holograms are in front of the pixels of the display device during use.

37. The apparatus of claim 31, wherein the additional array of holograms comprises an array of light converging holograms.

38. The apparatus of claim 31, wherein the additional array of holograms comprises an array of light diffusing holograms.

39. The apparatus of claim 31, wherein the light emitted from the array of holograms passes through the first array of shutters and emerges from the front surface of the first array of shutters when the first array of shutters is in an inactive state, and wherein the light emitted from the array of holograms is inhibited from passing through the first array of shutters when the first array of shutters is in an active state; and wherein light emitted from the array of pixels passes through the second array of shutters and emerges from the front surface of the second array of shutters when the second array of shutters is in an inactive state, and wherein the light emitted from the array of pixels is inhibited from passing through the second array of shutters when the second array of shutters is an active state.

40. The apparatus of claim 39, wherein the first array of shutters is configured to be in an active state when the second array of shutters is in an inactive state, and wherein the second array of shutters is configured to be in an active state when the first array of shutters is in an inactive state.

41. The apparatus of claim 40, wherein the first and second array of shutters are composed of switchable holographic optical elements.

42. The apparatus of claim 31, wherein each hologram of the array of holograms comprises three superimposed switchable holograms, wherein a first switchable hologram is configured to diffract red light, and wherein a second switchable hologram is configured to diffract green light, and wherein a third switchable hologram is configured to diffract blue light.

43. The display system of claim 31, further comprising a light diffusing optical element positioned in front of the holographic optical element.

44. A display system comprising:
  a display device comprising a pixel, wherein the pixel is configured to emit light in a forward direction from the pixel; and
  a switchable holographic optical element having a front and back surface, the switchable holographic optical element being positioned in front of the pixel, wherein the switchable holographic optical element is substantially transparent to light incident at a predefined range of angles when in an active state, and wherein the switchable holographic optical element is substantially opaque to light incident at an angle which differs from the predefined range of angles when in an active state, and wherein the switchable holographic optical element is substantially transparent to light in an inactive state.

45. The display system of claim 44, wherein the switchable holographic optical element is formed from a polymer dispersed liquid crystal material.

46. The display system of claim 44, wherein the holographic optical element defines a hologram of a diffraction grating.

47. The display system of claim 44, wherein the display device is a color LCD display device, and wherein the pixel emits multiple wavelengths of light.

48. The display system of claim 44, wherein the holographic optical element comprises three superimposed switchable holograms, and wherein a first switchable hologram is configured to diffract red light, and wherein a second switchable hologram is configured to diffract green light, and wherein a third switchable hologram is configured to diffract blue light.

49. The display system of claim 44, wherein the pixel emits monochromatic light.

50. The display system of claim 44, wherein the pixel comprises three sub-pixels, the first sub-pixel emitting red light, the second sub-pixel emitting green light and the third sub-pixel emitting blue light, and wherein the holographic optical element comprises three sub-holograms, wherein the first sub-hologram is configured to diffract red light, wherein the second sub-hologram is configured to diffract green light, and wherein the third sub-hologram is configured to diffract blue light.

51. The display system of claim 44, further comprising a light diffusing optical element positioned in front of the holographic optical element.

52. A method of enhancing the resolution of a display device, comprising providing a display system, the display system comprising:

a display device comprising a pixel, wherein the pixel is configured to emit light in a forward direction from the pixel;

a holographic optical element having a front and back surface, the holographic optical element being positioned in front of the pixel such that at least a portion of the holographic optical element extends beyond an outer boundary of the pixel, wherein the holographic optical element is substantially transparent to light incident at a predefined range of angles, and wherein the holographic optical element is substantially opaque to light incident at an angle which differs from the predefined range of angles;

a first shutter element having a front and back surface, the first shutter element being positioned in front of the holographic optical element and in front of the holographic optical element, wherein the first shutter element is substantially opaque to light when in an active state, and wherein the first shutter element is substantially transparent to light in an inactive state;

a second shutter element having a front and back surface, the second shutter element being positioned in front of the pixel and in front of the pixel, wherein the second shutter is substantially opaque to light when in an active state, and wherein the second shutter is substantially transparent to light in an inactive state;

activating the pixel such that the pixel emits a first light pattern;

switching the first shutter to an active state such that the light emitted from the holographic optical element is substantially inhibited from passing through the first shutter;

substantially simultaneously switching the second shutter to an active state while switching the first shutter to an inactive state, wherein switching the second shutter to an active state substantially inhibits light emitted normal to the pixel from being transmitted through the shutter.

53. The method of claim 52, further comprising activating the pixel to emit a second light pattern while substantially simultaneously activating the second shutter and inactivating the first shutter.

54. The method of claim 53, wherein substantially simultaneously activating the second shutter and inactivating the first shutter is coordinated with activating the pixel to emit the second light pattern such that the first light pattern is emitted through the second shutter, and the second light pattern is emitted through the first shutter.

55. The method of claim 53, wherein the first and second shutter elements are switchable holographic optical elements.

56. The method of claim 53, wherein the display device is a color LCD display device, and wherein the pixel emits multiple wavelengths of light, and wherein the pixel sequentially emits red, green and blue light when activated.

57. The method of claim 56, wherein the holographic optical element comprises three superimposed switchable holograms, and wherein a first switchable hologram is configured to diffract red light when activated, and wherein a second switchable hologram is configured to diffract green light when activated, and wherein a third switchable hologram is configured to diffract blue light when activated, and wherein the first, second and third switchable holograms are configured to be substantially transparent to light in an inactive state, and further comprising sequentially activating one of the switchable holograms while the other two holograms remain in an inactive state, wherein the sequential activation of the switchable holograms is synchronized with the sequence of light emitted by the pixel.

58. The method of claim 57, wherein substantially simultaneously activating the second shutter and inactivating the first shutter is synchronized with the display refresh rate.

59. A method of enhancing the resolution of a display device, comprising:

placing an apparatus for enhancing the-resolution of a display device, the display device comprising an array of pixels, the apparatus comprising:

a holographic optical element layer comprising an array of holograms having a spatial frequency equal to the spatial frequency of the pixels of the display device;

a shutter element layer positioned in front of the holographic optical element layer, the shutter element layer comprising a first array of shutters and a second array of shutters, the first array of shutters and the second array of shutters having a spatial frequency equal to the spatial frequency of the array of holograms, wherein the first array of shutter and the second array of shutters are coplanar and non-overlapping, and wherein the first array of shutters are in front of the array of holograms;

aligning the apparatus over the display device such that the array of holograms is substantially offset from the array of pixels, and wherein the second array of shutters is in front of the pixels of the display;

activating the array of pixels such that the pixels emits a first light pattern;

switching the first array of shutters to an active state such that the light emitted from the holographic optical element is substantially inhibited from passing through the first array of shutters, and wherein the first fight pattern appears to emanate from the array of pixels;

activating the array of pixels such that the pixels emit a second light pattern; and substantially simultaneously switching the second array of shutters to an active state while switching the first array of shutters to an inactive state, wherein switching the second array of shutters to an active state substantially inhibits light emitted normal to the pixel from being transmitted through the second array of shutters, and wherein the second light pattern appears to emanate from the array of holograms.

60. The method of claim 59, wherein the display device is a color LCD display device, and wherein the pixel emits multiple wavelengths of light, and wherein the pixel sequentially emits red, green and blue light when activated.

61. The method of claim 60, wherein the holographic optical element comprises three superimposed switchable holograms, and wherein a first switchable hologram is configured to diffract red light when activated, and wherein a second switchable hologram is configured to diffract green light when activated, and wherein a third switchable hologram is configured to diffract blue light when activated, and wherein the first, second and third switchable holograms are configured to be substantially transparent to light in an inactive state, and further comprising sequentially activating one of the switchable holograms while the other two holograms remain in an inactive state, wherein the sequential activation of the switchable holograms is synchronized with the sequence of light emitted by the pixel.

62. The method of claim 59, wherein the display device is an interlaced display device, and wherein the first light pattern corresponds to the even fields of an interlaced display and wherein the second light pattern corresponds to the odd fields of an interlaced display.

63. The method of claim 59, wherein the display device is a progressive display, and wherein the first pattern of light corresponds to half of an image information, and wherein the second pattern corresponds to the complementary half of the image information.

64. A method of enhancing the resolution of a display device, comprising:

providing a display system, the display system comprising:

a display device comprising a pixel, wherein the pixel is configured to emit light emanating in a forward direction from the pixel; and a switchable holographic optical element having a front and back surface, the switchable holographic optical element being positioned in front of the pixel, wherein the switchable holographic optical element is substantially transparent to light incident at a predefined range of angles when in an active state, and wherein the switchable holographic optical element is substantially opaque to light incident at an angle which differs from the predefined range of angles when in an active state, and wherein the switchable holographic optical element is substantially transparent to light in an inactive state;

activating the pixel such that the pixel emits a first light pattern while the switchable holographic optical element is in an inactive state;

switching the switchable holographic optical element to an active state.

* * * * *